(12) United States Patent
Hakii et al.

(10) Patent No.: US 11,867,933 B2
(45) Date of Patent: Jan. 9, 2024

(54) DISPLAY HAVING SUB-WAVELENGTH POLYGONAL PERIODIC ELEMENTS

(71) Applicant: TOPPAN PRINTING CO., LTD., Tokyo (JP)

(72) Inventors: Hidemitsu Hakii, Tokyo (JP); Masashi Kawashita, Tokyo (JP); Yukari Oda, Tokyo (JP); Tomoya Uchida, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 698 days.

(21) Appl. No.: 16/884,464

(22) Filed: May 27, 2020

(65) Prior Publication Data

US 2020/0284959 A1    Sep. 10, 2020

Related U.S. Application Data

(63) Continuation of application No. PCT/JP2018/044291, filed on Nov. 30, 2018.

(30) Foreign Application Priority Data

Dec. 4, 2017  (JP) ................. 2017-232648
Dec. 22, 2017 (JP) ................. 2017-246744
Dec. 27, 2017 (JP) ................. 2017-251013

(51) Int. Cl.
*B42D 25/373*  (2014.01)
*G02B 1/18*    (2015.01)
(Continued)

(52) U.S. Cl.
CPC .............. *G02B 5/285* (2013.01); *G02B 1/18* (2015.01); *G02B 5/008* (2013.01); *G02B 5/30* (2013.01); *B42D 25/373* (2014.10)

(58) Field of Classification Search
CPC ...... B42D 25/21–27; B42D 25/285–30; B42D 25/324; B42D 25/328;
(Continued)

(56) References Cited

U.S. PATENT DOCUMENTS 7,907,339 B2   3/2011 Tompkin et al.
10,132,031 B1* 11/2018 Nair .................... C09D 7/40
(Continued)

FOREIGN PATENT DOCUMENTS

EP    2 787 340 A1   10/2014
EP    3 124 283 A1   2/2017
(Continued)

OTHER PUBLICATIONS

Japanese Office Action issued in Japanese Application No. 2016-181037 dated Nov. 4, 2020, with English Translation.
(Continued)

*Primary Examiner* — Ryan S Dunning
(74) *Attorney, Agent, or Firm* — Foley & Lardner LLP

(57) ABSTRACT

A display is provided with a periodic structure that is dielectric and includes a support and a plurality of periodic elements. A plurality of periodic elements is arranged on a reference plane in a two-dimensional lattice form having a sub-wavelength period and are either convexities projected or concavities recessed in the reference plane. A metal layer is disposed on a surface of the periodic structure. The surface corresponds to a plane including a region of the reference plane surrounding the individual periodic elements and surfaces of the periodic elements. The metal layer's profile conforms to a surface profile of the periodic structure. The plurality of periodic elements have an interval therebetween in a first direction in which the plurality of periodic elements are arranged in a two-dimensional lattice form. The interval (Continued)

is different from an interval between the periodic elements in a second direction intersecting the first direction.

8 Claims, 21 Drawing Sheets

(51) Int. Cl.
*G02B 5/28* (2006.01)
*G02B 5/00* (2006.01)
*G02B 5/30* (2006.01)

(58) Field of Classification Search
CPC ............... B42D 25/351; B42D 25/373; B42D 25/425–445; B42D 25/45–47; G02B 1/18; G02B 5/008; G02B 5/285–288; G09F 19/14
See application file for complete search history.

(56) References Cited

U.S. PATENT DOCUMENTS

| | | | |
|---|---|---|---|
| 10,175,170 B2* | 1/2019 | Kennedy | ............... H01F 1/01 |
| 2010/0328587 A1 | 12/2010 | Yamada et al. | |
| 2011/0052802 A1 | 3/2011 | Kaida et al. | |
| 2011/0080640 A1 | 4/2011 | Kaida et al. | |
| 2012/0235399 A1 | 9/2012 | Lochbihler | |
| 2014/0085725 A1 | 3/2014 | Lochbihler et al. | |
| 2014/0253920 A1 | 9/2014 | Sugimoto | |
| 2014/0329336 A1 | 11/2014 | Moriya et al. | |
| 2015/0070693 A1 | 3/2015 | Sugimoto et al. | |
| 2015/0219807 A1 | 8/2015 | Lochbihler | |
| 2016/0202394 A1* | 7/2016 | Clausen | ............... G02B 1/10 428/148 |
| 2017/0011665 A1 | 1/2017 | Koda et al. | |
| 2017/0326898 A1 | 11/2017 | Koda | |
| 2019/0143736 A1 | 5/2019 | Kawashita et al. | |

FOREIGN PATENT DOCUMENTS

| | | |
|---|---|---|
| EP | 3 477 346 A1 | 5/2019 |
| JP | 2008-096556 A | 4/2008 |
| JP | 2008-162260 A | 7/2008 |
| JP | 2008-275740 A | 11/2008 |
| JP | 2009-145764 A | 7/2009 |
| JP | 2009-186813 A | 8/2009 |
| JP | 2009-266900 A | 11/2009 |
| JP | 2011-002491 A | 1/2011 |
| JP | 2011-013330 A | 1/2011 |
| JP | 2012-153111 A | 8/2012 |
| JP | 5124272 B2 | 1/2013 |
| JP | 2013-174683 A | 9/2013 |
| JP | 2014-059529 A | 4/2014 |
| JP | 2014-098780 A | 5/2014 |
| JP | 2014-238465 A | 12/2014 |
| JP | 2015-055482 A | 3/2015 |
| JP | 2015-184532 A | 10/2015 |
| KR | 10-2004-0111317 A | 12/2004 |
| WO | WO-2009/123290 A1 | 10/2009 |
| WO | WO-2009/125751 A1 | 10/2009 |
| WO | WO-2012/105555 A1 | 8/2012 |
| WO | WO-2012/156049 A1 | 11/2012 |
| WO | WO-2013/080473 A1 | 6/2013 |
| WO | WO-2014/023415 A | 2/2014 |
| WO | WO-2015/028037 A1 | 3/2015 |
| WO | WO-2015/147283 A1 | 10/2015 |
| WO | WO-2016/125843 A1 | 8/2016 |

OTHER PUBLICATIONS

European Extended Search Report, dated Apr. 1, 2021, issued in corresponding European Patent Application No. 18885003.6, (18 pages).
Sheng, et al., "Dependence of Surface Plasmons on Unit Structure Edge Sharp Features", Plasmonics 12(3): 795-801 (2017).
Wang, et al., "Broadband Extraordinary Optical Transmission Through Gold Diamond-Shaped Nanohole Arrays", IEEE Photonics Journal 6(4): 1-8 (2014).
International Searching Authority, "International Search Report," issued in connection with International Patent Application No. PCT/JP2018/044291 , dated Feb. 26, 2019.
International Searching Authority, "Written Opinion," issued in connection with International Patent Application No. PCT/JP2018/044291 , dated Feb. 26, 2019.
Notification of Reasons for Rejection on JP Appl. No. 2017-232648 dated Mar. 15, 2022 (9 pages).
Extended European Search Report dated Feb. 10, 2020 for corresponding Application No. 17815529.7.
International Search Report with English language translation and Written Opinion issued in International Application No. PCT/JP2017/023301 dated Sep. 5, 2017.
Office Action dated Jul. 7, 2020 for corresponding Japanese Patent Application No. 2016-181036.
Office Action dated Jun. 16, 2020 for corresponding Japanese Patent Application No. 2016-125704.
Office Action dated Jun. 16, 2020 for corresponding Japanese Patent Application No. 2016-125705.
Office Action dated Oct. 6, 2020 for corresponding Japanese Patent Application No. 2016-125705.

* cited by examiner

DISPLAY HAVING SUB-WAVELENGTH POLYGONAL PERIODIC ELEMENTS

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2018/044291, filed on Nov. 30, 2018, which is based upon and claims the benefit of priority to Japanese Patent Applications Nos. 2017-232648, filed on Dec. 4, 2017; 2017-246744, filed on Dec. 22, 2017; and 2017-251013, filed on Dec. 27, 2017, the disclosures of which are all incorporated herein by reference in their entireties.

TECHNICAL FIELD

The present invention relates to a display, a device with a display, and a method of producing a display

BACKGROUND ART

Displays make use of optical interference or the like of diffraction gratings or multilayer films to impart a visual appearance different from those of printed matter to the images presented by the displays (e.g., see PTL 1). For example, verification documents such as passports or licenses, or securities such as gift tickets or checks are required to be difficult to counterfeit. Displays are provided to such items to increase difficulty of counterfeiting. Such displays, when provided to items of daily use, can enhance the visual appearance of the items.

The diffraction grating provided to such a display includes, for example, a transparent resin layer and a metal layer, such as an aluminum layer, disposed on the resin layer. The diffraction grating has a shape expressed by a mathematical function having a sine secondary structure, and includes inclined portions each including a thin metal layer that is thinner than other portions. For example, the shape of the diffraction grating contributes to adding a difference in transmittance or reflectance to the metal layers, depending on the structural difference between the inclined portions. The shape of the diffraction grating enables grayscale expressions or different expressions of hue between a reflection image and a transmission image (e.g., see PTL 1). The difference between a reflection image and a transmission image can verify authenticity of an item to which the display is affixed.

CITATION LIST

Patent Literature

PTL 1: JP 5124272 B2

SUMMARY OF THE INVENTION

Technical Problem

To increase difficulty of counterfeiting or enhance the visual appearance, a single display may preferably produce images whose appearances depend on the observation conditions. For example, a single display may preferably produce images which are different in hue between front-surface observation and rear-surface observation of the display, or may preferably enable observation of images which are different in hue between reflected light observation and transmitted light observation on one surface of the display.

The shape of the diffraction grating having a sinusoidal secondary structure, which is expressed by mathematical functions, requires high symmetry in the height direction of the structure of the diffraction grating, i.e. in the front-rear direction of the display. Difference in hue is insignificant between the image observed from the front surface of the display and the image observed from the rear surface thereof. Consequently, it is difficult to discriminate the front from the rear of the display based on these observations of an image.

Displays formed of the diffraction grating based on conventional art as described above suffer from an issue that the image based on reflected light or transmitted light observed on a front or rear surface of the displays is pale and has low wavelength selectivity.

Furthermore, displays are often provided to items of daily use which are directly touched by the fingers of an unspecified number of people. Therefore, it is preferable that measures are taken for minimization of bacterial propagation on the displays.

The present invention aims to provide a display which enables observation of images with different appearances depending on the observation conditions, enhances wavelength selectivity in a reflected or transmitted light image, and minimizes bacterial propagation, and also aims to provide a device with a display, and a method of producing a display.

Solution to Problem

As an aspect of a display for solving the issues, the display includes a periodic structure that is dielectric and includes a support and a plurality of periodic elements, the support having a reference plane on which the plurality of periodic elements are arranged in a two-dimensional lattice form having a sub-wavelength period, the plurality of periodic elements being either convexities projected from the reference plane or concavities recessed in the reference plane; and a metal layer disposed on a surface of the periodic structure, the surface corresponding to a plane including a region of the reference plane surrounding the individual periodic elements and surfaces of the periodic elements, the metal layer having a profile conforming to a surface profile of the periodic structure. In the device, the plurality of periodic elements have an interval therebetween in a first direction, the interval being different from an interval therebetween in a second direction, the first direction being a direction in which the plurality of periodic elements are arranged in a two-dimensional lattice form, the second direction being a direction in which the plurality of periodic elements are arranged in a two-dimensional lattice form and intersecting the first direction.

With the configuration described above, since the display includes a layer having a periodic lattice structure of a sub-wavelength made of metal and a dielectric material, plasmon resonance occurs in the layer having the lattice structure when light is applied to a first surface, i.e., one of the front and rear surfaces, of the display from outside the display. Light in a wavelength region to be consumed by plasmon resonance does not emerge from this first surface, but light which has a specific wavelength region and has undergone plasmon resonance emerges from a second surface, i.e., the other one of the front and rear surfaces, of the display. Accordingly, images can be observed with hues that are different between reflection observation via the first surface and transmission observation via the second surface. Also, images can be observed with hues that are different between reflection observation and transmission observation via the first surface. Specifically, with the above configuration, images with different appearances can be observed depending on the observation conditions. Since the interval between the periodic elements in the first direction is different from the interval between the periodic elements in the second direction, plasmon resonance absorption can be developed due to the different intervals of the periodic elements in the first and second directions. Thus, according to the display, the effects of surface plasmon resonance absorption can be selectively exerted depending on the polarization direction of incident light.

In the above configuration, the reference plane may be provided thereon with a first lattice layer having a thickness in a range of 10 nm or more and 200 nm or less, a second lattice layer having a thickness in a range of 10 nm or more and 200 nm or less, and an intermediate lattice layer having a thickness greater than that of the first lattice layer and that of the second lattice layer and sandwiched between the first lattice layer and the second lattice layer in a thickness direction. Furthermore, the first lattice layer may include a plurality of first dielectric portions and a first metal layer, the plurality of first dielectric portions being arranged in an island array that is any one of a square array having square array units, a hexagonal array having rhombic array units and a rectangular array having rectangular array units, the first metal layer having a mesh pattern which surrounds the individual first dielectric portions. The intermediate lattice layer may include a plurality of first intermediate dielectric portions and a second intermediate dielectric layer, the plurality of first intermediate dielectric portions being arranged in an island array that is any one of a square array having square array units, a hexagonal array having rhombic array units and a rectangular array having rectangular array units, the second intermediate dielectric layer having a mesh pattern which surrounds the individual first intermediate dielectric portions and having a dielectric constant lower than that of the first intermediate dielectric portions. The second lattice layer may include a plurality of second metal portions and a second dielectric layer, the plurality of second metal portions being arranged in an island array that is any one of a square array having square array units, a hexagonal array having rhombic array units and a rectangular array having rectangular array units, the second dielectric layer having a mesh pattern which surrounds the individual second metal portions. The periodic elements may be the convexities, the first dielectric portions and the first intermediate dielectric portions may configure the periodic elements, and the first metal layer and the second metal portions may be included in the metal layer. A volume ratio of the first metal layer in the first lattice layer may be larger than a volume ratio of the second metal portions in the second lattice layer, and a volume ratio of the second metal portions in the second lattice layer may be larger than a volume ratio of metal materials in the intermediate lattice layer. A ratio of a width of each of the first dielectric portions to a structural period of the first dielectric portions and a ratio of a width of each of the second metal portions to a structural period of the second metal portions may each be in a range of 0.25 or more and 0.75 or less.

With the above configuration, the averaged refractive index of the first lattice layer is dominated by the refractive index of the first metal layer. Light incident on the support from outside the display is easily Fresnel-reflected at the interface between the first lattice layer and the support. In this regard, the averaged refractive index of the second lattice layer is dominated by the refractive index of the second dielectric layer. Also, the averaged refractive index of the intermediate lattice layer is dominated by the second intermediate dielectric layer made of a dielectric material. Light incident on the second lattice layer from outside the display is less likely to be Fresnel-reflected and enters the second lattice layer and then enters the intermediate lattice layer. As a result, in reflection observation in which the display is observed in a direction perpendicular to the support, an image due to Fresnel reflection is likely to be observed, whereas in reflection observation in which the display is observed in a direction perpendicular to the second lattice layer, an image due to Fresnel reflection is less likely to be observed.

Furthermore, the first lattice layer or the second lattice layer causes plasmon resonance. Light incident on the first lattice layer passes therethrough after being partly consumed by plasmon resonance. Similarly, light incident on the second lattice layer passes therethrough after being partly consumed by plasmon resonance. Therefore, in reflection observation in which the display is observed in a direction perpendicular to the support, an image due to Fresnel reflection takes on a hue other than black or white and can be clearly observed. In this case, when the display is observed in a direction perpendicular to the second lattice layer, transmitted light that has undergone plasmon resonance in the first and second lattice layers produces an image having a hue other than black or white.

Light incident on the second lattice layer from outside the display is partly consumed by plasmon resonance in the second or first lattice layer and is even less likely to return to the outside of the second lattice layer. Therefore, in reflection observation in which the display is observed in a direction perpendicular to the second lattice layer, an image having a hue closer to black is observed.

Consequently, the location of the support in the thickness direction of the layers can be determined, i.e., the front and rear of the display can be discriminated from each other in reflection observation in which the display is observed in a direction perpendicular to the support, in reflection observation in which the display is observed in a direction perpendicular to the second lattice layer, or in transmission observation in which the display is observed in a direction perpendicular to the second lattice layer.

In this configuration, the first metal layer and the second metal portions may have a complex dielectric constant with a negative real part for light in the visible region.

With this configuration, since plasmon resonance easily occurs in the first and second lattice layers, the image in each observation mentioned above can have more vivid hue.

In this configuration, a ratio of a width of each of the first dielectric portions to a structural period of the first dielectric portions and a ratio of a width of each of the second metal portions to a structural period of the second metal portions may each be in a range of 0.40 or more and 0.60 or less.

With this configuration, the size of each first dielectric portion is prevented from becoming excessively small relative to the size of the first metal layer, and the size of each second metal portion is prevented from becoming excessively small relative to the size of the second dielectric layer. Therefore, processing load is alleviated when producing the display.

In this configuration, the first metal layer may be made of a material that is the same as that of the second metal portions; the second dielectric layer may be an air layer; and the first dielectric portions and the first metal layer may have a difference in refractive index therebetween, the difference being larger than a difference in refractive index between the second dielectric layer and the second metal portions.

With this configuration, since the first metal layer and the second metal portions have the same refractive index and the difference in refractive index between the first dielectric portions and the first metal layer is larger than the difference in refractive index between the second dielectric portions and the second metal layer, Fresnel reflection at the interface between the second lattice layer and another layer can be better minimized and Fresnel reflection at the interface between the first lattice layer and another layer can be promoted.

In the above configuration, the periodic elements may each have a rectangular shape in plan view.

With this configuration, the interval between adjacent periodic elements in the first direction can be made different from the interval between adjacent periodic elements in the second direction even when the lattice units of the periodic elements are arranged in a square array. Therefore, plasmon resonance absorption can be developed depending on the different intervals of the periodic elements in the first and second directions. Thus, according to the display, the effects of surface plasmon resonance absorption can be selectively exerted depending on the polarization direction of incident light.

In this configuration, the first dielectric portions may each form an integral structure with a corresponding one of the first intermediate dielectric portions, and the second intermediate dielectric layer may form an integral structure with the second dielectric layer.

With this configuration, since the first dielectric portions are integral with the respective first intermediate dielectric portions and since the second intermediate dielectric layer is integral with the second dielectric layer, the structure of the display can be simplified.

In this configuration, the intermediate lattice layer may further include intermediate metal portions each being disposed on side faces of a corresponding one of the first intermediate dielectric portions and each being sandwiched between a corresponding one of the first intermediate dielectric portions and the second intermediate dielectric layer; and the intermediate metal portions may each form an integral structure with a corresponding one of the second metal portions and may be included in the metal layer, the intermediate metal portions on the side faces each having a thickness decreasing toward the first metal layer to minimize reflection of light in the visible region.

With this configuration, since the intermediate metal portions have an anti-reflection function, the image observed can have a hue closer to black in reflection observation in which the display is observed in a direction perpendicular to the second lattice layer.

In this configuration, the display may further include a dielectric layer which is disposed on a surface of the metal layer facing away from the surface contacting the periodic structure, the dielectric layer having a profile conforming to a surface profile of the metal layer.

With this configuration, hue observed in reflection or transmission observation can be controlled by changing the material for the dielectric layer, and thus the degree of freedom in the control of hue can be increased. Since the dielectric layer has a profile conforming to the surface profile of the metal layer, Fresnel reflection can be reduced at the interface between the layer including the dielectric layer and the upper layer of the layer including the dielectric layer compared to the case where the dielectric layer has a flat surface. As a result, the image observed will have a more vivid hue in reflection observation in which the display is observed in a direction perpendicular to the dielectric layer.

In this configuration, the display may further include a protective layer covering a surface of the dielectric layer facing away from the surface contacting the metal layer.

With this configuration, the structure formed of the periodic structure, the metal layer and the protective layer can be protected.

A device with a display for solving the above issues includes the device described above; and a light emergence structure which is disposed facing part of either a front surface or a rear surface of the display and allows light to be discharged toward the display.

With this configuration, part of light discharged from the light emergence structure passes through the display and emerges from a surface of the display facing away from the light emergence structure. Accordingly, when the display is observed in a direction perpendicular to the surface of the display facing away from the light emergence structure in a state in which light is applied toward the surface, the portion overlapped with the light emergence structure and the portion not overlapped with the light emergence structure respectively appear to have different hues. In this way, a larger variety of images can be expressed.

A method of producing a display for solving the above issues includes: a first step of forming a periodic structure having a two-dimensional lattice form, as viewed in a direction perpendicular to a front surface of a substrate, by transferring asperities of an intaglio plate to a resin applied to the front surface of the substrate, the periodic structure having convexities or concavities which serve as periodic elements and have a sub-wavelength period; and a second step of forming a metal layer on the periodic structure, the metal layer having a profile conforming to a surface profile of the periodic structure. In the method, an interval of the plurality of periodic elements arranged in a two-dimensional lattice form in a first direction is different from an interval of the plurality of periodic elements arranged in a two-dimensional lattice form in a second direction which intersects the first direction.

With this production method, there can be obtained a display in which images with different appearances can be observed depending on the observation conditions. In particular, a periodic structure having micro-asperities can be easily and favorably formed.

With this production method, hue observed in reflection or transmission observation of the display can be controlled by changing the material for the dielectric layer, and thus the degree of freedom in the control of hue can be increased.

Another aspect of the present invention for solving the above issues is a display including: a periodic structure that is dielectric and includes a support and a plurality of periodic elements, the support having a reference plane on which the plurality of periodic elements are arranged in a two-dimensional lattice form having a sub-wavelength period, the plurality of periodic elements being either convexities projected from the reference plane or concavities recessed in the reference plane; and a metal layer disposed on a surface of the periodic structure, the surface corresponding to a plane including a region of the reference plane surrounding the individual periodic elements and surfaces of the periodic elements, the metal layer having a profile conforming to a surface profile of the periodic structure. In the display, the periodic elements each have a polygonal shape in plan view.

At least one interior angle of the polygon may be an acute angle.

At least part of pairs of adjacent periodic elements among the plurality of periodic elements may be arranged such that acute angles in a pair of adjacent periodic elements face each other.

The pair of adjacent periodic elements having acute angles facing each other may have centers, the centers having a distance therebetween which is a sub-wavelength.

The plurality of periodic elements may be arranged in any one of a hexagonal symmetric array, a hexagonal array and a square array in plan view.

In the display, the reference plane may be provided thereon with a first lattice layer having a thickness in a range of 10 nm or more and 200 nm or less, a second lattice layer having a thickness in a range of 10 nm or more and 200 nm or less, and an intermediate lattice layer having a thickness greater than that of the first lattice layer and that of the second lattice layer and sandwiched between the first lattice layer and the second lattice layer in a thickness direction. Furthermore, the first lattice layer may include a plurality of first dielectric portions and a first metal layer, the plurality of first dielectric portions being arranged in an island array, the first metal layer having a mesh pattern which surrounds the individual first dielectric portions. The intermediate lattice layer may include a plurality of first intermediate dielectric portions and a second intermediate dielectric layer, the plurality of first intermediate dielectric portions being arranged in an island array, the second intermediate dielectric layer having a mesh pattern which surrounds the individual first intermediate dielectric portions and having a dielectric constant lower than that of the first intermediate dielectric portions. The second lattice layer may include a plurality of second metal portions and a second dielectric layer, the plurality of second metal portions being arranged in an island array, the second dielectric layer having a mesh pattern which surrounds the individual second metal portions. The periodic elements may be the convexities, the first dielectric portions and the first intermediate dielectric portions may configure the periodic elements, and the first metal layer and the second metal portions may be included in the metal layer. A volume ratio of the first metal layer in the first lattice layer may be larger than a volume ratio of the second metal portions in the second lattice layer, and a volume ratio of the second metal portions in the second lattice layer may be larger than a volume ratio of metal materials in the intermediate lattice layer. A ratio of a width of each of the first dielectric portions to a structural period of the first dielectric portions and a ratio of a width of each of the second metal portions to a structural period of the second metal portions may each be in a range of 0.25 or more and 0.75 or less.

The display may further include a dielectric layer which is disposed on a surface of the metal layer facing away from the surface contacting the periodic structure, the dielectric layer having a profile conforming to a surface profile of the metal layer.

The metal layer may contain metal microparticles having antimicrobial properties.

For example, when a display is touched by human hands, bacteria may adhere to the display. However, with this configuration, since the metal layer contains metal microparticles having antimicrobial properties, metal ions are produced from the metal microparticles and introduced into the cells of the bacteria, and exert effects of inhibiting enzymes in the cells to thereby kill the bacteria. Specifically, with this configuration, images with different appearances can be observed depending on the observation conditions and at the same time propagation of bacteria can be minimized.

In this configuration, the first metal layer may be made of a material which is the same as that of the second metal portions, the material being at least one of gold, silver and copper.

With this configuration, since gold, silver and copper all develop plasmon resonance and exert antimicrobial effects, the front and rear of the display can be discriminated from each other making use of the plasmon resonance phenomenon, and the display can be imparted with the effects of minimizing propagation of bacteria.

Advantageous Effects of the Invention

According to the present invention, images with different appearances can be observed in the display depending on the observation conditions, and wavelength selectivity can be enhanced in a reflected or transmitted light image, and at the same time propagation of bacteria can be minimized.

DETAILED DESCRIPTION

Figure 1:
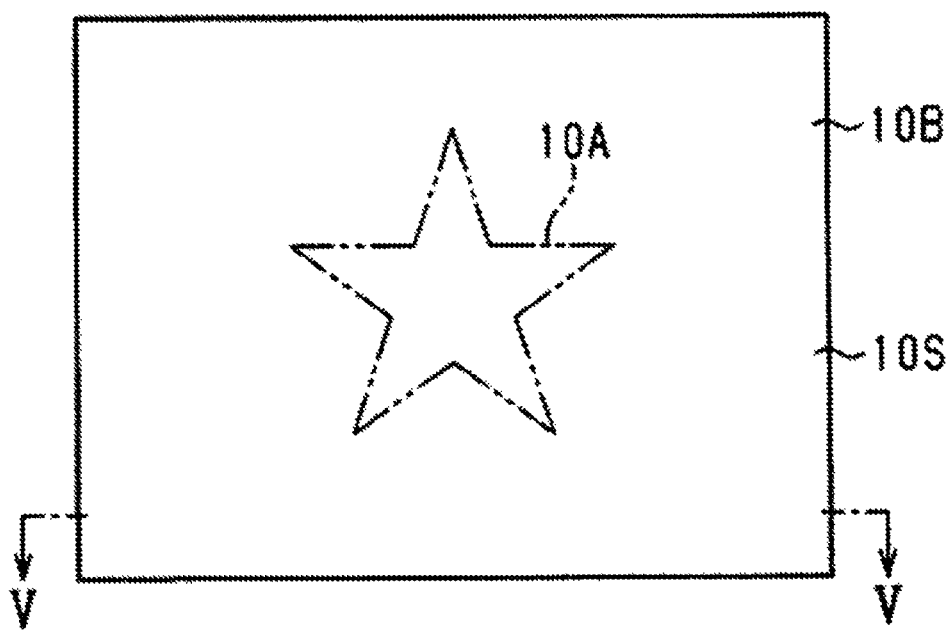
FIG. 1 is a plan view illustrating a structure of a display according to a first embodiment of the present invention.

With reference to the accompanying Figures, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., may be different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

Hereinafter, aspects of the present invention will be described with reference to the drawings. With reference to the drawings, an authentication device, a server computer, and an authentication method according to embodiments will be described.

First Embodiment

Referring to FIGS. 1 to 14, a first embodiment of a display and a method of producing the display will be described. It should be noted that the display may be used for the purpose of increasing difficulty of counterfeiting items or for the purpose of enhancing the visual appearance of items, or may be used for both purposes. For the purpose of increasing difficulty of counterfeiting items, the display may be affixed, for example, to verification documents such as passports or licenses, securities such as gift tickets or checks, cards such as credit cards or cash cards, paper currency, or other items. For the purpose of enhancing the visual appearance of items, the display may be affixed, for example, to wearable ornaments, items carried by users, stationary items such as furniture or electrical appliances, structures such as walls or doors, or the like.

As shown in FIG. 1, the display has a front surface 10S in which a first display region 10A and a second display region 10B are defined. The first display region 10A has a cross-sectional structure which is different from that of the second display region 10B. The first display region 10A is a region in the front surface 10S in which a character, a figure, a symbol, a pattern or a picture is provided. In FIG. 1, for example, a star-shaped figure is provided in this region.

[Structure of Display]

First, the following description explains a display that includes a first display region 10A', as a reference for the display including the first display region 10A according to an embodiment of the present invention.

Figure 2:
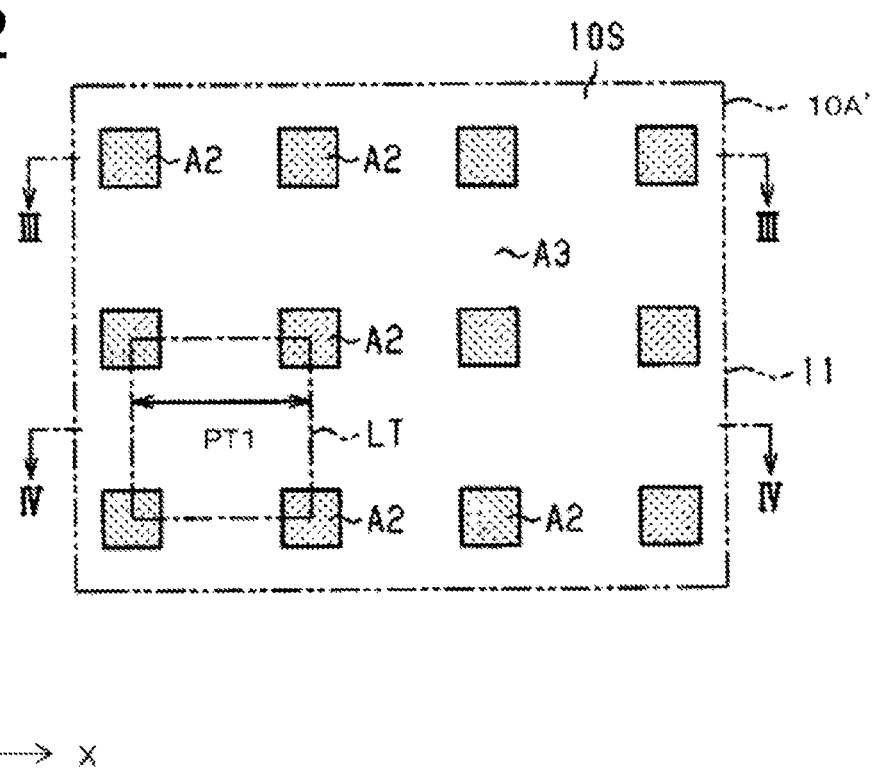
FIG. 2 is an enlarged plan view of a structure of a first display region in a display as a reference for the first embodiment.

As shown in FIG. 2, the first display region 10A' includes a plurality of isolated regions A2 and a single peripheral region A3 surrounding the individual isolated regions A2 as viewed in a direction perpendicular to the front surface 10S of the display. Each isolated region A2 has a square shape in plan view. In the following drawings, each isolated region A2 is indicated with dots for the sake of convenience of explaining the isolated regions A2.

The isolated regions A2 are arranged in a square array over the front surface 10S. In the square array, each lattice unit has a square shape. The square lattice unit refers to a lattice having smallest sides among the lattice structure units each formed by connecting with lines four of the plurality of isolated regions A2 arranged over the front surface 10S. The square array includes squares LT as lattice units having sides with a structural period PT1 and having vertices at which the isolated regions A2 are respectively arranged. Accordingly, in the first display region 10A', the isolated regions A2 in the X direction (left-right direction as viewed in the figure) have an interval therebetween which is equal to the interval between the isolated regions A2 in the Y direction (vertical direction as viewed in the figure).

Figure 3:
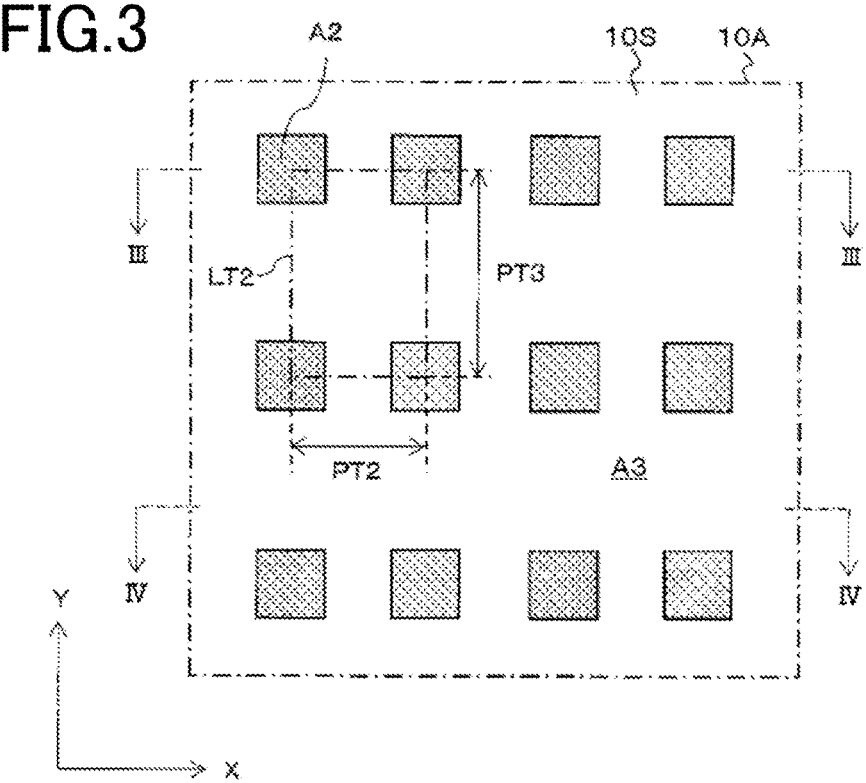
FIG. 3 is an enlarged plan view of a structure of a first display region in the display according to the first embodiment.
Figure 4:
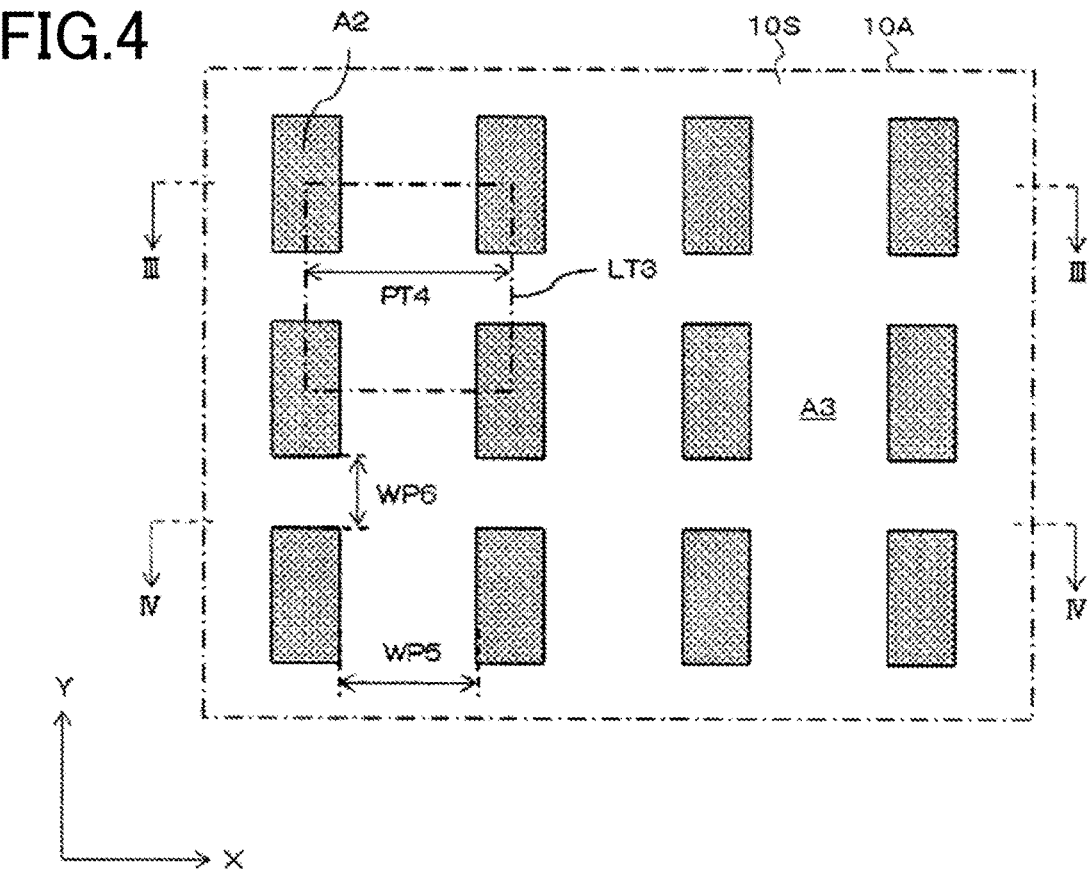
FIG. 4 is an enlarged plan view of a structure of a first display region in a display according to a modification of the first embodiment.

The following description explains a first display region 10A of a display according to a first embodiment of the present invention and a modification thereof. FIG. 3 shows a first display region 10A of the display according to the first embodiment. FIG. 4 shows a first display region 10A of the display according to a modification of the first embodiment. In the first display region 10A, unlike in the first display region 10A', the interval between the isolated regions A2 in a first direction (X direction) in which the isolated regions A2 are arranged is different from the interval between the isolated regions A2 in a second direction (Y direction) intersecting the first direction, in which the isolated regions A2 are arranged. It should be noted that the first direction is perpendicular to the second direction.

As shown in FIG. 3, a display according to the first embodiment includes a first display region 10A provided with isolated regions A2 each having a square shape in plan view. The isolated regions A2 are arranged in a rectangular array over the front surface 10S. In the rectangular array, each lattice unit has a rectangular shape. The array includes rectangles LT2 as lattice units, each having first sides with a structural period PT2 and second sides with a structural period PT3 and having vertices at which the isolated regions A2 are respectively arranged. The structural periods PT2 and PT3 are different from each other but they both correspond to a sub-wavelength period.

The following description explains a first display region 10A of a display according to a modification of the first embodiment of the present invention. FIG. 4 shows the first display region 10A of the display according to the modification of the first embodiment. As shown in FIG. 4, each isolated region A2 has a rectangular shape in plan view in the first display region 10A of the display according to the modification. The isolated regions A2 are arranged in a square array over the front surface 10S. More specifically, the square array includes squares LT3 as lattice units each having sides with a structural period PT4 and having vertices at which the isolated regions A2 are respectively arranged. The interval between the isolated regions A2 in the first direction (X direction) is WP5 and the interval between the isolated regions A2 in the second direction (Y direction) is WP6. The second direction, in which the isolated regions A2 are arranged, intersects the first direction. The interval WP5 is larger than the interval WP6. In other words, the interval WP5 is different from the interval WP6. The intervals WP5 and WP6 both correspond to a sub-wavelength period. In the following description, the structural periods PT2 to PT4 are collectively referred to as a structural period PT.

Figure 5:
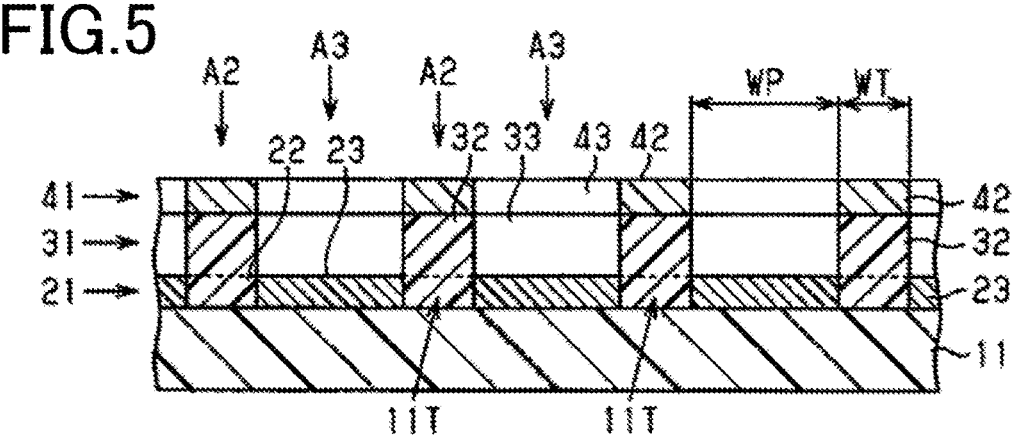
FIG. 5 is a cross-sectional view illustrating the structure of the first display region taken along the line of FIG. 2, according to the first embodiment.

As shown in FIG. 5, the display includes a transparent support 11 that transmits light in the visible region. Light in the visible region has a wavelength in the range of 400 nm or more and 800 nm or less. The support 11 is common to the first and second display regions 10A and 10B. The support 11 may have a single-layer cross-sectional structure or may have a multilayer cross-sectional structure.

The support 11 is made of a material that is a dielectric material, including, for example, a resin such as a photocurable resin, or an inorganic material such as quartz. The material for the support 11 is preferred to be a resin, from the perspectives such as of ease of obtaining flexibility required for affixing the display to an item, and having high degree of freedom in optical characteristics to be added to the support. The support 11 has a refractive index, e.g., in the range of 1.2 or more and 1.7 or less, which is higher than that of an air layer.

The first display region 10A includes a first lattice layer 21, an intermediate lattice layer 31 and a second lattice layer 41 arranged in this order on the support 11. The intermediate lattice layer 31 is sandwiched between the first lattice layer 21 and the second lattice layer 41. It should be noted that, in the support 11, the surface on which the first lattice layer 21 is disposed is the front surface of the support 11, and the first lattice layer 21—side of the support 11 is the front of the structure. The support 11—side of the first lattice layer 21 is the rear of the structure.

[First Lattice Layer 21]

The first lattice layer 21 is disposed on the front surface of the support 11. The first lattice layer 21 includes a plurality of first dielectric portions 22 and a single first metal layer 23. The first dielectric portions 22 are disposed in the respective isolated regions A2 as viewed in a direction perpendicular to the front surface 10S of the display. The single first metal layer 23 is disposed in the peripheral region A3 as viewed in a direction perpendicular to the front surface 10S. The plurality of first dielectric portions 22 are arranged in a two-dimensional lattice form over the front surface 10S.

The first dielectric portions 22 are structures projected from the surface of the support 11. For example, the first dielectric portions 22 may be integral with the support 11. Alternatively, the first dielectric portions 22 may have boundaries with the front surface of the support 11 and thus may be formed separately from the support 11.

As viewed in a direction perpendicular to the front surface 10S, the first metal layer 23 has a mesh pattern surrounding the individual first dielectric portions 22. In the first lattice layer 21, the single first metal layer 23 corresponds to an optical sea component in which free electrons are spread, and the first dielectric portions 22 correspond to island components distributed in the sea component.

As viewed in a direction perpendicular to the front surface 10S, the first dielectric portions 22 have a positioning period corresponding to the sum of a minimum interval WP between adjacent first dielectric portions 22 and a width WT of each first dielectric portion 22, i.e., corresponding to the structural period PT. The structural period PT is a sub-wavelength period which is not more than the wavelength of the visible region.

The ratio of the width WT of each first dielectric portion 22 to the structural period PT is in the range of 0.25 or more and 0.75 or less. From the perspectives of obtaining processing accuracy for the first lattice layer 21 and ease of plasmon resonance to occur in the first lattice layer 21, the ratio of the width WT of each first dielectric portion 22 to the structural period PT is preferred to be in the range of 0.40 or more and 0.60 or less.

The first lattice layer 21 is preferred to have a thickness in the range of 10 nm or more and 200 nm or less. From the perspectives of obtaining processing accuracy for the first lattice layer 21, ease of plasmon resonance to occur in the first lattice layer 21, and obtaining a vivid color image in each observation, the thickness of the first lattice layer 21 is preferred to be in the range of 10 nm or more and 100 nm or less.

[Intermediate Lattice Layer 31]

The intermediate lattice layer 31 is disposed on the first lattice layer 21. The intermediate lattice layer 31 has a thickness that is larger than that of the first lattice layer 21. From the perspective of obtaining processing accuracy for the intermediate lattice layer 31, the thickness of the intermediate lattice layer 31 is preferred to be 150 nm or less.

The intermediate lattice layer 31 includes a plurality of first intermediate dielectric portions 32 and a single second intermediate dielectric layer 33. The first intermediate dielectric portions 32 are disposed in the respective isolated regions A2 as viewed in a direction perpendicular to the front surface 10S. The single second intermediate dielectric layer 33 is disposed in the peripheral region A3 as viewed in a direction perpendicular to the front surface 10S. The plurality of first intermediate dielectric portions 32 are arranged in a two-dimensional lattice form across the front surface 10S.

The first intermediate dielectric portions 32 are structures projected from the respective first dielectric portions 22. For example, the first intermediate dielectric portions 32 may be integral with the respective first dielectric portions 22. Alternatively, for example, the first intermediate dielectric portions 32 may have boundaries with the respective first dielectric portions 22 and thus may be formed separately from the first dielectric portions 22. As viewed in a direction perpendicular to the front surface 10S, the first intermediate dielectric portions 32 have a positioning period corresponding to the sum of the minimum interval WP and the width WT like the first dielectric portions 22, i.e., corresponding to the structural period PT. The ratio of the width WT of each first intermediate dielectric portion 32 to the structural period PT is in the range of 0.25 or more and 0.75 or less. The ratio of the width WT of each first intermediate dielectric portion 32 to the structural period PT is preferred to be in the range of 0.40 or more and 0.60 or less.

As viewed in a direction perpendicular to the front surface 10S, the second intermediate dielectric layer 33 has a mesh pattern for surrounding the individual first intermediate dielectric portions 32. In the intermediate lattice layer 31, the single second intermediate dielectric layer 33 corresponds structurally and optically to a sea component, and the first intermediate dielectric portions 32 correspond structurally and optically to island components. The second intermediate dielectric layer 33 is an air layer or a resin layer and has a dielectric constant lower than that of the first intermediate dielectric portions 32.

[Second Lattice Layer 41]

The second lattice layer 41 is disposed on the intermediate lattice layer 31. The second lattice layer 41 is preferred to have a thickness in the range of 10 nm or more and 200 nm or less. The thickness of the second lattice layer 41 is smaller than that of the intermediate lattice layer 31. From the perspectives of obtaining processing accuracy for the second lattice layer 41, ease of plasmon resonance to occur in the second lattice layer 41, and obtaining an image with a vivid hue in each observation, the thickness of the second lattice layer 41 is preferred to be in the range of 10 nm or more and 100 nm or less.

The second lattice layer 41 includes a plurality of second metal portions 42 and a single second dielectric layer 43. As viewed in a direction perpendicular to the front surface 10S, the second metal portions 42 are disposed in the respective isolated regions A2. The single second dielectric layer 43 is disposed in the peripheral region A3 as viewed in a direction perpendicular to the front surface 10S. The plurality of second metal portions 42 are arranged in a two-dimensional lattice form over the front surface 10S.

The second metal portions 42 each form a structure together with the corresponding one of the first intermediate dielectric portions 32, with the former being overlaid on top of the latter. The second metal portions 42 have boundaries with the respective first intermediate dielectric portions 32 and thus are formed separately from the first intermediate dielectric portions 32. As viewed in a direction perpendicular to the front surface 10S, the second metal portions 42 have a positioning period corresponding to the sum of the minimum interval WP and the width WT like the first dielectric portions 22, i.e., corresponding to the structural period PT. The ratio of the width of each second metal portion 42 to the structural period PT may be in the range of 0.25 or more and 0.75 or less. The ratio of the width of each second metal portion 42 to the structural period PT is preferred to be in the range of 0.40 or more and 0.60 or less.

As viewed in a direction perpendicular to the front surface 10S, the second dielectric layer 43 has a mesh pattern for surrounding the individual second metal portions 42. In the second lattice layer 41, the single second dielectric layer 43 corresponds to an optical sea component in which fewer free electrons than in the second metal portions 42 are present, and the second metal portions 42 correspond to island components distributed in the sea component. The second dielectric layer 43 is an air layer or a resin layer having a dielectric constant smaller than that of the first intermediate dielectric portions 32.

The volume ratio of the first metal layer 23 as a sea component in the first lattice layer 21 is larger than the volume ratio of the second metal portions 42 as island components in the second lattice layer 41. The volume ratio of the second metal portions 42 as island components in the second lattice layer 41 is larger than the volume ratio of metal materials in the intermediate lattice layer 31.

It should be noted that the structures each including a first dielectric portion 22 and the corresponding first intermediate dielectric portion 32 are an example of the periodic elements. These structures also correspond to convexities 11T projected from the surface of the support 11 as a reference plane. The structure including the support 11, the first dielectric portions 22 and the first intermediate dielectric portions 32 is an example of the periodic structure. The layers including the first metal layer 23 and the second metal portions 42 are regarded to be a metal layer having a profile the entirety of which conforms to the surface profile of the periodic structure. The surface of the periodic structure includes the region of the reference plane surrounding the individual periodic elements and the surfaces of the periodic elements.

Figure 6:
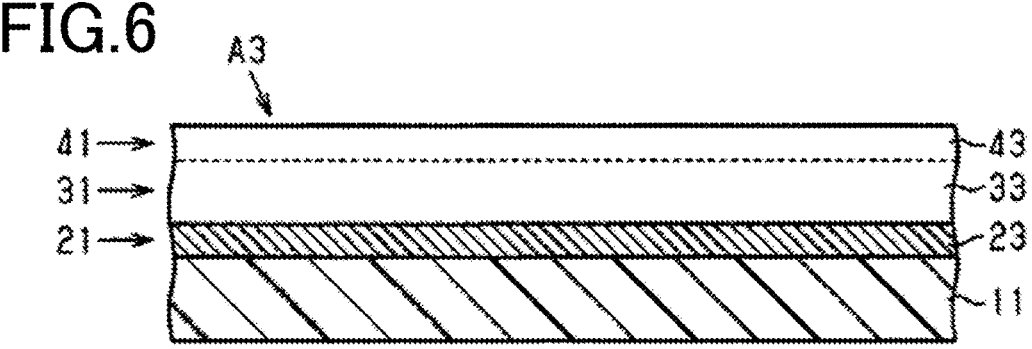
FIG. 6 is a cross-sectional view illustrating the structure of the first display region taken along the line IV-IV of FIG. 2, according to the first embodiment.

As shown in FIG. 6, in the peripheral region A3, the first metal layer 23 of the first lattice layer 21, the second intermediate dielectric layer 33 of the intermediate lattice layer 31 and the second dielectric layer 43 of the second lattice layer 41 are disposed in this order on the support 11. The second intermediate dielectric layer 33 is sandwiched between the first metal layer 23 and the second dielectric layer 43.

Figure 7:
FIG. 7 is a cross-sectional view illustrating a structure of a second display region taken along the line V-V of FIG. 1, according to the first embodiment.

As shown in FIG. 7, the second display region 10B includes none of the first lattice layer 21, intermediate lattice layer 31 and second lattice layer 41 on the support 11. Specifically, the second display region 10B allows light in the visible region to pass therethrough according to the optical transparency of the support 11.

It should be noted that the second display region 10B may include a layer different from the first display region 10A on the support 11. The second display region 10B may include, for example, only the first dielectric portions 22. The second display region 10B may include, for example, only a single metal layer made of the same material as the material for the first metal layer 23. The layer configuration of the second display region 10B is appropriately selected according to the requirements for an image to be presented on the second display region 10B.

Figure 8:
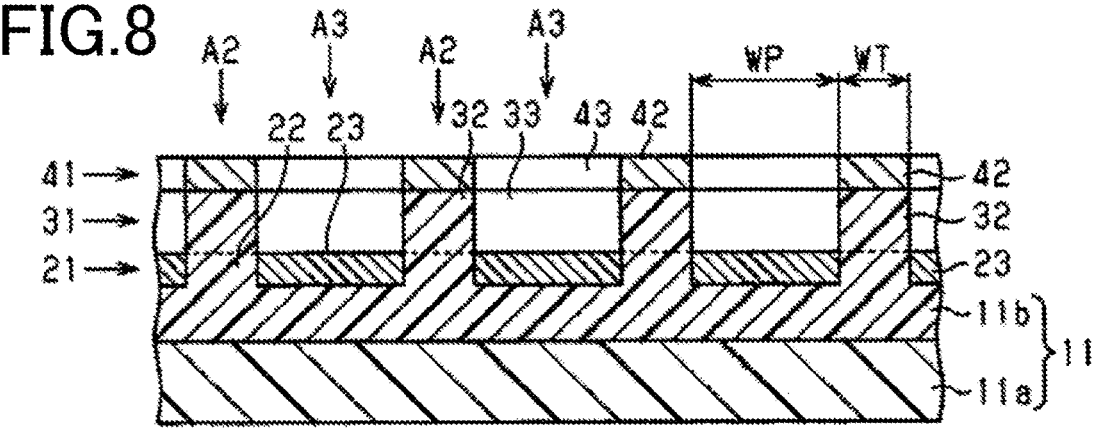
FIG. 8 is a cross-sectional view illustrating another example of a structure of the first display region according to the first embodiment.

As described above, the sectional structure of the support 11 may be a multilayer structure, and the first dielectric portions 22 do not necessarily have to have boundaries with the support 11. FIG. 8 shows a structure in which the support 11 includes two layers. Of the two layers, the front-side layer is integral with the first dielectric portions 22. Specifically, the support 11 includes a substrate 11a and an intermediate layer 11b. The intermediate layer 11b is disposed on the front side relative to the substrate 11a. The first dielectric portions 22 are projected from the intermediate layer 11b, and are integral with the intermediate layer 11b.

[Optical Configuration of Display]

Next, the optical configuration of the display will be described.

The configuration herein will be described taking an example in which the front surface 10S and the rear surface 10T of the display are in contact with respective air layers, and the second intermediate dielectric layer 33 and the second dielectric layer 43 are air layers or resin layers having a refractive index close to that of the air layers.

Figure 9:
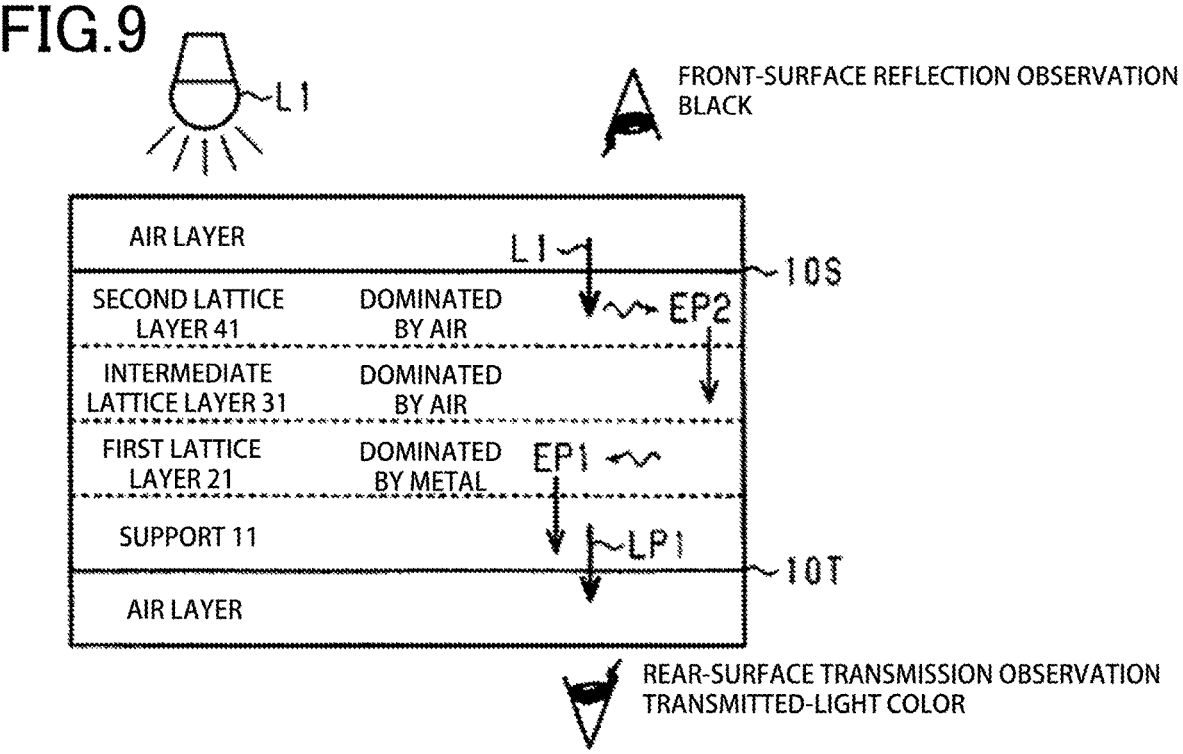
FIG. 9 is a diagram illustrating principles of operation of the display in reflection observation from the front and transmission observation from the rear, according to the first embodiment.

As shown in FIG. 9, the refractive index of the support 11 is dominated by the dielectric material and larger than the refractive index of an air layer.

The first dielectric portions 22 have a refractive index higher than that of an air layer, and the first metal layer 23 has a refractive index lower than that of an air layer. The first lattice layer 21 has a refractive index that is approximately an average of the refractive indices of the first metal layer 23 and the first dielectric portions 22. Since the ratio of the width WT of each first dielectric portion 22 to the structural period PT is in the range of 0.25 or more and 0.75 or less, the refractive index of the first lattice layer 21 is resultantly dominated by the first metal layer 23 as a sea component and is much lower than the refractive index of an air layer.

The first intermediate dielectric portions 32 have a refractive index higher than that of an air layer, and the second intermediate dielectric layer 33 has a refractive index equal to or higher than that of an air layer. The intermediate lattice layer 31 has a refractive index that is approximately an average of the refractive indices of the second intermediate dielectric layer 33 and the first intermediate dielectric portions 32. Since the ratio of the width WT of each first intermediate dielectric portion 32 to the structural period PT is in the range of 0.25 or more and 0.75 or less, the refractive index of the intermediate lattice layer 31 is resultantly dominated by the second intermediate dielectric layer 33 as a sea component and is higher than and close to the refractive index of an air layer.

The second metal portions 42 have a refractive index lower than that of an air layer, and the second dielectric layer 43 has a refractive index equal to or higher than that of air layer. The second lattice layer 41 has a refractive index that is approximately an average of the refractive indices of the second dielectric layer 43 and the second metal portions 42. Since the ratio of the width WT of each second metal portion 42 to the structural period PT is in the range of 0.25 or more and 0.75 or less, the refractive index of the second lattice layer 41 is resultantly dominated by the second intermediate dielectric layer 43 as a sea component and is lower than and is close to the refractive index of an air layer.

[Front-Surface Reflection Observation and Rear-Surface Transmission Observation]

White light L1 enters the second lattice layer 41 via an air layer from outside the display, and then enters the intermediate lattice layer 31. Since light L1 enters the second lattice layer 41 via an air layer, and since the second lattice layer 41 has a refractive index close to that of the air layer, Fresnel reflection is less likely to occur at the interface between the air layer and the second lattice layer 41. Since light enters the intermediate lattice layer 31 via the second lattice layer 41, and since the second and intermediate lattice layers 41 and 31 both have a refractive index close to that of an air layer, Fresnel reflection is also less likely to occur at the interface between the second and intermediate lattice layers 41 and 31.

Since the structural period PT of the second metal portions 42 is a sub-wavelength period that is not more than the wavelength of the visible region, plasmon resonance occurs in the second lattice layer 41. Plasmon resonance is a phenomenon in which part of light incident on the second lattice layer 41 interacts with collective vibrations of electrons. Part of the light L1 incident on the second lattice layer 41 is converted to surface plasmons by the plasmon resonance in the second lattice layer 41, and the converted surface plasmons pass through the second lattice layer 41.

The surface plasmons passing through the second lattice layer 41 emerge therefrom after being re-converted to light. Light EP2 emerging from the second lattice layer 41 due to plasmon resonance has a specific wavelength region that depends on the lattice structure including the structural period PT of the second metal portions 42 and depends on the materials of the lattice layer. Consequently, the second lattice layer 41 transmits part of the wavelength region of light incident thereon to the intermediate lattice layer 31.

Since the structural period PT of the first dielectric portions 22 is also a sub-wavelength period that is not more than the wavelength of the visible region, plasmon resonance also occurs in the first lattice layer 21. Specifically, part of light incident on the first lattice layer 21 is also converted to surface plasmons by the plasmon resonance in the first lattice layer 21, and the converted surface plasmons pass through the first lattice layer 21 and emerge therefrom after being re-converted to light. Light EP1 emerging from the first lattice layer 21 due to plasmon resonance is in a specific wavelength region that depends on the lattice structure including the structural period PT of the first dielectric portions 22 and depends on the materials of the lattice layer. Consequently, the first lattice layer 21 transmits part of the wavelength region of light incident thereon to the support 11.

Thus, in front-surface reflection observation in which light L1 is incident on the second lattice layer 41 from outside the display and the front surface 10S is observed from the front of the display, a black color or a hue close to a black color is observed in the first display region 10A due to Fresnel reflection being less likely to occur at the interfaces, coupled with plasmon resonance occurring in the lattice layers.

In rear-surface transmission observation in which light L1 is incident on the second lattice layer 41 from outside the display and the rear surface 10T is observed from the rear of the display, colored light LP1, i.e., light other than white and black light which has passed through the lattice layers while undergoing plasmon resonance therein, is observed in the first display region 10A. It should be noted that front-surface reflection observation and rear-surface transmission observation show a trend similar to the trend in the case where the intensity of external light toward the front surface 10S is higher than the intensity of external light toward the rear surface 10T.

[Rear-Surface Reflection Observation and Front-Surface Transmission Observation]

Figure 10:
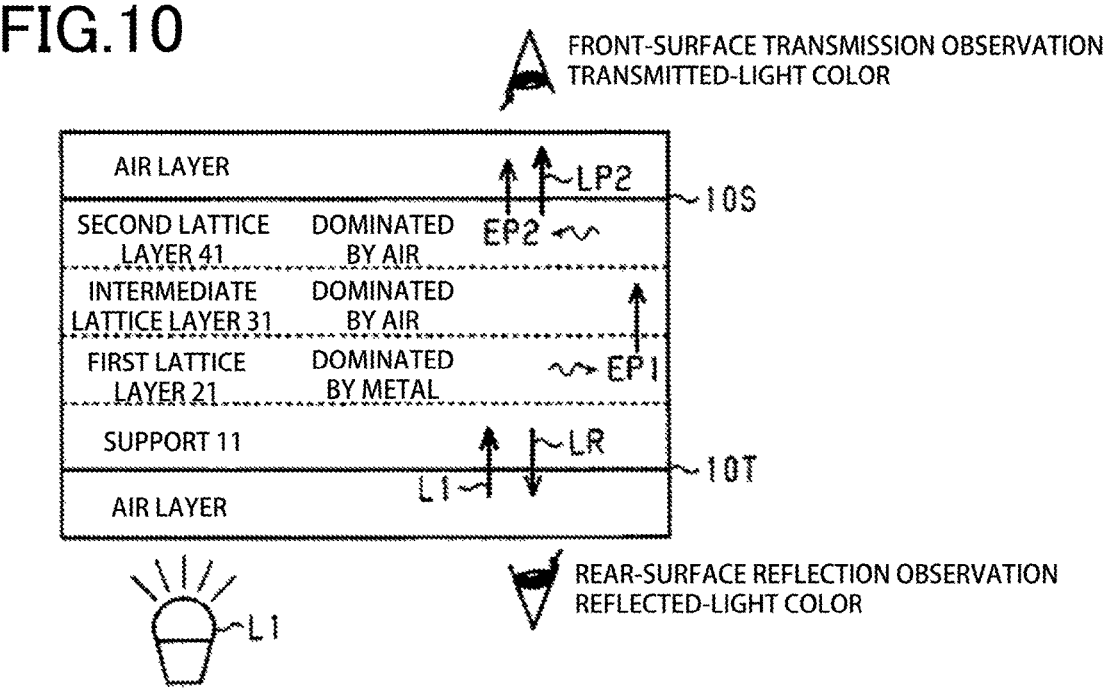
FIG. 10 is a diagram illustrating principles of operation of the display in reflection observation from the rear and transmission observation from the front according to the first embodiment.

As shown in FIG. 10, white light L1 enters the support 11 from outside the display via an air layer and then enters the first lattice layer 21. Since light L1 enters the first lattice layer 21 via the support 11, and since the support 11 has a refractive index higher than that of an air layer and the first lattice layer 21 has a refractive index lower than that of an air layer, Fresnel reflection easily occurs at the interface between the support 11 and the first lattice layer 21. It should be noted that the difference in refractive index between the support 11 and the first lattice layer 21 is larger than the difference in refractive index between the first and intermediate lattice layers 21 and 31 and is also larger than the difference in refractive index between the intermediate and second lattice layers 31 and 41.

Part of the light passing through the interface between the support 11 and the first lattice layer 21 undergoes plasmon resonance in the first lattice layer 21. Light EP1 emerging from the first lattice layer 21 due to plasmon resonance is in a specific wavelength region that depends on the lattice structure including the structural period PT of the first metal layer 23 and depends on the materials of the lattice layer. Light in this wavelength region is consumed by plasmon resonance without being reflected at the interface between the support 11 and the first lattice layer 21. Consequently, part of the wavelength region of light incident on the support 11 is reflected at the interface between the support 11 and the first lattice layer 21, and thus the first lattice layer 21 transmits part of the wavelength region of light incident thereon to the intermediate lattice layer 31.

Part of light passing through the intermediate lattice layer 31 and incident on the second lattice layer 41 also undergoes plasmon resonance in the second lattice layer 41. Light EP2 emerging from the second lattice layer 41 due to plasmon resonance is in a specific wavelength region that depends on the lattice structure including the structural period PT of the second dielectric layer 43 and depends on the materials of the lattice layer. Consequently, the second lattice layer 41 transmits part of the wavelength region of light incident thereon to an air layer.

Thus, in rear-surface reflection observation in which light L1 is incident on the support 11 from outside the display and the rear surface 10T is observed from the rear of the display, colored light LR due to Fresnel reflection at the interfaces, i.e., light LR other than white and black light, can be observed in the first display region 10A. It should be noted that such Fresnel reflection occurring at the interface between the support 11 and the first lattice layer 21 enables observation of a hue closer to black in the first display region 10A in rear-surface reflection observation.

In front-surface transmission observation in which light L1 is incident on the support 11 from outside the display and the front surface 10S is observed from the front of the display, colored light LP2 that has undergone Fresnel reflection and plasmon resonance in the lattice layers can be observed in the first display region 10A. It should be noted that front-surface transmission observation and rear-surface reflection observation show a trend similar to the trend in the case where the intensity of external light toward the rear surface 10T is higher than the intensity of external light toward the front surface 10S.

[Polarization Selectivity]

In addition to the actions described above, the display according to the first embodiment and the modification thereof provide polarization selectivity due to the difference in interval between the isolated regions A2 in the first and second directions. This will be specifically described below.

In the display according to the first embodiment, the wavelength region to be consumed by the plasmon resonance in the lattice layers 21 and 41 depends on the lattice structures of the lattice layers 21 and 41, i.e., depends on the structural periods PT2 and PT3. Specifically, in the case shown in FIG. 3, plasmon resonance absorption dependent on the structural period PT2 occurs in the first direction (X direction), and plasmon resonance absorption dependent on the structural period PT3 occurs in the second direction (Y direction). Thus, the display according to the first embodiment can be imparted with polarization selectivity by making the structural period PT different depending on the directions.

The polarization selectivity of a structure herein refers to the occurrence of two maximum plasmon resonance absorption spectra in plasmon resonance. In this case, the two plasmon resonance absorption spectra occur in relation to incident light having two polarization directions perpendicular to each other on a plane that is perpendicular to the incident light. Specifically, the polarization selectivity refers to a state in which alignments producing two absorption maximums have been respectively obtained in the structural period PT2 in one direction and the structural period PT3 in another direction which is perpendicular to the former direction, in the lattice layers 21 and 41. By controlling the structural periods PT2 and PT3 corresponding to the two directions, the difference in position of the maximum wavelengths can be controlled between the absorption spectra.

The inventors of the present invention have found that a larger structural period PT allows the wavelength causing plasmon resonance absorption to shift accordingly to a longer wavelength side. Specifically, in the case shown in FIG. 3, the plasmon resonance absorption in the Y direction of the structural period PT3 is exhibited on a longer wavelength side than is the plasmon resonance absorption exhibited in the X direction of the structural period PT2.

If the isolated regions A2 of a rectangular array forming the display receive incident light having polarization (X polarization) parallel to the short-axis direction, there occurs surface plasmon resonance corresponding to the structural period PT2 in the short-axis direction to absorb light in a wavelength region which is due to the structural period PT2 in the short-axis direction. If the isolated regions A2 of a rectangular array forming the display receive incident light having polarization (Y polarization) parallel to the long-axis direction, there occurs surface plasmon resonance corresponding to the structural period PT3 in the long-axis direction to absorb light in a wavelength region which is due to the structural period in the long-axis direction. In this case, since the structural periods PT2 and PT3 are different from each other, the X and Y polarizations are different from each other in wavelength region that causes surface plasmon resonance absorption. Thus, the effects of surface plasmon resonance absorption dependent on the polarization directions of incident light can be selectively taken out. Since the response of the display of the present invention depends on the direction of the incident polarized light, the display can exhibit effects of an optical response function or a sensor function in addition to a display function.

In the display according to the modification of the first embodiment, when adjacent isolated regions A2 have a larger interval therebetween, the wavelength causing plasmon resonance absorption shifts accordingly to a shorter wavelength side.

In the case shown in FIG. 4, the distance between adjacent isolated regions A2 in the X direction is WP5, and the distance between adjacent isolated regions A2 in the Y direction is WP6. The distance WP5 is larger than the distance WP6. Thus, the plasmon resonance absorption in the X direction in which the interval between the isolated regions A2 is larger is exhibited with a shorter wavelength than is the plasmon resonance absorption exhibited in the Y direction in which the interval between the isolated regions A2 is smaller.

In the array of the isolated regions A2 forming the display according to the modification of the first embodiment, if the isolated regions A2 receive incident light having polarization (X polarization) parallel to the direction in which the isolated regions A2 have a larger interval therebetween, there occurs surface plasmon resonance corresponding to the structural period and the interval between the isolated regions A2 in the X direction to absorb light in a wavelength region which is due to the structural period and the interval between the isolated regions A2 in the X direction. In the array of the isolated regions A2 forming the display, if the isolated regions A2 receive incident light having polarization (Y polarization) parallel to the direction in which the isolated regions A2 have a smaller interval therebetween, there occurs surface plasmon resonance corresponding to the structural period and the interval between the isolated regions A2 in the Y direction to absorb light in a wavelength region which is due to the structural period and the interval between the isolated regions A2 in the Y direction. In this case, since the interval of the isolated regions A2 is different between the X and Y directions, the X and Y polarizations are different from each other in wavelength region that causes surface plasmon resonance absorption. Thus, the display according to the modification of the first embodiment can also be imparted with polarization selectivity by making the distances (WP5 and WP6) corresponding to the two directions different from each other.

[Method of Producing Display]

Next, an example of a method of producing the display according to the modification of the first embodiment will be described.

First, first dielectric portions 22 and first intermediate dielectric portions 32 are formed on the surface of a support 11. The first dielectric portions 22 and the respective first intermediate dielectric portions 32 are integrally formed as convexities projected from the surface of the support 11. The method that can be used for forming the convexities may, for example, be photolithography using light or a charged particle beam, nanoimprinting, plasma etching, or other methods. Particularly, for example, as a method of forming convexities on the surface of a support 11 made of a resin, nanoimprinting may be used. When forming convexities by processing a substrate or the like made of a hard material, photolithography using light or a charged particle beam may be combined with plasma etching.

For example, as shown in FIG. 8, when producing a display which includes a support 11 formed of a substrate 11a and an intermediate layer 11b, a polyethylene terephthalate sheet is used first as the substrate 11a, and a UV curable resin is applied to the surface of the substrate 11a. Next, the surface of the coated film made of the UV curable resin is pressed against a surface of a synthetic quartz mold that is an intaglio plate, followed by applying UV light to the film and the mold. Subsequently, the UV-cured resin is released from the synthetic quartz mold. Thus, asperities of the intaglio plate are transferred to the resin on the surface of the substrate 11a, thereby forming convexities each including a first dielectric portion 22 and a first intermediate dielectric portion 32, and an intermediate layer 11b. It should be noted that the UV curable resin may be changed to a thermosetting resin, and the UV application may be changed to heating. Also, the UV curable resin may be changed to a thermoplastic resin, and the UV application may be changed to heating and cooling.

Next, a first metal layer 23 and second metal portions 42 are formed on the surface of the support 11 provided with the convexities. For example, the first metal layer 23 and the second metal portions 42 may be formed by vacuum deposition or sputtering. Thus, there are formed a first lattice layer 21 defined by the top face of the first metal layer 23, and a second lattice layer 41 defined by the top faces of the second metal portions 42. Also, there is formed an intermediate lattice layer 31 sandwiched between the first and second lattice layers 21 and 41.

Configuration Example of First Display Region

Figure 11:
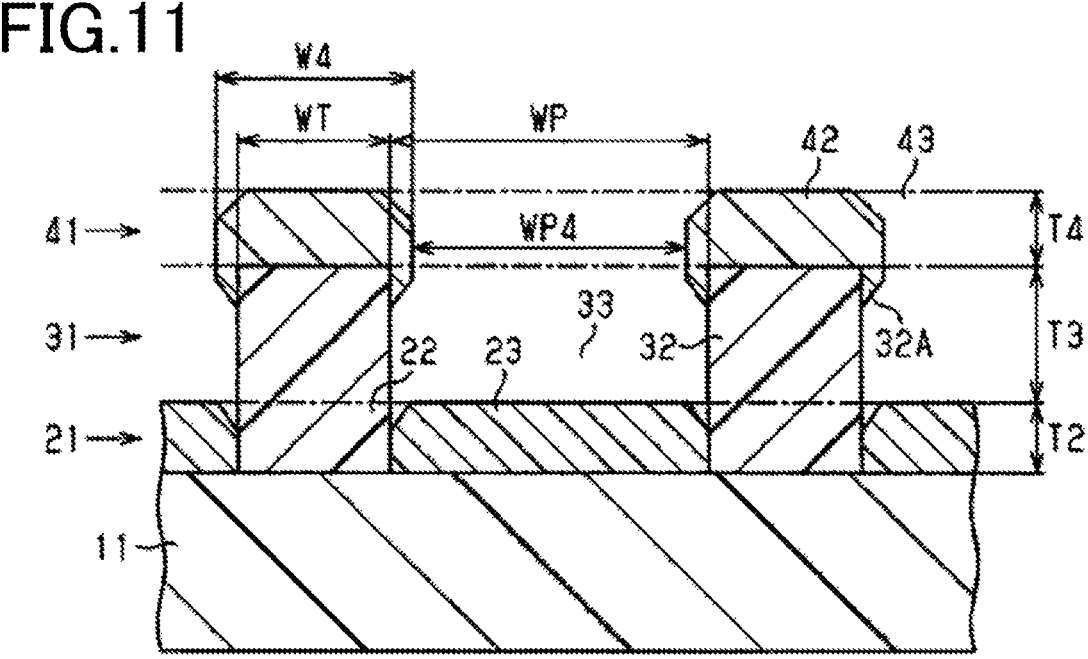
FIG. 11 is a partially enlarged cross-sectional view illustrating an example of the structure of the first display region according to the first embodiment.

As shown in FIG. 11, the first metal layer 23 has a thickness T2. As the thickness T2 increases, the intensity of light generated by Fresnel reflection increases accordingly at the interface between the first lattice layer 21 and the support 11, and the image in rear-surface reflection observation increases brightness accordingly. As the ratio of the width WT of each first dielectric portion 22 to the structural period PT decreases, the image in rear-surface reflection observation also increases brightness accordingly.

As the thickness T2 of the first metal layer 23 increases, the intensity of light transmitted from the rear surface 10T to the front surface 10S decreases accordingly, and hue in front-surface reflection observation becomes closer to black. As the ratio of the width WT of each first dielectric portion 22 to the structural period PT decreases, hue in front-surface reflection observation also becomes closer to black.

When the thickness T2 of the first metal layer 23 is 10 nm or more and the ratio of the width WT of each first dielectric portion 22 to the structural period PT is 0.75 or less, satisfactory accuracy can be achieved in each observation mentioned above, for discriminating between the front and rear of the display.

As the thickness T2 of the first metal layer 23 decreases or as the second metal portions 42 each have a smaller thickness T4, the intensity of light passing through the layer and portions increases accordingly in front- or rear-surface transmission observation. As the ratio of the width WT of each first dielectric portion 22 to the structural period PT increases, the intensity of light passing through the display increases accordingly.

When the thickness T2 of the first metal layer 23 or the thickness T4 of each second metal portion 42 is 200 nm or less and the ratio of the width WT of each first dielectric portion 22 to the structural period PT is 0.25 or more, a clear image can be observed in front- or rear-surface transmission observation.

The sum of the thickness T2 of each first dielectric portion 22 and the thickness T3 of each first intermediate dielectric portion 32 is preferred to be smaller than the structural period PT that is the sum of the width WT of each first dielectric portion 22 and the minimum interval WP. The sum of the thickness T2 of each first dielectric portion 22 and the thickness T3 of each first intermediate dielectric portion 32 is even more preferred to be smaller than half the structural period PT.

The structure as described above can contribute to enhancing the configuration accuracy of the resin structure in which the first dielectric portions 22 are respectively integrated with the first intermediate dielectric portions 32. Moreover, the convexities 11T each formed of a first dielectric portion 22 and a first intermediate dielectric portion 32 are prevented from falling on the surface of the support 11.

When the first lattice layer 21 or the second lattice layer 41 is made of a metal material having a complex dielectric constant with a negative real part in the wavelength region of visible light, plasmon resonance easily occurs in these layers. In this regard, the material for the first metal layer 23 is preferred to be a material having a complex dielectric constant with a negative real part. The material for the second metal portions 42 is also preferred to be a material having a complex dielectric constant with a negative real part.

The material for the first metal layer 23 or the second metal portions 42 may, for example, be aluminum, silver, gold, indium, tantalum, or the like.

As described in the above production method, the first metal layer 23 and the second metal portions 42 can be formed through a single process of forming a metal layer film on the support 11 on which the first dielectric portions 22 and the first intermediate dielectric portions 32 have been formed.

In this case, the metal particles sputtered from a film-forming source are deposited on the surface of the support 11 with a predetermined angular distribution. As a result, each second metal portion 42 will have a width W4 that is slightly larger than the width WT of each first intermediate dielectric portion 32, and adjacent second metal portions 42 will have a minimum interval WP4 therebetween that is slightly smaller than the minimum interval WP. In this case, the ratio of the width W4 of each second metal portion 42 to the structural period PT will be in the range of 0.25 or more and 0.75 or less. It should be noted that, in the first metal layer 23, peripheral portions of the first intermediate dielectric portions 32 are shadowed by the respective second metal portions 42 and become thinner toward the first intermediate dielectric portions 32.

Furthermore, in the structure formed through the above film-forming method, intermediate metal portions 32A, i.e., metal portions contiguous to the respective second metal portions 42, are formed on the side faces of the respective first intermediate dielectric portions 32.

Each intermediate metal portion 32A is sandwiched between the corresponding first intermediate dielectric portion 32 and the second intermediate dielectric layer 33. Each intermediate metal portion 32A forms a structure integral with the corresponding second metal portion 42 and has a thickness, on the side faces of the corresponding first intermediate dielectric portion 32, becoming smaller toward the first metal layer 23.

The intermediate metal portions 32A, which have a structural period PT corresponding to a sub-wavelength period, make the refractive index variation continuous in the thickness direction of the second lattice layer 41 or the intermediate lattice layer 31. The intermediate metal portions 32A are less likely to reflect light incident on the second lattice layer 41 from outside the display and are likely to transmit light to the intermediate lattice layer 31 or the first lattice layer 21. Therefore, in front-surface reflection observation, a color closer to black is observed in the first display region 10A. In the structure formed by the above film-forming method, the material for the first metal layer 23 is the same as the material for the second metal portions 42.

As the difference in refractive index becomes smaller between the second dielectric layer 43 and the second metal portions 42, the average refractive index of the second lattice layer 41 is likely to contribute to minimizing Fresnel reflection at the interface between the second lattice layer 41 and another layer. As the difference in refractive index becomes larger between the first dielectric portions 22 and the first metal layer 23, the average refractive index of the first lattice layer 21 is likely to contribute to promoting Fresnel reflection at the interface between the first lattice layer 21 and the support 11.

In a configuration in which the first metal layer 23 and the second metal portions 42 have the same refractive index and the difference in refractive index between the first dielectric portions 22 and the first metal layer 23 is larger than the difference in refractive index between the second dielectric portions 43 and the second metal layer 42, Fresnel reflection at the interface between the second lattice layer 41 and another layer can be minimized and Fresnel reflection at the interface between the first lattice layer 21 and another layer can be promoted.

It is preferred that the following requirements are satisfied to minimize Fresnel reflection at the interface between the second lattice layer 41 and another layer and to promote Fresnel reflection at the interface between the first lattice layer 21 and another layer. Specifically, it is preferred that the difference in refractive index between a surface layer and the second dielectric layer 43 is smaller than the difference in refractive index between the first metal layer 23 and the support 11. The surface layer in this case is a layer contacting the second dielectric layer 43 and disposed facing away from the intermediate lattice layer 31. For example, the surface layer may be an air layer. It is even more preferred that the refractive index of the second dielectric layer 43 is equal to that of the surface layer.

As described above, according to the first embodiment and the modification thereof, the advantageous effects enumerated below are obtained.

(1) In front- and rear-surface reflection observations, images having different hues can be observed in the first display region 10A. Therefore, the front and rear surfaces of the display can be discriminated from each other. Furthermore, for the items to which the display is affixed, authenticity can be easily verified, or the visual appearance can be enhanced.

(2) In front-surface reflection observation and rear-surface transmission observation as well, images having different hues can be observed in the first display region 10A. Therefore, the accuracy of discriminating between the front and rear can be enhanced. Furthermore, in rear-surface reflection observation and front-surface transmission observation as well, images having different hues can be observed in the first display region 10A. Therefore, the accuracy of discriminating between the front and rear can be enhanced.

(3) Since the structural period PT corresponds to a sub-wavelength period that is not more than the wavelength of the visible region, light in the visible region is prevented from forming primary diffracted light. Therefore, the images observed in rear-surface reflection observation and front- and rear-surface transmission observations are prevented from containing iridescent colors, allowing the images to have even more vivid hues.

(4) Since the sum of the thickness T2 of the first lattice layer 21 and the thickness T3 of the intermediate lattice layer 31 is suitable for applying an intaglio plate used such as for nanoimprinting, the first dielectric portions 22 and the respective first intermediate dielectric portions 32 can be integrally formed.

(5) Since the first dielectric portions 22 are integral with the respective first intermediate dielectric portions 32 and since the second intermediate dielectric layer 33 is integral with the second dielectric layer 43, the structure of the display can be simplified. Furthermore, if the second intermediate dielectric layer 33 and the second dielectric layer 43 are configured to form an integral air layer, the structure of the display can be simplified even more.

(6) Since the intermediate metal portions 32A have an anti-reflection function, the image observed in front-surface reflection observation can have a hue closer to black.

(7) In front- and rear-surface reflection observations and front- or rear-surface transmission observation, the first display region 10A' can have a unique hue. Therefore, for the items to which the display is affixed, accuracy of verifying authenticity can be enhanced.

(8) In front- and rear-surface reflection observations and front- or rear-surface transmission observation, the first display region 10A' can have a unique hue. Therefore, the mode of presenting an image by the display can be made even more complicated and the visual appearance presented by the display can be enhanced.

(9) The display can provide polarization selectivity due to the difference in interval between the isolated regions A2 in the first direction and the isolated regions A2 in the second direction. Therefore, by adjusting the intervals between the isolated regions A2, the display can exhibit effects of an optical response function or a sensor function in addition to a display function.

<Modifications>

The display according to the first embodiment and the modification thereof may be modified and implemented as follows.

[Intermediate Lattice Layer 31]

The first intermediate dielectric portions 32 and the second intermediate dielectric layer 33 can be implemented with separate members. In this case, the second intermediate dielectric layer 33 is preferred to be a resin layer having a refractive index that is closer to that of an air layer than to that of the first intermediate dielectric portions 32.

The second intermediate dielectric layer 33 and the second dielectric layer 43 can be implemented with separate members. In this case, the second intermediate dielectric layer 33 is preferred to be a resin layer having a refractive index that is closer to that of an air layer than to that of the second dielectric layer 43.

[First Lattice Layer 21]

Figure 12:
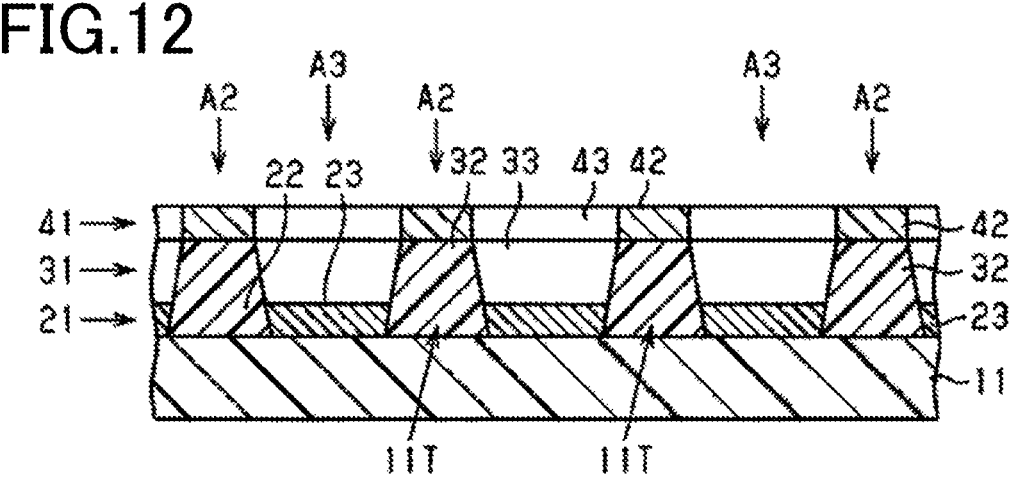
FIG. 12 is a partially enlarged cross-sectional view illustrating a structure of the first display region according to a modification of the first embodiment.

As shown in FIG. 12, each first dielectric portion 22 and the corresponding first intermediate dielectric portion 32 are configured as an integral structure. The convexities 11T, each being an integral structure, may be specifically implemented with cones projected from the surface of the support 11. Such structures enable smooth release of an intaglio plate used when forming the first dielectric portions 22 and the first intermediate dielectric portions 32.

[Second Display Region 10B]

Figure 13:
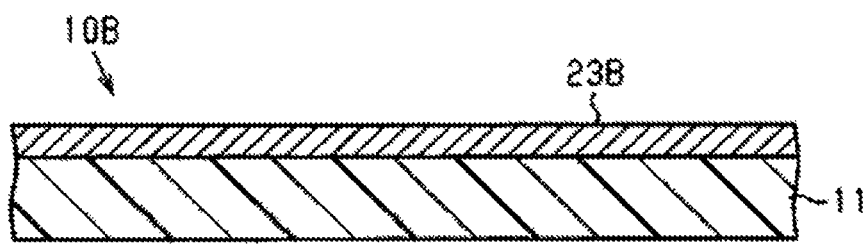
FIG. 13 is a partially enlarged cross-sectional view illustrating a structure of the second display region according to a modification of the first embodiment.

As shown in FIG. 13, the second display region 10B can be implemented with a configuration including only a metal layer 23B on the surface of the support 11. In this case, front-surface reflection observation presents an image having a black color or a hue close to black in the first display region 10A, and presents an image having a metallic gloss in the second display region 10B. Furthermore, rear-surface reflection observation presents a colored image in the first display region 10A, which is based on light due to Fresnel reflection at the interface between the first lattice layer 21 and the support 11, i.e., light affected by the wavelength region to be consumed by plasmon resonance in the first lattice layer 21, and presents an image in the second display region 10B, which has a metallic gloss affected by only light due to Fresnel reflection at the interface between the metal layer 23B and the support 11.

[Protective Layer]

The display further includes a protective layer on the second metal portions 42. In this case, the intensity of Fresnel reflection at the interface between the protective layer and the second metal portions 42, and the wavelength selectivity in the display depend on the refractive index of the protective layer. In this regard, the material for the protective layer may be appropriately selected based on the wavelength region to be selected by the display.

Figure 14:
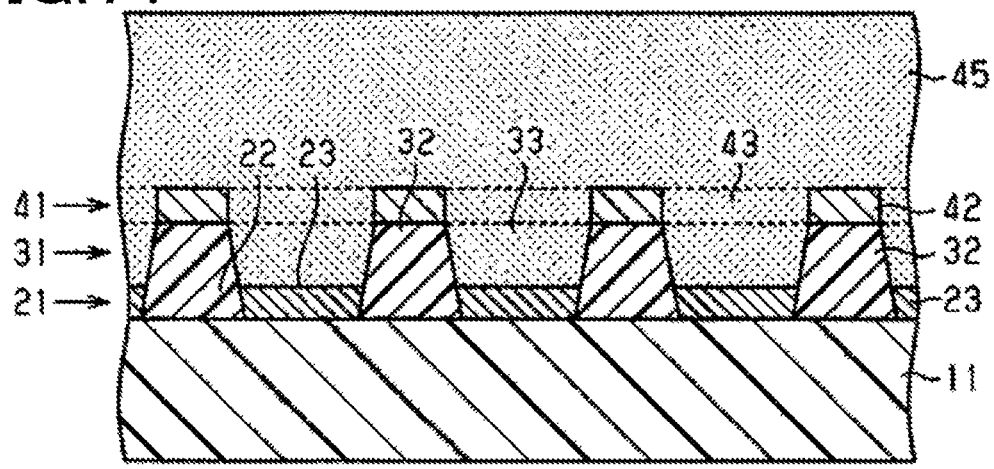
FIG. 14 is a partially enlarged cross-sectional view illustrating the structure of the first display region according to a modification of the first embodiment.

As shown in FIG. 14, a protective layer 45 can be structured integrally with the second dielectric layer 43 and the second intermediate dielectric layer 33. In this case, the protective layer 45 is preferred to be a resin layer with a low refractive index. The resin layer with a low refractive index has a refractive index closer to that of an air layer than to that of the first dielectric portions 22 or the first intermediate dielectric portions 32.

The isolated regions A2 as viewed in a direction perpendicular to the front surface 10S of the display may only have to have a two-dimensional lattice array without being limited to square, hexagonal and rectangular arrays, as long as the interval between the isolated regions A2 arranged in the first direction is different from the interval between the isolated regions A2 arranged in the second direction intersecting the first direction. Specifically, the first dielectric portions 22 may be arranged in a two-dimensional lattice form, the first intermediate dielectric portions 32 may be arranged in a two-dimensional lattice form, and the second metal portions 42 may be arranged in a two-dimensional lattice form. In other words, the periodic elements of the periodic structure may only have to be arranged in a two-dimensional lattice form having a sub-wavelength period, with the interval between the periodic elements being made different between the first and second directions. The two-dimensional lattice array refers to an array in which elements are arranged in two directions intersecting with each other in a two-dimensional plane. In this case, the ratio of the width WT to the structural period PT refers to a ratio of the width WT to the structural period PT in one direction. If it is mentioned that this ratio is within a predetermined range, it means that the ratio of the width WT to the structural period PT is within a predetermined range in each of the two directions in which the periodic elements are arranged.

The shape of each isolated region A2 as viewed in a direction perpendicular to the front surface 10S of the display, i.e., the shape of each periodic element in plan view, is not limited to a square or rectangle but may be other polygons, or may be a circle.

As long as the display has a structure of generating plasmon resonance in the first and second lattice layers 21 and 41, transmitted light passing through the display becomes light in a specific wavelength region according to the structural period PT. Even when Fresnel reflection occurs at the interface between the second lattice layer 41 and another layer and a colored image different from a black color is observed in the first display region 10A in front-surface reflection observation, the wavelength region to be consumed by the plasmon resonance is not included in reflected light. Therefore, the images observed in front-surface reflection observation and rear-surface transmission observation have hues different from each other. Similarly, the images observed in rear-surface reflection observation and front-surface transmission observation will have different hues. Thus, images with different hues can be observed in front- and rear-surface observations of the display, i.e., images with different appearances can be observed depending on the observation conditions. Therefore, in the items to which the display is affixed, difficulty of counterfeiting can be increased or the visual appearance can be enhanced. For example, the ratio of the width WT of each first dielectric portion 22 to the structural period PT and the ratio of the width WT of each second metal portion 42 to the structural period PT may be different from the range of 0.25 or more and 0.75 or less. Also, for example, the thickness relationship between the first, intermediate and second lattice layers 21, 31 and 41 may be different from the thickness relationship shown in the embodiment described above.

Second Embodiment

Referring to FIGS. 15 to 18, a second embodiment of a display, a device with a display, and a method of producing a display will be described. The following description is focused on differences of the second embodiment from the first embodiment, and therefore like components of the first embodiment are designated with like reference signs to omit the explanation.

[Structure of Display]

Figure 15:
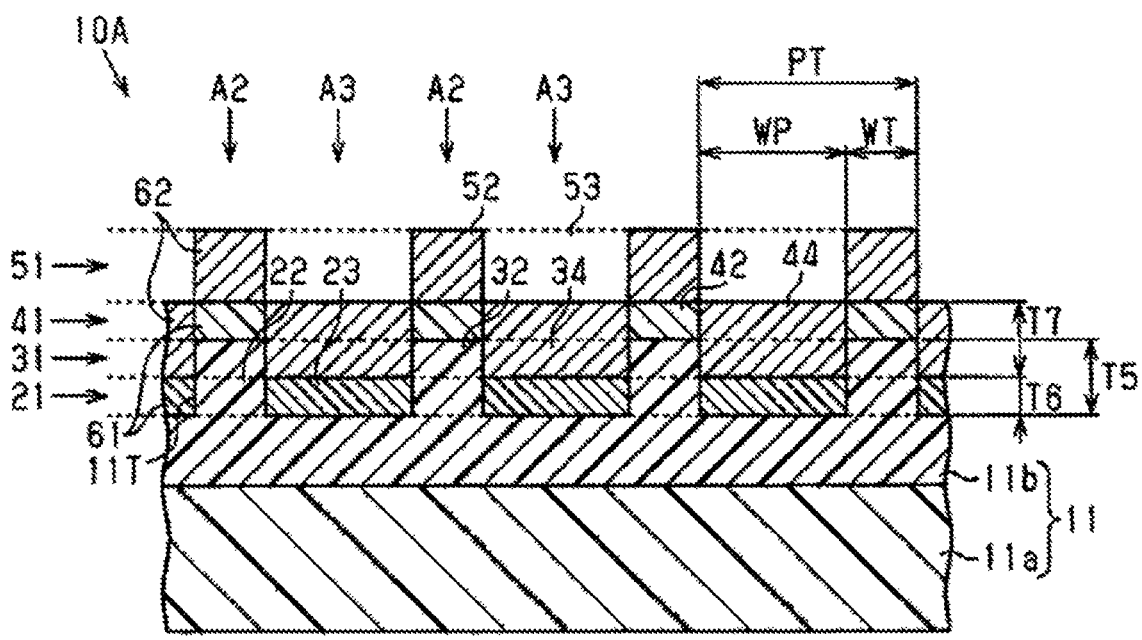
FIG. 15 is a cross-sectional view illustrating a structure of a first display region taken along the line of FIG. 2, according to the second embodiment of the display.

FIG. 15 shows a display including a first display region 10A which includes an upper lattice layer 51, in addition to the support 11, the first lattice layer 21, the intermediate lattice layer 31 and the second lattice layer 41. The first, intermediate, second and upper lattice layers 21, 31, 41 and 51 are arranged in this order on the surface of the support 11. Specifically, the second lattice layer 41 is sandwiched between the intermediate and upper lattice layers 31 and 51. The support 11 has a configuration as in the first embodiment. FIG. 15 shows the support 11 including a substrate 11a and an intermediate layer 11b. When the support 11 includes a substrate 11a and an intermediate layer 11b, the material for the substrate 11a is preferred to have a refractive index close to that of the material for the intermediate layer 11b. The substrate 11a and the intermediate layer 11b may each have a refractive index higher than that of an air layer, e.g., a refractive index in the range of 1.2 or more and 1.7 or less.

[First Lattice Layer 21]

The first lattice layer 21 includes a plurality of first dielectric portions 22 and a single first metal layer 23. The first dielectric portions 22 are disposed in the respective isolated regions A2 as viewed in a direction perpendicular to the front surface 10S of the display. The single first metal layer 23 is disposed in the peripheral region A3 as viewed in a direction perpendicular to the front surface 10S. The plurality of first dielectric portions 22 are arranged in a two-dimensional lattice form over the front surface 10S. The first dielectric portions 22 are structures projected from the surface of the support 11. The first dielectric portions 22 may be integral with the support 11 or may be formed as members separate from the support 11. As viewed in a direction perpendicular to the front surface 10S, the structural period PT, i.e., a positioning period of the first dielectric portions 22, is a sub-wavelength period, which is not more than the wavelength of the visible region. As viewed in a direction perpendicular to the front surface 10S, the first metal layer 23 is a structure having a mesh pattern surrounding the individual first dielectric portions 22. The first metal layer 23 is formed separately from the support 11. In the first lattice layer 21, the first metal layer 23 corresponds structurally and optically to a sea component, and the first dielectric portions 22 correspond structurally and optically to island components.

[Intermediate Lattice Layer 31]

The intermediate lattice layer 31 includes a plurality of first intermediate dielectric portions 32 and a single second intermediate dielectric layer 34. The first intermediate dielectric portions 32 are disposed in the respective isolated regions A2 as viewed in a direction perpendicular to the front surface 10S. The single second intermediate dielectric layer 34 is disposed in the peripheral region A3 as viewed in a direction perpendicular to the front surface 10S. The plurality of first intermediate dielectric portions 32 are arranged in a two-dimensional lattice form across the front surface 10S. The first intermediate dielectric portions 32 are structures projected from the respective first dielectric portions 22. The first intermediate dielectric portions 32 may be integral with the respective first dielectric portions 22, or may be formed as members separate from the first dielectric portions 22. As viewed in a direction perpendicular to the front surface 10S, the positioning period of the first intermediate dielectric portions 32 corresponds to the structural period PT. As viewed in a direction perpendicular to the front surface 10S, the second intermediate dielectric layer 34 is a structure having a mesh pattern surrounding the individual first intermediate dielectric portions 32. The second intermediate dielectric layer 34 is a member separate from the first metal layer 23. In the intermediate lattice layer 31, the second intermediate dielectric layer 34 corresponds structurally and optically to a sea component, and the first intermediate dielectric portions 32 correspond structurally and optically to island components.

[Second Lattice Layer 41]

The second lattice layer 41 includes a plurality of second metal portions 42 and a single second dielectric layer 44. As viewed in a direction perpendicular to the front surface 10S, the second metal portions 42 are disposed in the respective isolated regions A2. The single second dielectric layer 44 is disposed in the peripheral region A3 as viewed in a direction perpendicular to the front surface 10S. The plurality of second metal portions 42 are arranged in a two-dimensional lattice form over the front surface 10S. The second metal portions 42 each form a structure together with the corresponding one of the first intermediate dielectric portions 32, with the former being overlaid on top of the latter. The second metal portions 42 are formed as members separate from the first intermediate dielectric portions 32. As viewed in a direction perpendicular to the front surface 10S, the positioning period of the second metal portions 42 corresponds to the structural period PT. As viewed in a direction perpendicular to the front surface 10S, the second dielectric layer 44 is a structure having a mesh pattern surrounding the individual second metal portions 42. The second dielectric layer 44 may be integrated with the second intermediate dielectric layer 34 or may be formed as a separate member. In the second lattice layer 41, the second dielectric layer 44 corresponds structurally and optically to a sea component, and the second metal portions 42 correspond structurally and optically to island components.

[Upper Lattice Layer 51]

The upper lattice layer 51 includes a plurality of first upper dielectric portions 52 and a single second upper dielectric layer 53. As viewed in a direction perpendicular to the front surface 10S, the first upper dielectric portions 52 are disposed in the respective isolated regions A2. As viewed in a direction perpendicular to the front surface 10S, the single second upper dielectric layer 53 is disposed in the peripheral region A3. The plurality of first upper dielectric portions 52 are arranged in a two-dimensional lattice form over the front surface 10S.

Figure 16:
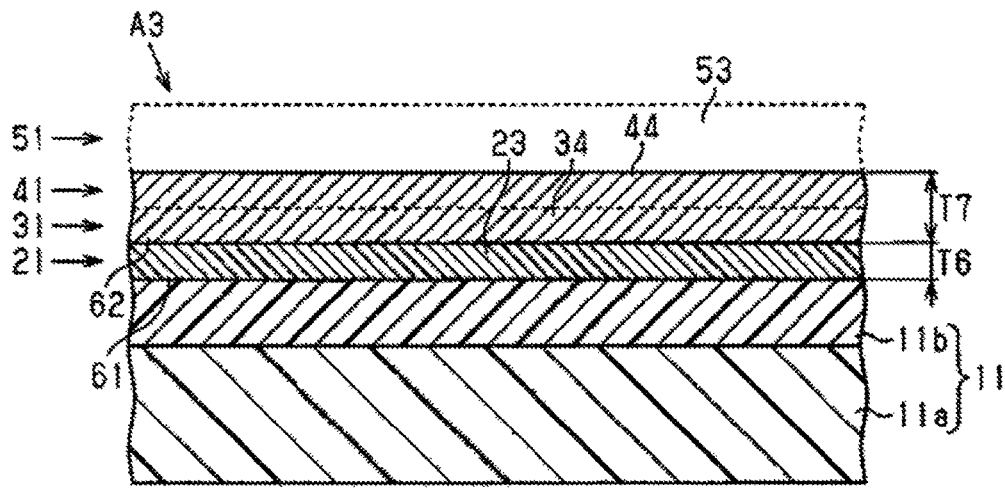
FIG. 16 is a cross-sectional view illustrating a structure of a first display region taken along the line IV-IV of FIG. 2, according to the second embodiment.

The first upper dielectric portions 52 each form a structure together with the corresponding one of the second metal portions 42, with the former being overlaid on top of the latter. The first upper dielectric portions 52 are formed as members separate from the second metal portions 42. As viewed in a direction perpendicular to the front surface 10S, the positioning period of the first upper dielectric portions 52 corresponds to the structural period PT. As viewed in a direction perpendicular to the front surface 10S, the second upper dielectric layer 53 has a mesh pattern surrounding the individual first upper dielectric portions 52. The second upper dielectric layer 53 is formed as a member separate from the second dielectric layer 44. In the upper lattice layer 51, the second upper dielectric layer 53 corresponds structurally and optically to a sea component, and the first upper dielectric portions 52 correspond structurally and optically to island components. As shown in FIG. 16, in the peripheral region A3, the first metal layer 23 of the first lattice layer 21, the second intermediate dielectric layer 34 of the intermediate lattice layer 31, the second dielectric layer 44 of the second lattice layer 41 and the second upper dielectric layer 53 of the upper lattice layer 51 are disposed in this order from the support 11.

[Materials for Lattice Layers]

The first dielectric layer 22 and the first intermediate dielectric layer 32 are each made of a dielectric material, e.g., a resin such as a photocurable resin or an inorganic material such as quartz. The first dielectric portions 22 and the first intermediate dielectric portions 32 both have a refractive index higher than that of an air layer, e.g., a refractive index in the range of 1.2 or more and 1.7 or less. For example, the intermediate layer 11b of the substrate 11a, the first dielectric portions 22 and the first intermediate dielectric portions 32 form an integral structure and are made of the same material. The first metal layer 23 and the second metal portions 42 are made of a metal material. The material for the first metal layer 23 and the second metal portions 42 is preferred to be a material having a complex dielectric constant with a negative real part in the wavelength of the visible region. For example, the material is preferred to be aluminum, silver, gold, indium, tantalum or the like. For example, the first metal layer 23 and the second metal portions 42 may be made of the same material.

The second intermediate dielectric layer 34, the second dielectric layer 44 and the first upper dielectric portions 52 are transparent dielectric materials allowing light in the visible region to pass therethrough. Preferably, the second intermediate dielectric layer 34, the second dielectric layer 44 and the first upper dielectric portions 52 may be made of an inorganic compound such as silicon dioxide ($SiO_2$), aluminum oxide ($Al_2O_3$), tantalum oxide ($Ta_2O_5$), niobium oxide ($Nb_2O_5$), zirconium dioxide ($ZrO_2$), titanium dioxide ($TiO_2$), magnesium fluoride ($MgF_2$), calcium fluoride ($CaF_2$) or the like. However, the second intermediate dielectric layer 34, the second dielectric layer 44 and the first upper dielectric portions 52 may be made of an organic compound. The second intermediate dielectric layer 34, the second dielectric layer 44 and the first upper dielectric portions 52 may have a refractive index higher than that of an air layer, e.g., a refractive index in the range of 1.3 or more and 3.0 or less.

For example, the second intermediate dielectric layer 34 and the second dielectric layer 44 may form an integral structure, and the second intermediate dielectric layer 34, the second dielectric layer 44 and the first upper dielectric portions 52 may be made of the same material.

The second upper dielectric layer 53 is a transparent dielectric material allowing light in the visible region to pass therethrough, i.e., an air layer, or a resin layer having a refractive index close to that of an air layer. The second upper dielectric layer 53 has a refractive index lower than those of the first upper dielectric portions 52 and the second dielectric layer 44.

In the plane including the isolated regions A2 and the peripheral region A3, the area ratio of the isolated regions A2 per unit area is smaller than 0.5. Specifically, the volume ratio of the first metal layer 23 in the first lattice layer 21 is larger than that of the first dielectric portions 22 in the first lattice layer 21. The volume ratio of the second intermediate dielectric layer 34 in the intermediate lattice layer 31 is larger than that of the first intermediate dielectric portions 32 in the intermediate lattice layer 31.

The volume ratio of the second dielectric layer 44 in the second lattice layer 41 is larger than that of the second metal portions 42 in the second lattice layer 41. The volume ratio of the second upper dielectric layer 53 in the upper lattice layer 51 is larger than that of the first upper dielectric portions 52 in the upper lattice layer 51.

In the configuration described above, the structures each including a first dielectric portion 22 and a first intermediate dielectric portion 32 are an example of the periodic elements. These structures correspond to the convexities 11T projected from the surface of the support 11 as a reference plane. The structure including the support 11, the first dielectric portions 22 and the first intermediate dielectric portions 32 is an example of the periodic structure. The layer including the first metal layer 23 and the second metal portions 42 is disposed on the surface of the periodic structure and is regarded to be a metal layer 61 having a profile the entirety of which conforms to the surface profile of the periodic structure. The surface of the periodic structure includes the region of the reference plane surrounding the individual periodic elements and the surfaces of the periodic elements.

The layer including the second intermediate dielectric layer 34, the second dielectric layer 44 and the first upper dielectric portions 52 is disposed on the surface of the metal layer 61 facing away from the surface contacting the periodic structure and is regarded to be a dielectric layer 62 having a profile the entirety of which conforms to the surface profile of the metal layer 61.

[Method of Producing Display]

Next, an example of a method of producing a display according to a second embodiment will be described.

The support 11, the first dielectric portions 22, the first intermediate dielectric portions 32, the first metal layer 23 and the second metal portions 42 are formed as in the first embodiment. Specifically, the first dielectric portions 22 and the respective first intermediate dielectric portions 32 are integrally formed as the convexities 11T projected from the surface of the support 11. The method that can be used for forming the convexities 11T may, for example, be photolithography using light or a charged particle beam, nanoimprinting, plasma etching, or the like. In particular, for example, nanoimprinting may be used as a method of forming the convexities 11T on the surface of the support 11 made of a resin. In the case of forming the convexities 11T by processing a substrate made of a hard material, photolithography using light or a charged particle beam may be used in combination with plasma etching.

Next, a metal layer 61 is formed on the surface of the support 11, on which the convexities 11T have been formed, by vacuum deposition, sputtering, or the like. The metal layer 61 is formed so as to have a profile conforming to the surface profile of the periodic structure which is formed of the support 11 and the convexities 11T. Thus, the first metal layer 23 and the second metal portions 42 are formed.

Next, a dielectric layer 62 is formed on the surface of the structure on which the metal layer 61 has been formed. For example, the dielectric layer 62 may be formed by vacuum deposition or sputtering. The dielectric layer 62 is formed conforming to the surface profile of the metal layer 61. Thus, the second intermediate dielectric layer 34, the second dielectric layer 44 and the first upper dielectric portions 52 are formed.

Through the production method described above, there are formed a first lattice layer 21 defined by the top surface of the first metal layer 23, and an intermediate lattice layer 31 defined by the top surface of the first intermediate dielectric layer 32, i.e., the top surfaces of the convexities 11T. Furthermore, there are formed a second lattice layer 41 defined by the top surfaces of the second metal portions 42, and an upper lattice layer 51 defined by the top surfaces of the first upper dielectric portions 52.

[Optical Effects of Display]

Figure 17:
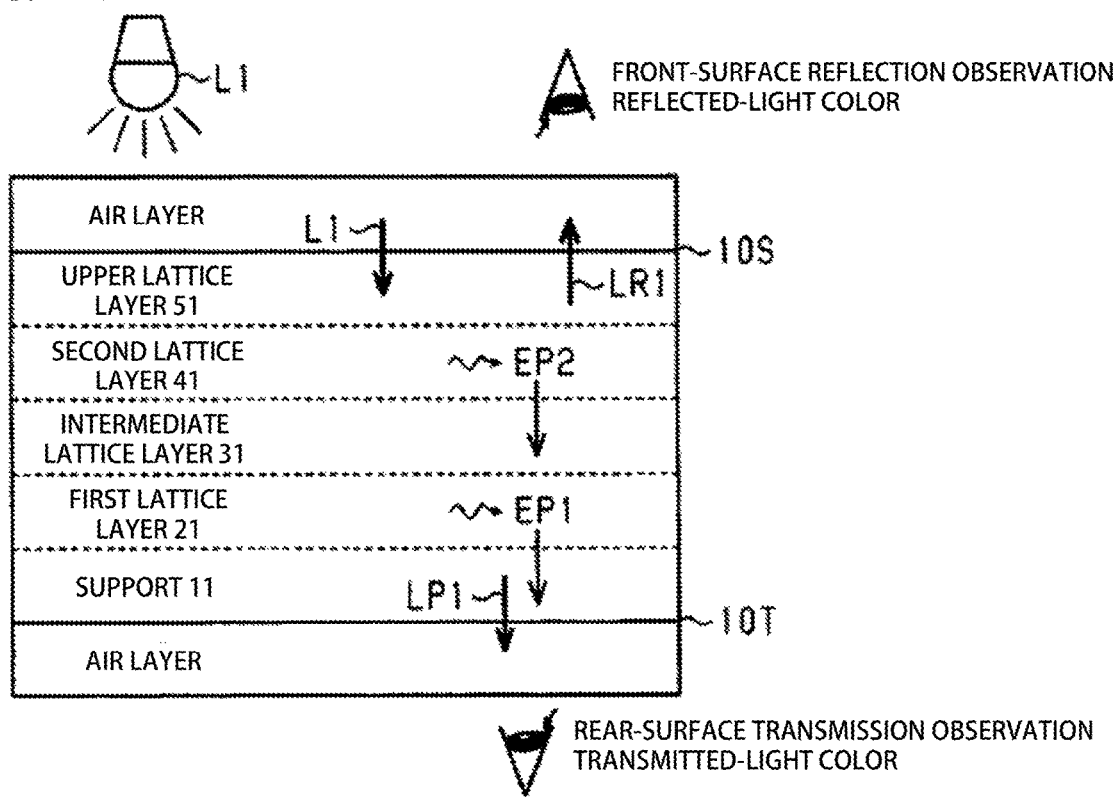
FIG. 17 is a diagram illustrating principles of operation of the display in reflection observation from the front and transmission observation from the rear, according to the second embodiment.

Referring to FIG. 17, optical configuration and effects of the display of the second embodiment will be described.

As shown in FIG. 17, white light L1 enters the upper lattice layer 51 from outside the display via an air layer. The upper lattice layer 51 has a refractive index that is approximately an average of the refractive indices of the first upper dielectric portions 52 and the second upper dielectric layer 53. Specifically, the refractive index of the upper lattice layer 51 is dominated by the second upper dielectric layer 53 as a sea component and is close to that of the air layer. Since light L1 enters, via the air layer, into the upper lattice layer 51 having a refractive index close to that of the air layer, Fresnel reflection is less likely to occur at the interface between the air layer and the upper lattice layer 51. Thus, reflection at the interface between the air layer and the upper lattice layer 51 is minimized, and the light incident on the upper lattice layer 51 is transmitted therethrough to the second lattice layer 41.

The second lattice layer 41 has a refractive index that is approximately an average of the refractive indices of the second metal portions 42 and the second dielectric layer 44. Specifically, the refractive index of the second lattice layer 41 is dominated by the second dielectric layer 44 as a sea component and is higher than that of the air layer. The second lattice layer 41 has a lattice structure made of metal and a dielectric material and the structural period PT of the second metal portions 42 is a sub-wavelength period. Therefore, plasmon resonance occurs in the second lattice layer 41. Accordingly, part of light that has reached the second lattice layer 41 is reflected at the interface between the upper lattice layer 51 and the second lattice layer 41, and part of light that has reached the second lattice layer 41 is transmitted therethrough after being converted to surface plasmons. Light EP2 in the wavelength region to be consumed by plasmon resonance is not reflected at the interface between the upper lattice layer 51 and the second lattice layer 41.

The intermediate lattice layer 31 has a refractive index that is approximately an average of the refractive indices of the first intermediate dielectric portions 32 and the second intermediate dielectric portions 34. Specifically, the refractive index of the intermediate lattice layer 31 is dominated by the second intermediate dielectric layer 34 as a sea component. Since the first intermediate dielectric portions 32 and the second intermediate dielectric layer 34 are made of a transparent dielectric material allowing light in the visible region to pass therethrough, the intermediate lattice layer 31 has high transmittivity of visible light. Depending on the difference in refractive index between the second and intermediate lattice layers 41 and 31, part of the light that has reached the intermediate lattice layer 31 is reflected at the interface between the second and intermediate lattice layers 41 and 31.

The first lattice layer 21 has a refractive index that is approximately an average of the refractive indices of the first dielectric portions 22 and the first metal layer 23. Specifically, the refractive index of the first lattice layer 21 is dominated by the first metal layer 23 as a sea component. The first lattice layer 21 has a lattice structure made of metal and a dielectric material and the structural period PT of the first dielectric portions 22 is a sub-wavelength period. Therefore, plasmon resonance occurs in the first lattice layer 21. Accordingly, part of the light that has reached the first lattice layer 21 is reflected at the interface between the intermediate and first lattice layers 31 and 21, and part of the light that has reached the first lattice layer 21 is transmitted therethrough after being converted to surface plasmons. Light EP1 in the wavelength region to be consumed by plasmon resonance is not reflected at the interface between the intermediate and first lattice layers 31 and 21.

Part of light passing through the first lattice layer 21 may be reflected at the interface between the first lattice layer 21 and the support 11, at the interface between the intermediate layer 11b and the substrate 11a or at the interface between the support 11 and an air layer. Part of the light LP1 that has passed through the first lattice layer 21 passes through the support 11 and emerges from the rear of the display.

Thus, when white light L1 is incident on the display from outside, light LP1 in a specific wavelength region emerges from the rear of the display. The light LP1 in this case includes the light resulting from re-conversion of the surface plasmons that have passed through the first and second lattice layers 21 and 41, and the light that has passed through all the layers. Thus, in rear-surface transmission observation in which light L1 is incident on the upper lattice layer 51 from outside the display and the rear surface 10T is observed from the rear of the display, a colored hue different from black or white is observed in the first display region 10A.

The light reflected at the interfaces between the layers emerges from the front of the display and causes interference due to the differences between the optical paths of the light. As a result, when white light L1 is incident on the display from outside thereof, light LR1 in a specific wavelength region, on which plasmon resonance and light interference have acted, emerges from the front of the display. As described above, plasmon resonance occurs due to light in a specific wavelength region in each of the first and second lattice layers 21 and 41. Therefore, the wavelength region passing through the lattice layers 21 and 41, after being consumed by plasmon resonance therein, is different from the wavelength region reflected at the interfaces of the lattice layers 21 and 41 with other layers without being consumed by plasmon resonance. Accordingly, in front-surface reflection observation in which light L1 is incident on the upper lattice layer 51 from outside the display and the front surface 10S is observed from the front of the display, a hue different from the hue observed in rear-surface transmission observation, i.e., a colored hue different from black and white, is observed in the first display region 10A.

When white light is incident on the support 11 from outside the display, plasmon resonance similarly occurs in the first and second lattice layers 21 and 41. Then, light in a specific wavelength region emerges from the front of the display. The light in this case includes light resulting from re-conversion of the surface plasmons that have passed through the first and second lattice layers 21 and 41, and light that has passed through all the layers. When white light is incident on the support 11 from outside the display, light in a specific wavelength region, on which plasmon resonance and light interference have acted, emerges from the rear of the display as light reflected at the interfaces between layers.

Accordingly, when light is incident on the support 11 from outside the display, a colored hue different from white and black is observed in the first display region 10A. The colored hue in this case is different between front-surface transmission observation in which the front surface 10S is observed from the front of the display and rear-surface reflection observation in which the rear surface 10T is observed from the rear of the display.

In the plane including the isolated regions A2 and the peripheral region A3, the area ratio of the isolated regions A2 is less than 0.5. Due to this, of the first and second lattice layers 21 and 41 in which plasmon resonance occurs, the first lattice layer 21 becomes a layer dominated by the first metal layer 23 and the second lattice layer 41 becomes a layer dominated by the second dielectric layer 44. Due to such a structural difference, the wavelength region to be consumed by plasmon resonance is different between the first and second lattice layers 21 and 41. Also, light reflectance at the interface of the first lattice layer 21 and another layer is different from the light reflectance at the interface between the second lattice layer 41 and another layer. The difference in optical characteristics between the first and second lattice layers 21 and 41 becomes more pronounced as the area ratio of the isolated regions A2 decreases.

Light incident on the display from the front arrives earlier to the second lattice layer 41 than to the first lattice layer 21 and is significantly optically affected by the second lattice layer 41. Light incident on the display from the rear arrives earlier to the first lattice layer 21 than to the second lattice layer 41 and is significantly optically affected by the first lattice layer 21. As a result, there is a significant difference in hue of reflected light between the case where light is incident on the display from the front and the case where light is incident on the display from the rear. Specifically, the image observed in the first display region 10A has a hue that is different between front- and rear-surface reflection observations. It should be noted that images having similar hues are observed in front- and rear-surface transmission observations.

Furthermore, the wavelength region to be consumed by plasmon resonance in the lattice layers 21 and 41 depends on the structures of the lattice layers 21 and 41, i.e., depends on the structural period PT, the thicknesses of the lattice layers 21 and 41 or the width WT of each of the first dielectric portions 22 and the second metal portions 42, and also depends on the materials of the lattice layers 21 and 41, i.e., depends on the material of the metal layer 61, or depends on the refractive indices of the material of the convexities 11T and the material of the dielectric layer 62. Accordingly, for example, the color observed in reflection observation or transmission observation can be controlled by suitably selecting the material for the first dielectric portions 22 in the first lattice layer 21 and the material for the second dielectric layer 44 in the second lattice layer 41.

For example, a comparison may be made between two displays. Specifically, the two displays have the same structural period PT, use the same materials for the convexities 11T and the metal layer 61, but use different materials for the dielectric layer 62. In other words, between the two displays, the first lattice layers 21 have the same configuration, the materials for the first intermediate dielectric portions 32 in the intermediate lattice layers 31 are the same, and the materials for the second metal portions 42 in the second lattice layers 41 are the same. However, between the two displays, the materials for the second intermediate dielectric layers 34 in the intermediate lattice layers 31 are different, the materials for the second dielectric layers 44 in the second lattice layers 41 are different, and the materials for the first upper dielectric portions 52 in the upper lattice layers 51 are different. When light is applied to the two displays from the rear, hues observed in rear-surface reflection observation are not greatly different between the two displays due to the first lattice layers 21 having the same configuration. However, when light is applied to the two displays from the front, hues observed in front-surface reflection observation are different between the two displays, according to the refractive indices of the second dielectric layers 44 of the respective displays. Moreover, since the two displays have different configurations for the intermediate lattice layers 31, the second lattice layers 41 and the upper lattice layers 51, the wavelength region passing through these layers is different between the two displays. Accordingly, hues observed in front-surface reflection observation are different between the two displays, and hues observed in rear-surface transmission observation are also different between the two displays.

Configuration Examples of Lattice Layers

Preferred specific configuration examples of the lattice layers will be described.

As shown in FIGS. 15 and 16, the convexities 11T each have a height, i.e., a thickness T5, corresponding to the total thickness of the first lattice layer 21 and the intermediate lattice layer 31. The thickness T5 is preferred to be smaller than half the structural period PT, from the perspectives of the convexities 11T being less likely to fall over, enhancing durability of the structure formed of the support 11 and the convexities 11T, and easily obtaining high processing accuracy for the convexities 11T. Furthermore, the thickness T5 is even more preferred to be in the range of 50 nm or more and 200 nm or less, from the perspective of allowing hues observed in reflection and transmission observations to be vivid under plasmon resonance or light interference.

The metal layer 61 has a thickness T6 corresponding to the thickness of the first metal layer 23 or each second metal portion 42. The thickness T6 is preferred to be 10 nm or more, from the perspectives of ease of plasmon resonance to occur and allowing hue observed in reflection observation to be vivid. If the thickness T6 is equal to or larger than the thickness T5, the convexities 11T are embedded in the metal layer 61, and the intermediate lattice layer 31 disappears. If there is no intermediate lattice layer 31, as long as the metal layer 61 is formed, with the first and second lattice layers 21 and 41 having a profile conforming to the surface profile of the structure formed of the support 11 and the convexities 11T, there may arise a difference in hue between front- and rear-surface reflection observations due to plasmon resonance, and may also arise a difference in hue between these reflection observations and transmission observation. However, the metal layer 61 is preferred to be thin to an extent of not embedding the convexities 11T, from the perspectives of light transmission being enhanced in the display and the image in transmission observation being made clear. Accordingly, the thickness T6 of the metal layer 61 is preferred to be smaller than the thickness T5, i.e., the height of each convexity 11T.

It should be noted that, depending on the method of producing the metal layer 61, the metal layer 61 may be different in thickness between the region on each convexity 11T, i.e., each second metal portion 42, and the region between adjacent convexities 11T, i.e., the first metal layer 23. In the present embodiment, the thickness T6 of the metal layer 61 is defined as a thickness of the metal layer 61 at the widthwise center of a region extending in a band, i.e., a region where no convexities 11T are present in one direction, in the peripheral region A3.

The dielectric layer 62 has a thickness T7 corresponding to the total thickness of the second intermediate dielectric layer 34 and the second dielectric layer 44 and also corresponding to the thickness of each upper dielectric portion 52. The thickness T7 of the dielectric layer 62 is preferred to be larger than the thickness T5, i.e., the height, of the convexities 11T. It should be noted that when the dielectric layer 62 is projected more than the metal layer 61 disposed on the convexities 11T in the region between adjacent convexities 11T, part of the second upper dielectric layer 53 in the upper lattice layer 51 is formed of the dielectric layer 62.

When the thickness T7 is larger than the thickness T5, the entirety of each metal portion 42 in its thickness direction is enclosed by the dielectric layer 62 in the second lattice layer 41. Therefore, plasmon resonance is likely to occur in the second lattice layer 41 and change of material for the dielectric portions 62 is likely to affect the wavelength region to be consumed by plasmon resonance in the second lattice layer 41. Furthermore, since the structure formed of the support 11, the convexities 11T and the metal layer 61 is embedded in the dielectric layer 62, the dielectric layer 62 functions as a protective layer for the structure.

Even when the thickness T7 is smaller than the thickness T5, plasmon resonance will occur in the layer having a lattice structure of metal and dielectric material, and there may arise a difference in hue between reflection and transmission observations due to plasmon resonance.

When the thickness T7 of the dielectric layer 62 is small and the dielectric layer 62 located in the region between adjacent convexities 11T is recessed more than the metal layer 61 disposed on the convexities 11T, part or the entirety of the second dielectric layer 44 of the second lattice layer 41 may be made of the same material as that of the second upper dielectric layer 53 of the upper lattice layer 51. Specifically, in this case, part or the entirety of the second dielectric layer 44 may be an air layer or a resin layer. In this case, however, the second dielectric layer 44 is preferred to be a structure contiguous from the second intermediate dielectric layer 34 as mentioned above, and the thickness T7 of the dielectric layer 62 is preferred to be larger than the thickness T5, i.e., the height, of the convexities 11T.

Depending on the method of producing the dielectric layer 62, the dielectric layer 62 may be different in thickness between the region on each convexity 11T, i.e., each first upper dielectric portion 52, and the region between adjacent convexities 11T, i.e., the second intermediate dielectric layer 34 and the second dielectric layer 44. In the present embodiment, the thickness T7 of the dielectric layer 62 is defined as a thickness of the dielectric layer 62 at the widthwise center of a region extending in a band, i.e., a region where no convexities 11T are present in one direction, in the peripheral region A3.

In the plane including the isolated regions A2 and the peripheral region A3, the area ratio of the isolated regions A2, i.e., the area ratio of the convexities 11T per unit area in the plane including the reference plane and the convexities 11T, is preferred to be more than 0.1. When the area ratio is more than 0.1, the aspect ratio that is a height-to-width ratio of each convexity 11T is prevented from becoming excessively large. Thus, durability of the structure formed of the support 11 and the convexities 11T is enhanced and high processing accuracy is easily obtained for the convexities 11T.

When the area ratio is less than 0.5, the occurrence of Fresnel reflection is favorably minimized at the interface between the upper lattice layer 51 and the upper layer thereof. It should be noted that, depending on the method of producing the metal layer 61 or the dielectric layer 62, the materials of these layers, when formed, may adhere to the side faces of the convexities 11T. When the area ratio is less than 0.5, the area of the region between adjacent convexities 11T is sufficiently ensured, and thus the region between the convexities 11T is prevented from being filled with the materials adhered to the side faces of the convexities 11T when forming the metal layer 61 or the dielectric layer 62. Accordingly, the metal layer 61 and the dielectric layer 62 are easily formed with a profile conforming to the surface profile of the underlayer. Consequently, the upper lattice layer 51 where the first upper dielectric portions 52 are scattered is favorably formed, and the effect of minimizing Fresnel reflection at the interface with the upper lattice layer 51 can be favorably obtained.

If the area ratio is 0.5 or more, the effect of minimizing Fresnel reflection may be exerted more than in the case where the surface of the dielectric layer 62 is flat, as long as the surface of the dielectric layer 62 has asperities conforming to the surface profile of the metal layer 61. Even when Fresnel reflection occurs at the interface between the upper lattice layer 51 and an upper layer thereof, there may arise a difference in hue between front- and rear-surface reflection observations due to plasmon resonance in the first and second lattice layers 21 and 41, and there may also arise a difference in hue between these reflection observations and transmission observation. In this regard, however, due to minimization of Fresnel reflection at the interface between the upper lattice layer 51 and an upper layer thereof, i.e., in the vicinity of the outermost surface of the display, colors according to the wavelength region of reflected light at the interfaces between the layers inside the display may be easily vividly observed in front-surface reflection observation.

To minimize Fresnel reflection at the front, in particular, of the display, it is preferred that the difference in refractive index between a surface layer, which is in contact with the surface of the second upper dielectric layer 53 facing away from the second lattice layer 41, and the second upper dielectric layer 53 is preferred to be smaller than the difference in refractive index between the first metal layer 23 and the support 11. For example, the surface layer may be an air layer. It is even more preferred that the refractive index of the second dielectric layer 53 is equal to that of the surface layer.

As in the first embodiment, the second display region 10B may include only the support 11 or may include at least one of the metal layer 61 and the dielectric layer 62 in addition to the support 11. In reflection or transmission observation, the second display region 10B presents an image having a hue or a texture according to the layer configuration of the second display region 10B, i.e., an image having a hue or a texture different from those of the first display region 10A.

[Device with Display]

Figure 18:
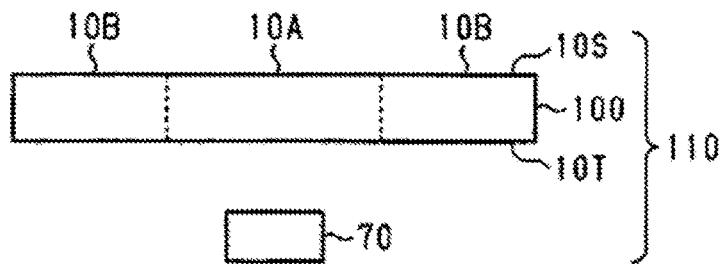
FIG. 18 is a diagram illustrating a configuration of a device with the display according to the second embodiment.

Referring to FIG. 18, a configuration of a device with the above display will be described.

As shown in FIG. 18, a device 110 with a display (simply termed device 110 hereinafter) includes a display 100 that is the display according to the second embodiment and a light emergence structure 70 configured to discharge light. The light emergence structure 70 discharges light by reflecting light applied thereto, or discharges light by producing luminescence by itself. For example, the light emergence structure 70 is a structure that appears to be white under white light.

The light emergence structure 70 is arranged facing part of the rear surface 10T of the display 100 with a distance therebetween. Specifically, as viewed in a direction perpendicular to the front surface 10S of the display 100, the front surface 10S includes regions overlapped with and not overlapped with the light emergence structure 70. More specifically, the light emergence structure 70 is arranged facing part of the first display region 10A.

According to such a configuration, when white light is applied from outside the device 110 toward the front surface 10S of the display 100, a hue due to light reflected from the display 100 is observed, as in front-surface reflection observation, at the portion of the first display region 10A of the display 100 where the light emergence structure 70 is not located at the rear.

At the portion of the first display region 10A of the display 100 where the light emergence structure 70 is located at the rear, light is applied from the light emergence structure 70 toward the rear surface 10T of the display 100. If the light emergence structure 70 is of the type that allows light to emerge by reflecting light applied thereto, the light applied to the rear surface 10T may be the light that has passed through the display 100 and has been reflected by the light emergence structure 70, or may be the light that has been applied to the light emergence structure 70 from a nearby light source and has been reflected by the light emergence structure 70. If the light emergence structure 70 is of the type that allows light to emerge by producing luminescence by itself, light applied to the rear surface 10T is the light that has been produced by luminescence of the light emergence structure 70. Accordingly, as viewed in a direction perpendicular to the front of the display 100, the hue observed in the portion of the first display region 10A overlapped with the light emergence structure 70 is produced by the light applied to the display 100 from the front and reflected by the display 100 and the light applied to the display 100 from the rear and passed through the display 100.

As a result, when the front surface 10S is observed from the front of the display 100 in a state in which white light is applied to the front surface 10S of the display 100 from outside the device 110, the portion overlapped with the light emergence structure 70 and the portion not overlapped with the light emergence structure 70 in the first display region 10A respectively appear to have colors with different hues, or appear to have colors with different chroma levels or brightness levels. Accordingly, since the image observed is in accord with the shape of the light emergence structure 70, a variety of images can be expressed.

Furthermore, visibility of an image can be controlled by switching on or off the light applied to the light emergence structure 70 or by switching on or off the luminescence of the light emergence structure 70, so that the image in accord with the shape of the light emergence structure 70 can be seen or cannot be seen. In this way, a larger variety of images can be expressed.

It should be noted that the light emergence structure 70 may be arranged facing part of the front surface 10S of the display 100. In this case, when the rear surface 10T is observed from the rear of the display 100 in a state in which white light is applied to the rear surface 10T of the display 100 from outside the device 110, the portion overlapped with the light emergence structure 70 and the portion not overlapped with the light emergence structure 70 in the first display region 10A respectively appear to have different hues.

As described above, according to the second embodiment, the following advantageous effects can be obtained in addition to the advantageous effects (1) to (3) and (7) to (9) of the first embodiment.

(10) Since the display includes the dielectric layer 62, change of the material for the dielectric layer 62 enables control of hue observed in reflection or transmission observation and enhances the degree of freedom of controlling hue. In particular, in a mode in which the dielectric layer 62 is made of an inorganic material, the refractive index of the dielectric layer 62 can be selected from a wide range. Since the dielectric layer 62 has a profile conforming to the surface profile of the metal layer 61, Fresnel reflection near the outermost surface of the display can be minimized compared to the case where the dielectric layer 62 has a flat surface. Consequently, a vivid hue is observed in front-surface reflection observation.

(11) When the thickness T5, i.e., the height of the convexities 11T, is smaller than half the structural period PT, the structure including the support 11 and the convexities 11T is enhanced in durability, and high processing accuracy is easily obtained for the convexities 11T.

(12) When the thickness T6 of the metal layer 61 is 10 nm or more, plasmon resonance is likely to occur in the first and second lattice layers 21 and 41, and a vivid hue is observed in reflection observation. When the thickness T6 of the metal layer 61 is smaller than the thickness T5, i.e., the height of the convexities 11T, light transmission of the display is enhanced, and a clear image is observed in transmission observation.

(13) When the thickness T7 of the dielectric layer 62 is larger than the thickness T5, i.e., the height of the convexities 11T, plasmon resonance is likely to occur in the second lattice layer 41, and change of the material for the dielectric layer 62 is likely to affect the wavelength region to be consumed by plasmon resonance in the second lattice layer 41. Furthermore, since the structure including the support 11, the convexities 11T and the metal layer 61 is embedded in the dielectric layer 62, the structure is protected by the dielectric layer 62.

(14) When the area ratio of the convexities 11T per unit area is more than 0.1 in the plane including the reference plane, i.e., the surface of the support 11, and the convexities 11T as periodic elements, the structure including the support 11 and the convexities 11T is enhanced in durability, and high processing accuracy is easily obtained for the convexities 11T. Furthermore, when the area ratio is less than 0.5, an advantageous effect of minimizing the occurrence of Fresnel reflection is favorably achieved at the interface between the upper lattice layer 51 and an upper layer thereof.

(15) In the device 110, part of the light discharged from the light emergence structure 70 passes through the first display region 10A of the display 100 and emerges from the surface of the first display region 10A facing away from the light emergence structure 70. Accordingly, when light is applied to the front surface 10S or the rear surface 10T from the light emergence structure 70, and the surface facing away from the light-applied surface is observed, the portion overlapped with the light emergence structure 70 and the portion not overlapped with the light emergence structure 70 in the first display region 10A appear to have colors different from each other. Therefore, an image in accord with the shape of the light emergence structure 70 can be observed, and thus a wide variety of images can be expressed, thereby increasing difficulty of counterfeiting or enhancing the visual appearance in the device 110.

(16) A nanoimprinting method can be used for forming the convexities 11T. Specifically, in this method, the periodic structure including the support 11 and a plurality of convexities 11T is formed by transferring the asperities of an intaglio plate to a resin that has been applied to the surface of the substrate 11a. When such a method is used, a periodic structure having micro-asperities can be easily and favorably formed.

Modifications of Second Embodiment

The second embodiment may be modified and implemented as follows.

In the second embodiment as well, the first and second metal layers 23 and 42 can have profile characteristics shown in FIG. 11, as in the first embodiment. The metal layer 61 may include intermediate metal portions 32A each being located on the side faces of the corresponding one of the first intermediate dielectric portions 32 and contiguous to corresponding one of the second metal portions 42. The intermediate metal portions 32A are each sandwiched between the corresponding one of the first intermediate dielectric portions 32 and the second intermediate dielectric layer 34, and each have a thickness, on the side faces of the corresponding one of the first intermediate dielectric portions 32, becoming smaller toward the first metal layer 23. It should be noted that plasmon resonance may also occur in the intermediate lattice layer 31 due to the presence of the intermediate metal portions 32A.

In the second embodiment as well, the convexities 11T may each have a conical shape projected from the surface of the support 11 as in the structure of the first embodiment shown in FIG. 12.

The display may have a first display region 10A including a plurality of types of regions having the same structural period PT. In this case, of the materials forming the display, only the materials forming the respective dielectric layers 62 are different from each other. With this configuration, the plurality of types of regions in the first display region 10A can be observed as having different hues in reflection observation. The display can be easily produced because the convexities 11T and the metal layer 61 can be formed through the same procedure for the plurality of types of regions.

Figure 19:
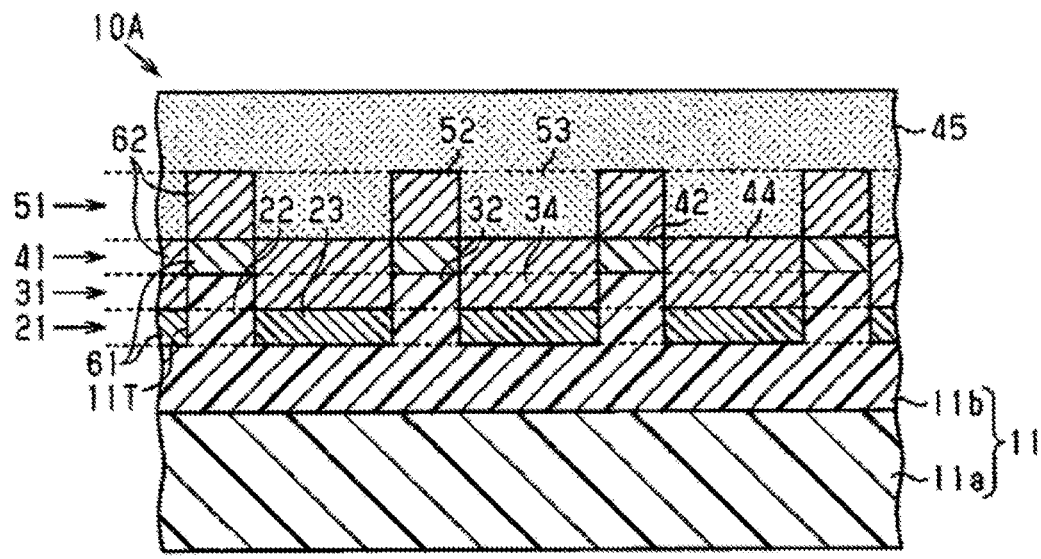
FIG. 19 is a partially enlarged cross-sectional view illustrating a structure of a first display region according to a modification of the second embodiment.

As shown in FIG. 19, the display may further include a protective layer 45 on the dielectric layer 62. With this configuration, the structure including the support 11 and the convexities 11T, the metal layer 61 and the dielectric layers 62 can be protected. The protective layer 45 can be structured integrally with the second upper dielectric layer 53. In this case, the protective layer 45 is preferred to be a resin layer with a low refractive index. The resin layer with a low refractive index has a refractive index closer to that of an air layer than to that of the first dielectric portions 22 or the first intermediate dielectric portions 32.

When the display is used by being touched with one's bare hands, the protective layer 45 forming the surface of the display is preferred to be made of a resin containing fluorine. With this configuration, smudges, such as of sebum, are prevented from adhering to the surface of the display.

It should be noted that, the protective layer 45 may have a flat surface as shown in FIG. 19, or may have a profile conforming to the surface profile of the dielectric layer 62.

The isolated regions A2 as viewed in a direction perpendicular to the front surface 10S of the display may only have to have a two-dimensional lattice array without being limited to square, hexagonal and rectangular arrays, as long as the interval between the isolated regions A2 arranged in the first direction is different from the interval between the isolated regions A2 arranged in the second direction intersecting the first direction. Specifically, the plurality of first dielectric portions 22 may be arranged in a two-dimensional lattice form, and the plurality of first intermediate dielectric portions 32 may also be arranged in a two-dimensional lattice form. Furthermore, the plurality of second metal portions 42 may be arranged in a two-dimensional lattice form, and the plurality of first upper dielectric portions 52 may be arranged in a two-dimensional lattice form. In other words, the periodic elements of the periodic structure may only have to be arranged in a two-dimensional lattice form having a sub-wavelength period, with the interval between the isolated regions A2 being made different between the first and second directions. The two-dimensional lattice array refers to an array in which elements are arranged in two directions intersecting with each other in a two-dimensional plane. In this case, the thickness of each layer of the display being within a predetermined range relative to the structural period PT refers to the thickness of each layer being within a predetermined range relative to the structural period PT in each of the two directions in which the periodic elements are arranged.

The shape of each isolated region A2 as viewed in a direction perpendicular to the front surface 10S of the display, i.e., the shape of each periodic element in plan view, is not limited to a square or rectangle but may be other polygons, or may be a circle.

Figure 20:
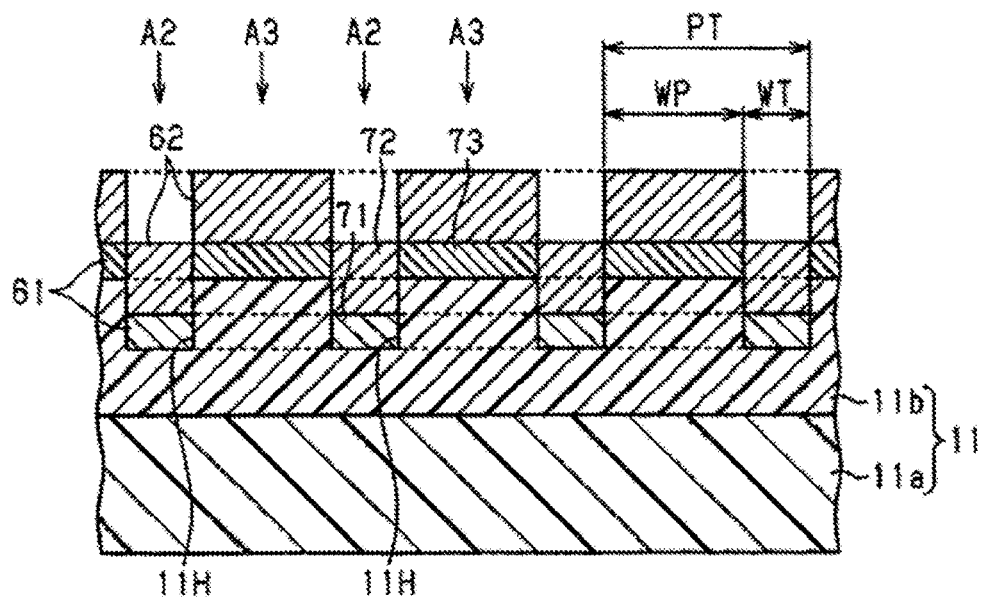
FIG. 20 is a partially enlarged cross-sectional view illustrating a structure of a first display region according to a modification of the second embodiment.

As shown in FIG. 20, the isolated regions A2 may respectively include concavities 11H recessed from the surface of the support 11. As viewed in a direction perpendicular to the front surface 10S of the display, the plurality of concavities 11H are arranged in a two-dimensional lattice form having a sub-wavelength period. With this configuration, the support 11 serves as a periodic structure. Specifically, the periodic elements of the periodic structure may be the concavities 11H recessed from a reference plane when the surface of the support 11 is taken to be the reference plane. In this case as well, the metal layer 61 has a profile conforming to the surface profile of the periodic structure, and the dielectric layer 62 has a profile conforming to the surface profile of the metal layer 61. In this case, a lattice structure made of metal and a dielectric material is formed by metal portions 71 disposed at the bottoms of the respective concavities 11H and a mesh-like portion of the support 11 enclosing the individual metal portions 71. A lattice structure made of metal and a dielectric material is also formed by dielectric portions 72 disposed on the respective metal portions 71, and a mesh-like metal layer 73 disposed on the reference plane and enclosing the individual dielectric portions 72. When light is applied to the display, plasmon resonance occurs in these layers each having a lattice structure. Due to this, as in the above embodiment, hue is different between front-surface reflection observation and rear-surface transmission observation, between rear-surface reflection observation and front-surface transmission observation, and between front- and rear-surface reflection observations.

When the periodic elements are the concavities 11H, the area ratio of the periodic elements per unit area in the plane including the reference plane and the periodic elements is preferred to be larger than 0.1 and less than 0.5. When the area ratio is within the above range, the metal layer 61 and the dielectric layer 62 may be easily formed conforming to the asperities of the surface of the periodic structure. When the area ratio is within the above range, durability of the periodic structure may be enhanced and high processing accuracy may be easily obtained for the concavities 11H. In the display of the first embodiment as well, the periodic elements may be the concavities 11H recessed from the reference plane.

In the device with a display, the display may be the display of the first embodiment.

Examples

The display described above and a method of producing the display will be described by way of a specific example.

First, a mold was prepared as an intaglio plate for use in photo-nanoimprinting. Specifically, a film of chromium (Cr) was formed by sputtering on a surface of a synthetic quartz substrate having a thickness of 10 nm, followed by forming an electron beam resist pattern on the Cr film by electron beam lithography. The resist used was of a positive type and had a thickness of 150 nm. In the pattern formed, squares each having sides of 160 nm were arranged in a rectangular array in a square region having sides of 1 cm. In the rectangular array, the structural period PT2 was 320 nm and the structural period PT3 was 350 nm. The regions drawn with an electron beam was on the inside of the square region.

Next, the Cr film in the region exposed from the resist was etched by plasma generated by applying high frequency wave to a mixed gas of chlorine and oxygen. Subsequently, the synthetic quartz substrate in the region exposed from the resist and the Cr film was etched by plasma generated by applying high frequency to ethane hexafluoride gas. The etched synthetic quartz substrate had a depth of 100 nm. The residual resist and the Cr film were removed to obtain a mold with asperities formed thereon. A mold release agent, Optool HD-1100 (manufactured by Daikin Industries Ltd.), was applied onto the surface of the mold.

Next, a UV curable resin was applied onto the surface of the mold on which the pattern had been formed. Then, the surface of the mold was covered with a polyethylene terephthalate film having one surface subjected to adhesion enhancing treatment, so that the adhesion enhancement-treated surface faced the mold. Furthermore, the UV curable resin was spread by using a roller so that the UV curable resin was spread out over the entire region of the mold on which the pattern had been formed. Then, UV light was applied to the mold to cure the UV curable resin, followed by removing the polyethylene terephthalate film from the mold. In this way, a pattern of convexities arranged in a hexagonal array was formed on the surface of the UV curable resin, thereby obtaining a periodic structure that was a laminate of a layer made of the UV curable resin and a substrate formed of the polyethylene terephthalate film. The cured UV curable resin had a refractive index of 1.52.

Next, an aluminum (Al) film with a thickness of 50 nm was formed on the surface of the periodic structure by vacuum deposition to form a metal layer. Furthermore, a film of silicon dioxide ($SiO_2$) with a thickness of 150 nm was formed on the surface of the metal layer to form a dielectric layer. Thus, a display of the example was obtained. The display of this example corresponds to the display of the second embodiment. The dielectric layer-side of the substrate corresponds to the front of the display, and the substrate-side of the dielectric layer corresponds to the rear of the display.

When the display of the example was observed by applying white light thereto, a blue color close to black was observed in front-surface reflection observation, a violet color was observed in rear-surface reflection observation, and an orange color was observed in front- and rear-surface transmission observations, in the region where the pattern of convexities was formed. In the region where the pattern of convexities was not formed, a color having metallic gloss was observed as light reflected from the metal layer made of aluminum.

Third Embodiment

A display according to a third embodiment of the invention will be specifically described referring to the drawings. It should be noted that the display may be used for the purpose of increasing difficulty of counterfeiting items or for the purpose of enhancing the visual appearance of items, or may be used for both purposes. For the purpose of increasing difficulty of counterfeiting items, the display may be affixed, for example, to verification documents such as passports or licenses, securities such as gift tickets or checks, cards such as credit cards or cash cards, paper currency, or other items. For the purpose of enhancing the visual appearance of items, the display may be affixed, for example, to wearable ornaments, items carried by users, stationary items such as furniture or electrical appliances, structures such as walls or doors, or the like.

Figure 21:
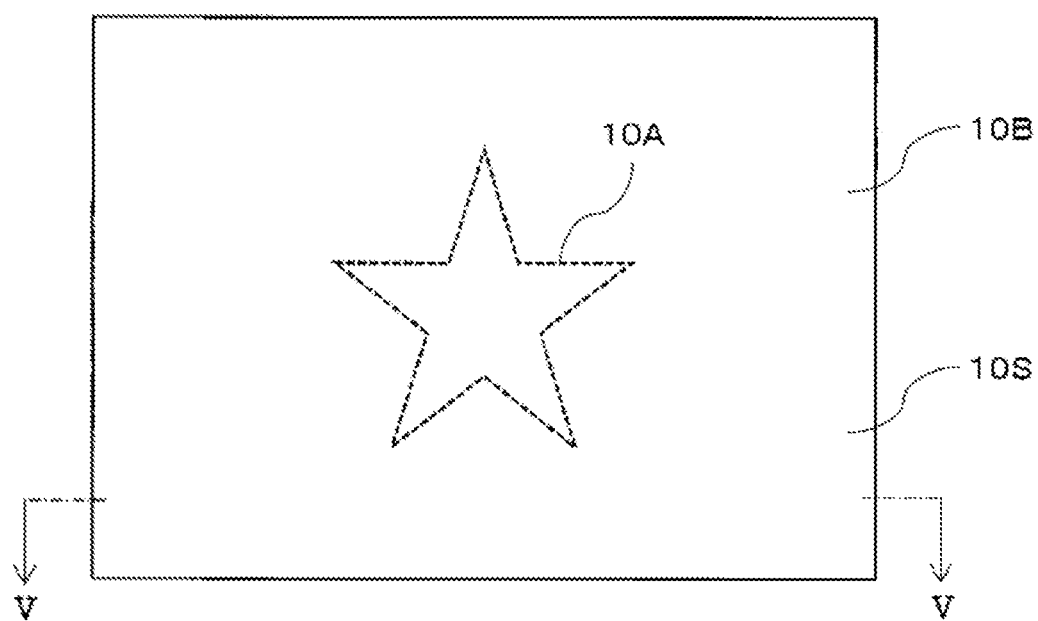
FIG. 21 is a plan view illustrating a structure of a display according to a third embodiment of the present invention.

As shown in FIG. 21, the display has a front surface 10S in which a first display region 10A and a second display region 10B are defined. The first display region 10A has a cross-sectional structure which is different from that of the second display region 10B. In the front surface 10S, the first display region 10A is used for drawing a character, a figure, a symbol, a pattern or a picture. For example, in FIG. 21, a star-shaped figure is provided in this region.

[Structure of Display]

First, the configuration of the first display region 10A will be described.

Figure 22:
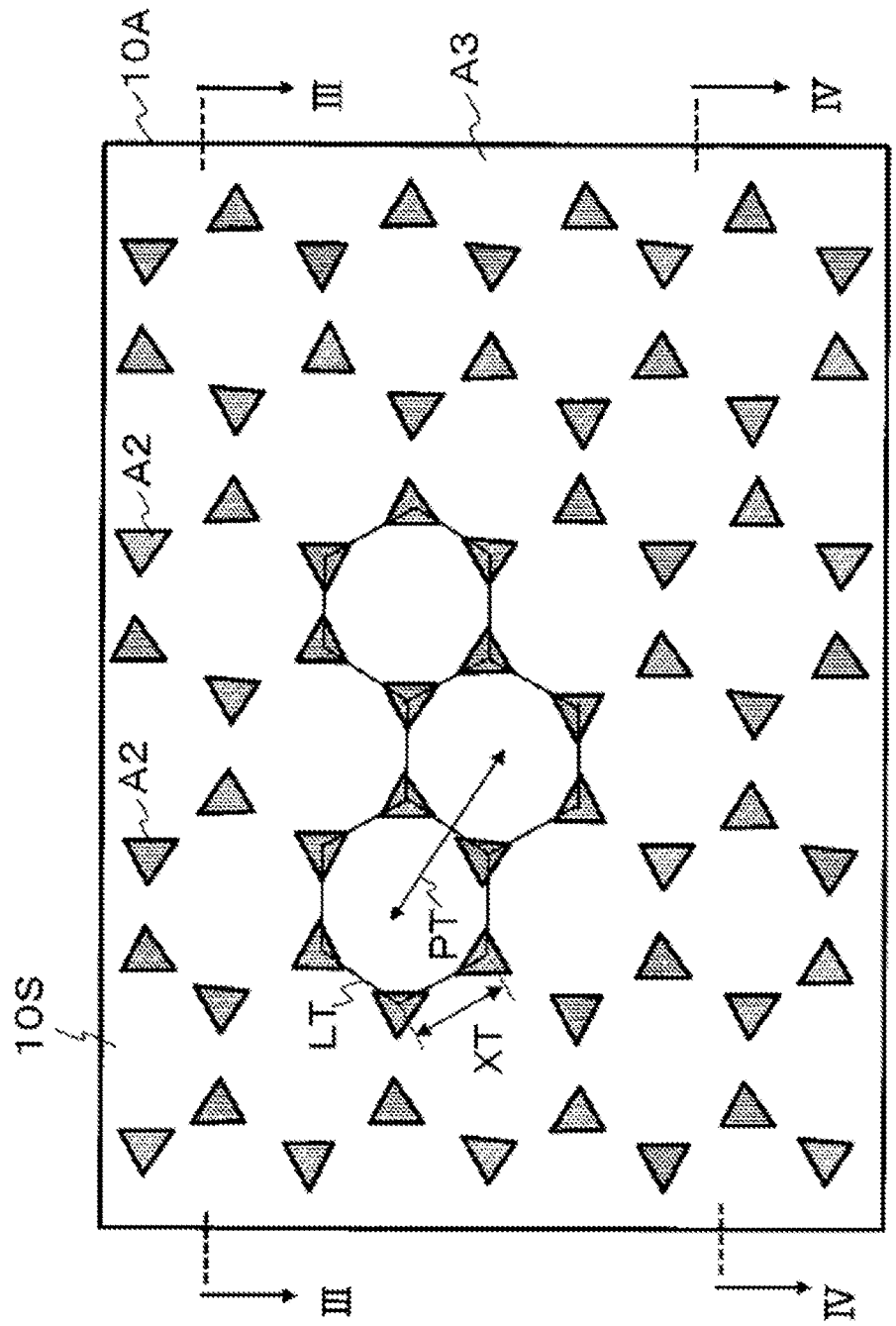
FIG. 22 is an enlarged plan view of a structure of a first display region in the display according to the third embodiment.

As shown in FIG. 22, the first display region 10A includes a plurality of isolated regions A2 and a single peripheral region A3 surrounding the individual isolated regions A2, as viewed in a direction perpendicular to the front surface 10S of the display. In FIG. 22, the isolated regions A2 are indicated by dots for the sake of convenience of explaining the isolated regions A2.

The isolated regions A2 are arranged in a two-dimensional lattice form having a sub-wavelength period. As shown in FIG. 22 as an example, the isolated regions A2 can be arranged in a hexagonal symmetric array over the front surface 10S. The hexagonal symmetric array includes array units LT each being a regular hexagon having sides with a length XT and having vertices where a plurality of isolated regions A2 are respectively arranged. The isolated regions A2 arranged at the vertices of the array units LT have a structural period PT, and each isolated region A2 is shared between adjacent array units LT. It should be noted that each array unit LT may only have to have a polygonal shape, and the isolated regions A2 may be arranged in a square array or a hexagonal array. Specifically, the isolated regions A2 are arranged in an island array that is any one of a hexagonal symmetric array, square array and hexagonal array. It should be noted that the square array includes array units LT each being a square having vertices where isolated regions A2 are respectively arranged, and the hexagonal array includes array units LT each being an equilateral triangle having vertices where isolated regions A2 are respectively arranged.

Figure 23:
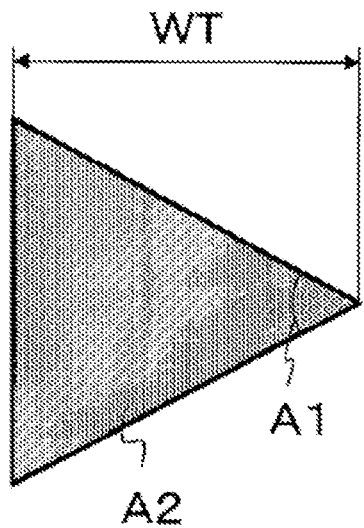
FIG. 23 is a plan view illustrating a shape of an isolated region in the first display region according to the third embodiment.

As shown in FIG. 23, each isolated region A2 has a polygonal shape including at least one acute interior angle A1. In at least part of pairs of adjacent isolated regions A2 among the plurality of isolated regions A2, the pairs are each arranged such that the respective acute interior angles A1 face each other. Each pair of isolated regions A2 having interior angles A1 facing each other is preferred to have a sub-wavelength distance between the centers (geometric centers or gravity centers) thereof. When each isolated region A2 is an equilateral triangle, the structural period PT is preferred to be in the range of 1 times or more and 5 times or less of a width WT (distance between an interior angle A1 and the side facing the interior angle A1) of the equilateral triangle, i.e., a sub-wavelength period in the range of 400 nm or more and 800 nm or less that is the wavelength region of visible light. Each isolated region A2 is preferred to be arranged such that an interior angle A1 thereof faces an interior angle A1 of the adjacent isolated region A2.

Figure 24:
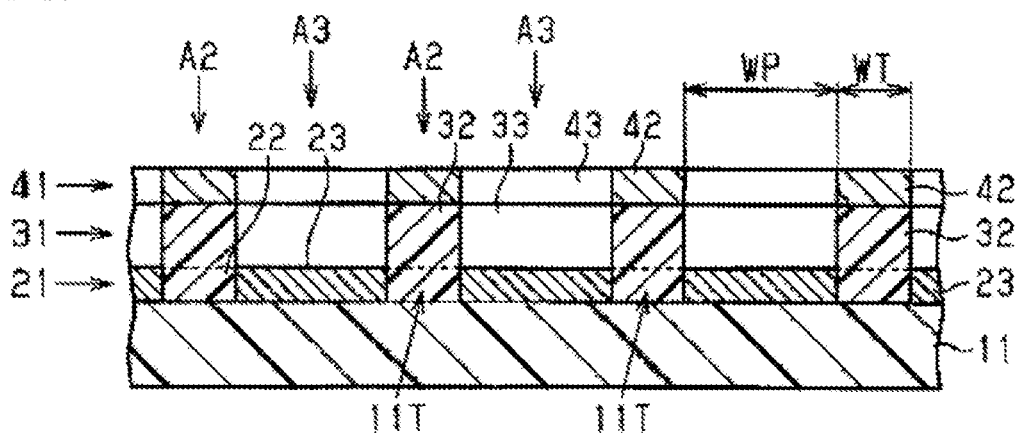
FIG. 24 is a cross-sectional view illustrating a structure of the first display region taken along the line of FIG. 22, according to the third embodiment.

As shown in FIG. 24, the display includes a transparent support 11 that transmits light in the visible region. Light in the visible region has a wavelength in the range of 400 nm or more and 800 nm or less. The support 11 is common to the first and second display regions 10A and 10B. The support 11 may have a single-layer cross-sectional structure or may have a multilayer cross-sectional structure.

The support 11 is made of a material that is a dielectric material, including, for example, a resin such as a photocurable resin, or an inorganic material such as quartz. The material for the support 11 is preferred to be a resin, from the perspectives such as of ease of obtaining flexibility required for affixing the display to an item, and having high degree of freedom in optical characteristics to be added to the support. The support 11 has a refractive index, e.g., in the range of 1.2 or more and 1.7 or less, which is higher than that of an air layer.

The first display region 10A includes a first lattice layer 21, an intermediate lattice layer 31 and a second lattice layer 41 arranged in this order on the support 11. The intermediate lattice layer 31 is sandwiched between the first lattice layer 21 and the second lattice layer 41. It should be noted that, in the support 11, the surface on which the first lattice layer 21 is disposed is the front surface of the support 11, and the first lattice layer 21—side of the support 11 is the front of the structure. The support 11—side of the first lattice layer 21 is the rear of the structure.

[First Lattice Layer 21]

The first lattice layer 21 is disposed on the front surface of the support 11. The first lattice layer 21 includes a plurality of first dielectric portions 22 and a single first metal layer 23. As viewed in a direction perpendicular to the front surface 10S of the display, the first dielectric portions 22 are formed at positions corresponding to the positions of the respective isolated regions A2 and have shapes corresponding to the respective isolated regions A2. The single first metal layer 23 is disposed in the peripheral region A3 as viewed in a direction perpendicular to the front surface 10S. Over the front surface 10S, the plurality of first dielectric portions 22 may be arranged, for example, in an island array that is any one of a hexagonal symmetric array, square array and hexagonal array.

The first dielectric portions 22 are structures projected from the surface of the support 11. For example, the first dielectric portions 22 may be integral with the support 11. Alternatively, the first dielectric portions 22 may have boundaries with the front surface of the support 11 and thus may be formed separately from the support 11.

As viewed in a direction perpendicular to the front surface 10S, the first metal layer 23 has a mesh pattern surrounding the individual first dielectric portions 22. In the first lattice layer 21, the single first metal layer 23 corresponds to an optical sea component in which free electrons are spread, and the first dielectric portions 22 correspond to island components distributed in the sea component.

As viewed in a direction perpendicular to the front surface 10S, the first dielectric portions 22 have a positioning period corresponding to the sum of a minimum interval WP between adjacent first dielectric portions 22 and a width WT of each first dielectric portion 22, i.e., corresponding to the structural period PT.

The ratio of the width WT of each first dielectric portion 22 to the structural period PT is in the range of 0.25 or more and 0.75 or less. From the perspectives of obtaining processing accuracy for the first lattice layer 21 and ease of plasmon resonance to occur in the first lattice layer 21, the ratio of the width WT of each first dielectric portion 22 to the structural period PT is preferred to be in the range of 0.40 or more and 0.60 or less. When each first dielectric portion 22 has an equilateral triangular shape in plan view, the structural period PT may be in the range of 1 times or more and 5 times or less of a width WT of each first dielectric portion 22, i.e., a sub-wavelength period in the range of 400 nm or more and 800 nm or less that is the wavelength region of visible light.

The first lattice layer 21 is preferred to have a thickness in the range of 10 nm or more and 200 nm or less. From the perspectives of obtaining processing accuracy for the first lattice layer 21, ease of plasmon resonance to occur in the first lattice layer 21, and obtaining a vivid color image in each observation, the thickness of the first lattice layer 21 is preferred to be in the range of 10 nm or more and 100 nm or less.

[Intermediate Lattice Layer 31]

The intermediate lattice layer 31 is disposed on the first lattice layer 21. The intermediate lattice layer 31 has a thickness that is larger than that of the first lattice layer 21. From the perspective of obtaining processing accuracy for the intermediate lattice layer 31, the thickness of the intermediate lattice layer 31 is preferred to be 150 nm or less.

The intermediate lattice layer 31 includes a plurality of first intermediate dielectric portions 32 and a single second intermediate dielectric layer 33. As viewed in a direction perpendicular to the front surface 10S, the first intermediate dielectric portions 32 are formed at positions corresponding to the positions of the respective isolated regions A2 and have shapes corresponding to the respective isolated regions A2. The single second intermediate dielectric layer 33 is disposed in the peripheral region A3 as viewed in a direction perpendicular to the front surface 10S. Over the front surface 10S, the plurality of first intermediate dielectric portions 32 may be arranged, for example, in an island array that is any one of a hexagonal symmetric array, square array and hexagonal array.

The first intermediate dielectric portions 32 are structures projected from the respective first dielectric portions 22. For example, the first intermediate dielectric portions 32 may be integral with the respective first dielectric portions 22. Alternatively, for example, the first intermediate dielectric portions 32 may have boundaries with the respective first dielectric portions 22 and thus may be formed separately from the first dielectric portions 22. As viewed in a direction perpendicular to the front surface 10S, the first intermediate dielectric portions 32 have a positioning period corresponding to the sum of the minimum interval WP and the width WT like the first dielectric portions 22, i.e., corresponding to the structural period PT. The ratio of the width WT of each first intermediate dielectric portion 32 to the structural period PT is in the range of 0.25 or more and 0.75 or less. The ratio of the width WT of each first intermediate dielectric portion 32 to the structural period PT is preferred to be in the range of 0.40 or more and 0.60 or less. When each first intermediate dielectric portion 32 has an equilateral triangular shape in plan view, the structural period PT may be in the range of 1 times or more and 5 times or less of a width WT of each first intermediate dielectric portion 32, i.e., a sub-wavelength period in the range of 400 nm or more and 800 nm or less that is the wavelength region of visible light.

As viewed in a direction perpendicular to the front surface 10S, the second intermediate dielectric layer 33 has a mesh pattern for surrounding the individual first intermediate dielectric portions 32. In the intermediate lattice layer 31, the single second intermediate dielectric layer 33 corresponds structurally and optically to a sea component, and the first intermediate dielectric portions 32 correspond structurally and optically to island components. The second intermediate dielectric layer 33 is an air layer or a resin layer and has a dielectric constant lower than that of the first intermediate dielectric portions 32.

[Second Lattice Layer 41]

The second lattice layer 41 is disposed on the intermediate lattice layer 31. The second lattice layer 41 is preferred to have a thickness in the range of 10 nm or more and 200 nm or less. The thickness of the second lattice layer 41 is smaller than that of the intermediate lattice layer 31. From the perspectives of obtaining processing accuracy for the second lattice layer 41, ease of plasmon resonance to occur in the second lattice layer 41, and obtaining an image with a vivid hue in each observation, the thickness of the second lattice layer 41 is preferred to be in the range of 10 nm or more and 100 nm or less.

The second lattice layer 41 includes a plurality of second metal portions 42 and a single second dielectric layer 43. As viewed in a direction perpendicular to the front surface 10S, the second metal portions 42 are formed at positions corresponding to the positions of the respective isolated regions A2 and have shapes corresponding to the respective isolated regions A2. The single second dielectric layer 43 is disposed in the peripheral region A3 as viewed in a direction perpendicular to the front surface 10S. Over the front surface 10S, the plurality of second metal portions 42 may be arranged, for example, in an island array that is any one of a hexagonal symmetric array, square array and hexagonal array.

The second metal portions 42 each form a structure together with the corresponding one of the first intermediate dielectric portions 32, with the former being overlaid on top of the latter. The second metal portions 42 have boundaries with the respective first intermediate dielectric portions 32 and thus are formed separately from the first intermediate dielectric portions 32. As viewed in a direction perpendicular to the front surface 10S, the second metal portions 42 have a positioning period corresponding to the sum of the minimum interval WP and the width WT like the first dielectric portions 22, i.e., corresponding to the structural period PT. The ratio of the width of each second metal portion 42 to the structural period PT may be in the range of 0.25 or more and 0.75 or less. The ratio of the width of each second metal portion 42 to the structural period PT is preferred to be in the range of 0.40 or more and 0.60 or less. When each second metal portion 42 has an equilateral triangular shape in plan view, the structural period PT may be in the range of 1 times or more and 5 times or less of a width WT of each second metal portion 42, i.e., a sub-wavelength period in the range of 400 nm or more and 800 nm or less that is the wavelength region of visible light.

As viewed in a direction perpendicular to the front surface 10S, the second dielectric layer 43 has a mesh pattern for surrounding the individual second metal portions 42. In the second lattice layer 41, the single second dielectric layer 43 corresponds to an optical sea component in which fewer free electrons than in the second metal portions 42 are present, and the second metal portions 42 correspond to island components distributed in the sea component. The second dielectric layer 43 is an air layer or a resin layer having a dielectric constant smaller than that of the first intermediate dielectric portions 32.

The volume ratio of the first metal layer 23 as a sea component in the first lattice layer 21 is larger than the volume ratio of the second metal portions 42 as island components in the second lattice layer 41. The volume ratio of the second metal portions 42 as island components in the second lattice layer 41 is larger than the volume ratio of metal materials in the intermediate lattice layer 31.

It should be noted that the structures each including a first dielectric portion 22 and the corresponding first intermediate dielectric portion 32 are an example of the periodic elements. These structures also correspond to convexities 11T projected from the surface of the support 11 as a reference plane. The structure including the support 11, the first dielectric portions 22 and the first intermediate dielectric portions 32 is an example of the periodic structure. The layers including the first metal layer 23 and the second metal portions 42 are regarded to be a metal layer having a profile the entirety of which conforms to the surface profile of the periodic structure. The surface of the periodic structure includes the region of the reference plane surrounding the individual periodic elements and the surfaces of the periodic elements.

Figure 25:
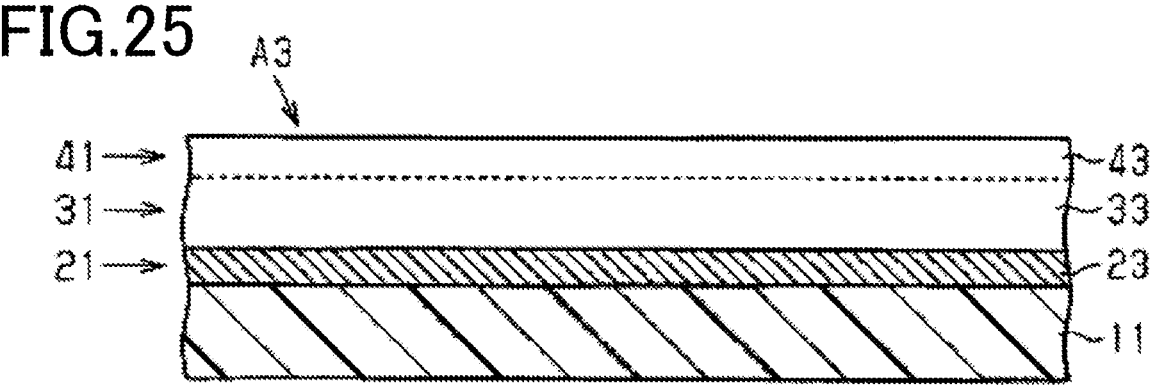
FIG. 25 is a cross-sectional view illustrating a structure of the first display region taken along the line IV-IV of FIG. 22, according to the third embodiment.

As shown in FIG. 25, in the peripheral region A3, the first metal layer 23 of the first lattice layer 21, the second intermediate dielectric layer 33 of the intermediate lattice layer 31 and the second dielectric layer 43 of the second lattice layer 41 are disposed in this order on the support 11. The second intermediate dielectric layer 33 is sandwiched between the first metal layer 23 and the second dielectric layer 43.

Figure 26:
FIG. 26 is a cross-sectional view illustrating a structure of a second display region taken along the line V-V of FIG. 21, according to the third embodiment.

As shown in FIG. 26, the second display region 10B includes none of the first, intermediate and second lattice layers 21, 31 and 41 on the support 11. Specifically, the second display region 10B allows light in the visible region to pass therethrough according to the optical transparency of the support 11.

It should be noted that the second display region 10B may include a layer different from the first display region 10A on the support 11. The second display region 10B may include, for example, only the first dielectric portions 22. The second display region 10B may include, for example, only a single metal layer made of the same material as the material for the first metal layer 23. The layer configuration of the second display region 10B is appropriately selected according to the requirements for an image to be presented on the second display region 10B.

Figure 27:
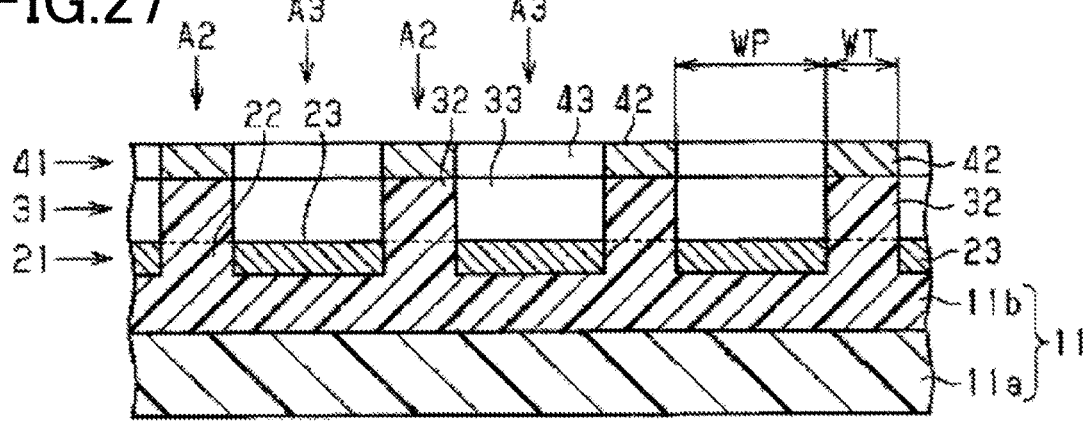
FIG. 27 is a cross-sectional view illustrating another example of a structure of the first display region according to the third embodiment.

As described above, the sectional structure of the support 11 may be a multilayer structure, and the first dielectric portions 22 do not necessarily have to have boundaries with the support 11. FIG. 27 shows a structure in which the support 11 includes two layers. Of the two layers, the layer on the front is integral with the first dielectric portions 22. Specifically, the support 11 includes a substrate 11a and an intermediate layer 11b. The intermediate layer 11b is disposed on the front side relative to the substrate 11a. The first dielectric portions 22 are projected from the intermediate layer 11b, and are integral with the intermediate layer 11b.

[Optical Configuration of Display]

Next, the optical configuration of the display will be described.

The configuration herein will be described taking an example in which the front surface 10S and the rear surface 10T of the display are in contact with respective air layers, and the second intermediate dielectric layer 33 and the second dielectric layer 43 are air layers or resin layers having a refractive index close to that of the air layers.

Figure 28:
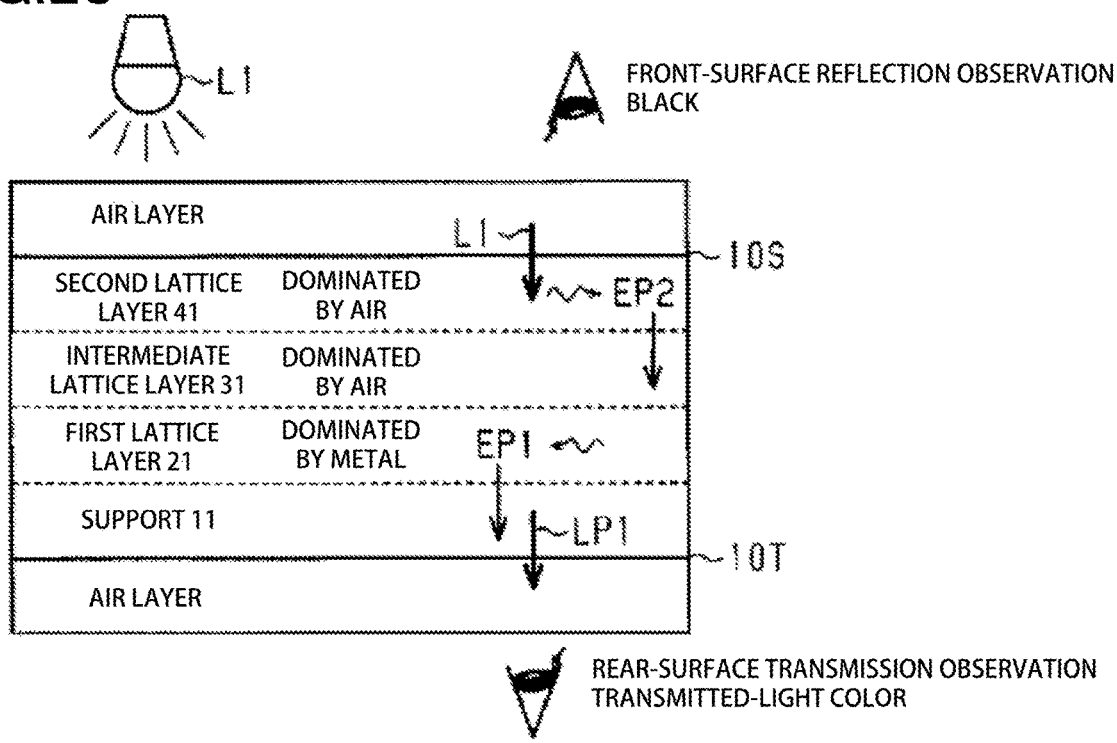
FIG. 28 is a diagram illustrating principles of operation of the display in reflection observation from the front and transmission observation from the rear, according to the third embodiment.

As shown in FIG. 28, the support 11 has a refractive index dominated by the dielectric material and larger than the refractive index of an air layer.

The first dielectric portions 22 have a refractive index higher than that of an air layer, and the first metal layer 23 has a refractive index lower than that of an air layer. The first lattice layer 21 has a refractive index that is approximately an average of the refractive indices of the first metal layer 23 and the first dielectric portions 22. Since the ratio of the width WT of each first dielectric portion 22 to the structural period PT is in the range of 0.25 or more and 0.75 or less, and since, when each first dielectric portion 22 has an equilateral triangular shape in plan view, the structural period PT is in the range of 1 times or more and 5 times or less of the width WT of each first dielectric portion 22, the refractive index of the first lattice layer 21 is resultantly dominated by the first metal layer 23 as a sea component and is much lower than the refractive index of an air layer.

The first intermediate dielectric portions 32 have a refractive index higher than that of an air layer, and the second intermediate dielectric layer 33 has a refractive index equal to or higher than that of an air layer. The intermediate lattice layer 31 has a refractive index that is approximately an average of the refractive indices of the second intermediate dielectric layer 33 and the first intermediate dielectric portions 32. Since the ratio of the width WT of each first intermediate dielectric portion 32 to the structural period PT is in the range of 0.25 or more and 0.75 or less, and since, when each first intermediate dielectric portion 32 has an equilateral triangular shape in plan view, the structural period PT is in the range of 1 times or more and 5 times or less of the width WT of each first intermediate dielectric portion 32, the refractive index of the intermediate lattice layer 31 is resultantly dominated by the second intermediate dielectric layer 33 as a sea component and is higher than and close to the refractive index of an air layer.

The second metal portions 42 have a refractive index lower than that of an air layer, and the second dielectric layer 43 has a refractive index equal to or higher than that of air layer. The second lattice layer 41 has a refractive index that is approximately an average of the refractive indices of the second dielectric layer 43 and the second metal portions 42. Since the ratio of the width WT of each second metal portion 42 to the structural period PT is in the range of 0.25 or more and 0.75 or less, and since, when each second metal portion 42 has an equilateral triangular shape in plan view, the structural period PT is in the range of 1 times or more and 5 times or less of the width WT of each second metal portion 42, the refractive index of the second lattice layer 41 is resultantly dominated by the second dielectric layer 43 as a sea component and is lower than and close to the refractive index of an air layer.

[Front-Surface Reflection Observation and Rear-Surface Transmission Observation]

White light L1 enters the second lattice layer 41 via an air layer from outside the display, and then enters the intermediate lattice layer 31. Since light L1 enters the second lattice layer 41 via an air layer, and since the second lattice layer 41 has a refractive index close to that of the air layer, Fresnel reflection is less likely to occur at the interface between the air layer and the second lattice layer 41. Since light enters the intermediate lattice layer 31 via the second lattice layer 41, and since the second and intermediate lattice layers 41 and 31 both have a refractive index close to that of an air layer, Fresnel reflection is also less likely to occur at the interface between the second and intermediate lattice layers 41 and 31.

Since the structural period PT of the second metal portions 42 is a sub-wavelength period that is not more than the wavelength of the visible region, plasmon resonance occurs in the second lattice layer 41. Plasmon resonance is a phenomenon in which part of light incident on the second lattice layer 41 interacts with collective vibrations of electrons. Part of the light L1 incident on the second lattice layer 41 is converted to surface plasmons by the plasmon resonance in the second lattice layer 41, and the converted surface plasmons pass through the second lattice layer 41. The surface plasmons passing through the second lattice layer 41 emerge therefrom after being re-converted to light. Light EP2 emerging from the second lattice layer 41 due to plasmon resonance has a specific wavelength region that depends on the lattice structure including the structural period PT of the second metal portions 42 and depends on the materials of the lattice layer. Consequently, the second lattice layer 41 transmits part of the wavelength region of light incident thereon to the intermediate lattice layer 31.

Since the structural period PT of the first dielectric portions 22 is also a sub-wavelength period that is not more than the wavelength of the visible region, plasmon resonance also occurs in the first lattice layer 21. Specifically, part of light incident on the first lattice layer 21 is also converted to surface plasmons by the plasmon resonance in the first lattice layer 21, and the converted surface plasmons pass through the first lattice layer 21 and emerge therefrom after being re-converted to light. Light EP1 emerging from the first lattice layer 21 due to plasmon resonance is in a specific wavelength region that depends on the lattice structure including the structural period PT of the first dielectric portions 22 and depends on the materials of the lattice layer. Consequently, the first lattice layer 21 transmits part of the wavelength region of light incident thereon to the support 11.

The first dielectric portions 22, each having a polygonal shape including at least one acute interior angle A1, are arranged at respective vertices of each array unit LT that is a regular hexagon having sides with length XT. Surface plasmons are known to be induced in acute angle portions of a structure. Therefore, when the first dielectric portions 22 each have a polygonal shape, the effects of surface plasmons are strongly exerted in the vicinities of the acute angle portions. Also, the optical or color development characteristics due to surface plasmons are known to be affected by the arrangement of materials, such as metal, inducing surface plasmons. For example, by changing the arrangement to a rotational symmetric arrangement, such as a square array, hexagonal array or hexagonal symmetric array, dispersion relation of the surface plasmons can be varied, the reflection spectrum can be permitted to have a narrow band, or other control can be performed. Accordingly, the absorption band width is reduced and wavelength selectivity is enhanced.

Consequently, in front-surface reflection observation in which light L1 is incident on the second lattice layer 41 from outside the display and the front surface 10S is observed from the front of the display, a black color or a hue close to a black color is observed in the first display region 10A due to Fresnel reflection being less likely to occur at the interfaces, coupled with strong plasmon resonance occurring in the lattice layers.

In rear-surface transmission observation in which light L1 is incident on the second lattice layer 41 from outside the display and the rear surface 10T is observed from the rear of the display, colored light LP1, i.e., light other than white and black light which has passed through the lattice layers while undergoing plasmon resonance therein, is observed in the first display region 10A. It should be noted that front-surface reflection observation and rear-surface transmission observation show a trend similar to the trend in the case where the intensity of external light toward the front surface 10S is higher than the intensity of external light toward the rear surface 10T.

[Rear-Surface Reflection Observation and Front-Surface Transmission Observation]

Figure 29:
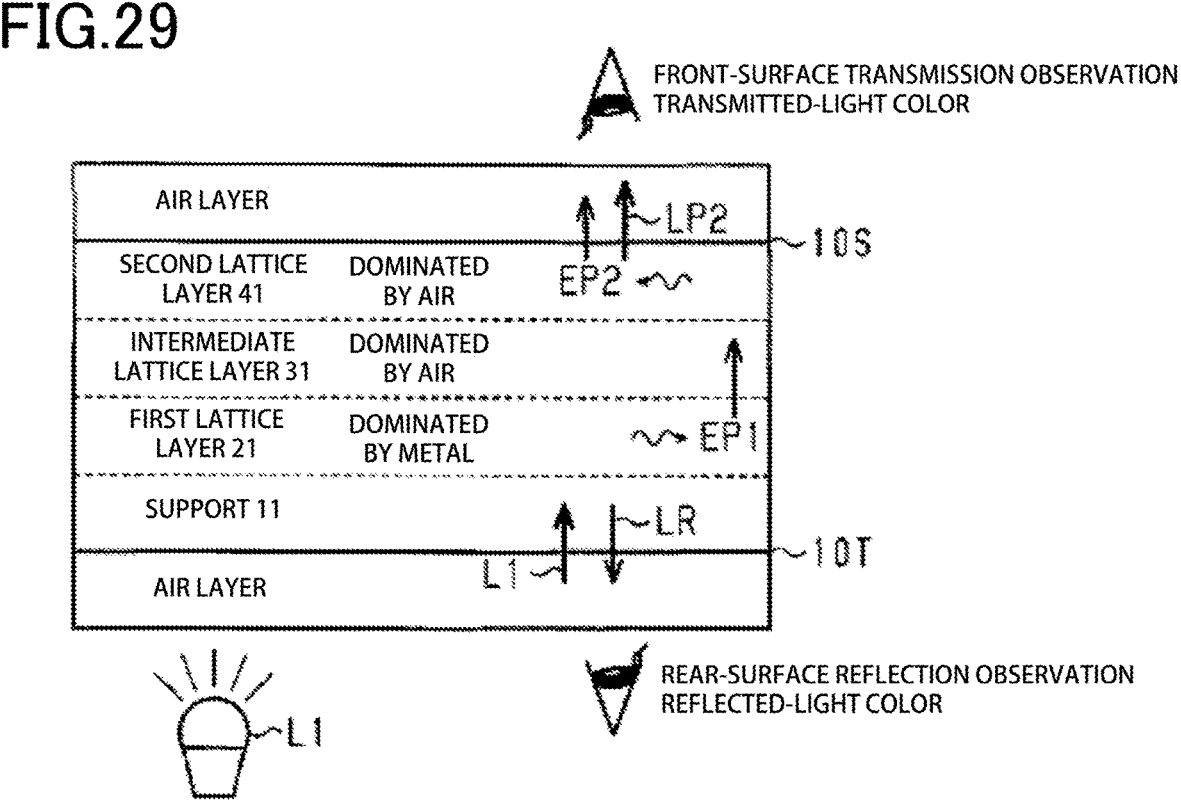
FIG. 29 is a diagram illustrating principles of operation of the display in reflection observation from the rear and transmission observation from the front, according to the third embodiment.

As shown in FIG. 29, white light L1 is incident on the support 11 from outside the display via an air layer and then enters the first lattice layer 21. Since light L1 enters the first lattice layer 21 via the support 11, and since the support 11 has a refractive index higher than that of an air layer and the first lattice layer 21 has a refractive index lower than that of an air layer, Fresnel reflection easily occurs at the interface between the support 11 and the first lattice layer 21. It should be noted that the difference in refractive index between the support 11 and the first lattice layer 21 is larger than the difference in refractive index between the first and intermediate lattice layers 21 and 31 and is also larger than the difference in refractive index between the intermediate and second lattice layers 31 and 41.

Part of the light passing through the interface between the support 11 and the first lattice layer 21 undergoes plasmon resonance in the first lattice layer 21. Light EP1 emerging from the first lattice layer 21 due to plasmon resonance is in a specific wavelength region that depends on the lattice structure including the structural period PT of the first metal layer 23 and depends on the materials of the lattice layer. Light in this wavelength region is consumed by plasmon resonance without being reflected at the interface between the support 11 and the first lattice layer 21. Consequently, part of the wavelength region of light incident on the support 11 is reflected at the interface between the support 11 and the first lattice layer 21, and thus the first lattice layer 21 transmits part of the wavelength region of light incident thereon to the intermediate lattice layer 31.

Part of light passing through the intermediate lattice layer 31 and incident on the second lattice layer 41 also undergoes plasmon resonance in the second lattice layer 41. Light EP2 emerging from the second lattice layer 41 due to plasmon resonance is in a specific wavelength region that depends on the lattice structure including the structural period PT of the second dielectric layer 43 and depends on the materials of the lattice layer. Consequently, the second lattice layer 41 transmits part of the wavelength region of light incident thereon to an air layer.

The first dielectric portions 22, each having a polygonal shape including at least one acute interior angle A1, are arranged at respective vertices of each array unit LT that is a regular hexagon having sides with length XT. Surface plasmons are known to be induced in acute angle portions of a structure. Therefore, when the first dielectric portions 22 each have a polygonal shape, the effects of surface plasmons are strongly exerted in the vicinities of the acute angle portions. Also, the optical or color development characteristics due to surface plasmons are known to be affected by the arrangement of materials, such as metal, inducing surface plasmons. For example, by changing the arrangement to a rotational symmetric arrangement, such as a square array, hexagonal array or hexagonal symmetric array, dispersion relation of the surface plasmons can be varied, the reflection spectrum can be permitted to have a narrow band, or other control can be performed. Accordingly, the band width of absorption is reduced and wavelength selectivity is enhanced.

As a result, in rear-surface reflection observation in which light L1 is incident on the support 11 from outside the display and the rear surface 10T is observed from the rear of the display, colored light LR due to Fresnel reflection at the interfaces, i.e., light LR other than white and black light, can be observed in the first display region 10A. It should be noted that such Fresnel reflection occurring at the interface between the support 11 and the first lattice layer 21 enables observation of a hue closer to black in the first display region 10A in rear-surface reflection observation.

In front-surface transmission observation in which light L1 is incident on the support 11 from outside the display and the front surface 10S is observed from the front of the display, colored light LP2 that has undergone Fresnel reflection and plasmon resonance in the lattice layers can be observed in the first display region 10A. It should be noted that front-surface transmission observation and rear-surface reflection observation show a trend similar to the trend in the case where the intensity of external light toward the rear surface 10T is higher than the intensity of external light toward the front surface 10S.

[Method of Producing Display]

Next, an example of a method of producing the display will be described.

First, first dielectric portions 22 and first intermediate dielectric portions 32 are formed on the surface of a support 11. The first dielectric portions 22 and the respective first intermediate dielectric portions 32 are integrally formed as convexities projected from the surface of the support 11. For example, the method of forming the convexities may be photolithography using light or a charged particle beam, nanoimprinting or plasma etching.

For example, as shown in FIG. 27, when producing a display which includes a support 11 formed of a substrate 11a and an intermediate layer 11b, a polyethylene terephthalate sheet is used first as the substrate 11a, and a UV curable resin is applied to the surface of the substrate 11a. Next, the surface of the coated film made of the UV curable resin is pressed against a surface of a synthetic quartz mold that is an intaglio plate, followed by applying UV light to the film and the mold. Subsequently, the UV-cured resin is released from the synthetic quartz mold. Thus, asperities of the intaglio plate are transferred to the resin on the surface of the substrate 11a, thereby forming convexities each including a first dielectric portion 22 and a first intermediate dielectric portion 32, and an intermediate layer 11b. It should be noted that the UV curable resin may be changed to a thermosetting resin, and the UV application may be changed to heating. Also, the UV curable resin may be changed to a thermoplastic resin, and the UV application may be changed to heating and cooling.

Next, a first metal layer 23 and second metal portions 42 are formed on the surface of the support 11 provided with the convexities. For example, the first metal layer 23 and the second metal portions 42 may be formed by vacuum deposition or sputtering. Thus, there are formed a first lattice layer 21 defined by the top face of the first metal layer 23, and a second lattice layer 41 defined by the top faces of the second metal portions 42. Also, there is formed an intermediate lattice layer 31 sandwiched between the first and second lattice layers 21 and 41.

Configuration Example of First Display Region

Figure 30:
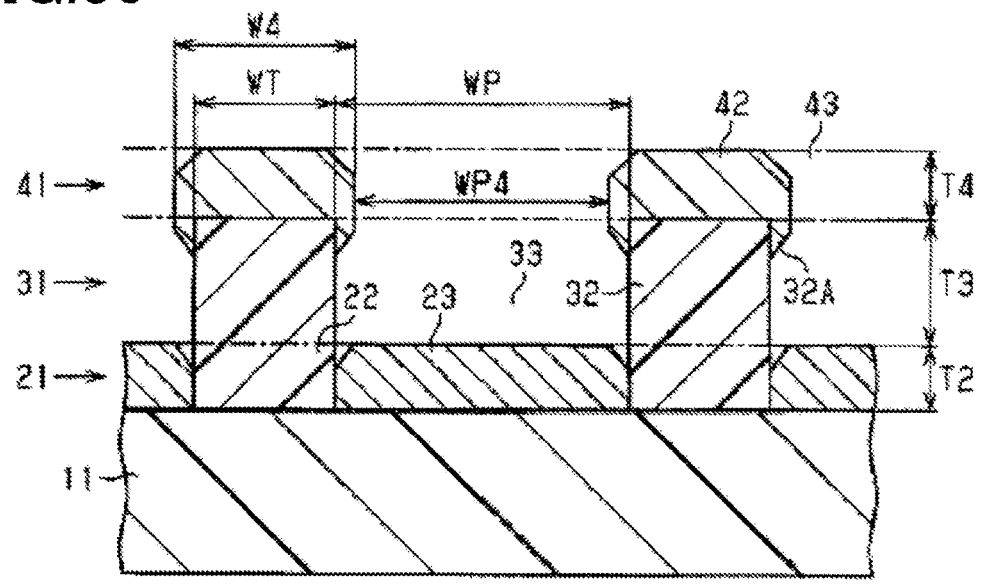
FIG. 30 is a partially enlarged cross-sectional view illustrating an example of the structure of the first display region according to the third embodiment.

As shown in FIG. 30, the first metal layer 23 has a thickness T2. As the thickness T2 increases, the intensity of light generated by Fresnel reflection increases accordingly at the interface between the first lattice layer 21 and the support 11, and the image in rear-surface reflection observation increases brightness accordingly. When the interior angles A1 of the first dielectric portions 22 face each other, and as the ratio of the width WT of each first dielectric portion 22 to the structural period PT decreases, the image in rear-surface reflection observation also increases brightness accordingly.

As the thickness T2 of the first metal layer 23 increases, the intensity of light transmitted from the rear surface 10T to the front surface 10S decreases accordingly, and hue in front-surface reflection observation becomes closer to black. When the interior angles A1 of the first dielectric portions 22 face each other, and as the ratio of the width WT of each first dielectric portion 22 to the structural period PT decreases, the image in rear-surface reflection observation also increases brightness accordingly.

Furthermore, accuracy of discriminating between the front and rear of the display can be sufficiently obtained in each observation mentioned above, as long as the thickness T2 of the first metal layer 23 is 10 nm or more, and the ratio of the width WT of each first dielectric portion 22 to the structural period PT is 0.75 or less, or as long as each first dielectric portion 22 has an equilateral triangular shape in plan view, and the structural period PT is 5 times or less of the width WT of each first dielectric portion 22, i.e., a sub-wavelength period in the range of 400 nm or more and 800 nm or less that is the wavelength of the visible region.

As the thickness T2 of the first metal layer 23 decreases or as the second metal portions 42 each have a smaller thickness T4, the intensity of light passing through the layer and portions increases accordingly in front- or rear-surface transmission observation. When the interior angles A1 of the first dielectric portions 22 face each other, and as the ratio of the width WT of each first dielectric portion 22 to the structural period PT increases, the intensity of light passing through the display also increases accordingly.

The image in front- or rear-surface transmission observation becomes clear enough to be observed, as long as the thickness T2 of the first metal layer 23 or the thickness T4 of each second metal portion 42 is 200 nm or less, and the ratio of the width WT of each first dielectric portion 22 to the structural period PT is 0.25 or more, or as long as each first dielectric portion 22 has an equilateral triangular shape in plan view, and the structural period PT is 1 times or more of the width WT of each first dielectric portion 22, i.e., a sub-wavelength period in the range of 400 nm or more and 800 nm or less that is the wavelength of the visible region.

The sum of the thickness T2 of each first dielectric portion 22 and the thickness T3 of each first intermediate dielectric portion 32 is preferred to be smaller than the structural period PT that is the sum of the width WT of each first dielectric portion 22 and the minimum interval WP. The sum of the thickness T2 of each first dielectric portion 22 and the thickness T3 of each first intermediate dielectric portion 32 is even more preferred to be smaller than half the structural period PT.

The structure as described above can contribute to enhancing the configuration accuracy of the resin structure in which the first dielectric portions 22 are respectively integrated with the first intermediate dielectric portions 32. Moreover, the convexities 11T each formed of a first dielectric portion 22 and a first intermediate dielectric portion 32 are prevented from falling on the surface of the support 11.

When the first lattice layer 21 or the second lattice layer 41 is made of a metal material having a complex dielectric constant with a negative real part in the wavelength region of visible light, plasmon resonance easily occurs in these layers. In this regard, the material for the first metal layer 23 is preferred to be a material having a complex dielectric constant with a negative real part. The material for the second metal portions 42 is also preferred to be a material having a complex dielectric constant with a negative real part.

The material for the first metal layer 23 or the second metal portions 42 may, for example, be aluminum, silver, gold, indium, tantalum, or the like.

As described in the above production method, the first metal layer 23 and the second metal portions 42 can be formed through a single process of forming a metal layer film on the support 11 on which the first dielectric portions 22 and the first intermediate dielectric portions 32 have been formed.

In this case, the metal particles sputtered from a film-forming source are deposited on the surface of the support 11 with a predetermined angular distribution. As a result, each second metal portion 42 will have a width W4 that is slightly larger than the width WT of each first intermediate dielectric portion 32, and adjacent second metal portions 42 will have a minimum interval WP4 therebetween that is slightly smaller than the minimum interval WP. In this case, the ratio of the width W4 of each second metal portion 42 to the structural period PT will be in the range of 0.25 or more and 0.75 or less. When each first intermediate dielectric portion 32 has an equilateral triangular shape in plan view, the structural period PT may be in the range of 1 times or more and 5 times or less of a width WT of each first intermediate dielectric portion 32, i.e., a sub-wavelength period in the range of 400 nm or more and 800 nm or less that is the wavelength of the visible region. It should be noted that, in the first metal layer 23, peripheral portions of the first intermediate dielectric portions 32 are shadowed by the respective second metal portions 42 and become thinner toward the first intermediate dielectric portions 32.

Furthermore, in the structure formed through the above film-forming method, intermediate metal portions 32A, i.e., metal portions contiguous to the respective second metal portions 42, are formed on the side faces of the respective first intermediate dielectric portions 32.

Each intermediate metal portion 32A is sandwiched between the corresponding first intermediate dielectric portion 32 and the second intermediate dielectric layer 33. Each intermediate metal portion 32A forms a structure integral with the corresponding second metal portion 42 and has a thickness, on the side faces of the corresponding first intermediate dielectric portion 32, becoming smaller toward the first metal layer 23.

The intermediate metal portions 32A, which have a structural period PT corresponding to a sub-wavelength period, make the refractive index variation continuous in the thickness direction of the second lattice layer 41 or the intermediate lattice layer 31. The intermediate metal portions 32A are less likely to reflect light incident on the second lattice layer 41 from outside the display and are likely to transmit light to the intermediate lattice layer 31 or the first lattice layer 21. Therefore, in front-surface reflection observation, a color closer to black is observed in the first display region 10A.

In the structure formed by the above film-forming method, the material for the first metal layer 23 is the same as the material for the second metal portions 42.

As the difference in refractive index becomes smaller between the second dielectric layer 43 and the second metal portions 42, the average refractive index of the second lattice layer 41 is likely to contribute to minimizing Fresnel reflection at the interface between the second lattice layer 41 and another layer. As the difference in refractive index becomes larger between the first dielectric portions 22 and the first metal layer 23, the average refractive index of the first lattice layer 21 is likely to contribute to promoting Fresnel reflection at the interface between the first lattice layer 21 and the support 11.

In a configuration in which the first metal layer 23 and the second metal portions 42 have the same refractive index and the difference in refractive index between the first dielectric portions 22 and the first metal layer 23 is larger than the difference in refractive index between the second dielectric portions 43 and the second metal layer 42, Fresnel reflection at the interface between the second lattice layer 41 and another layer can be minimized and Fresnel reflection at the interface between the first lattice layer 21 and another layer can be promoted.

It is preferred that the following requirements are satisfied to minimize Fresnel reflection at the interface between the second lattice layer 41 and another layer and to promote Fresnel reflection at the interface between the first lattice layer 21 and another layer. Specifically, it is preferred that the difference in refractive index between a surface layer and the second dielectric layer 43 is smaller than the difference in refractive index between the first metal layer 23 and the support 11. The surface layer in this case is a layer contacting the second dielectric layer 43 and disposed facing away from the intermediate lattice layer 31. For example, the surface layer may be an air layer. It is even more preferred that the refractive index of the second dielectric layer 43 is equal to that of the surface layer.

According to the third embodiment, the advantageous effects enumerated below can be obtained.

(1) In front- and rear-surface reflection observations, images having different hues can be observed in the first display region 10A. Therefore, the front and rear surfaces of the display can be discriminated from each other. Furthermore, for the items to which the display is affixed, authenticity can be easily verified, or the visual appearance can be enhanced.

(2) In front-surface reflection observation and rear-surface transmission observation as well, images having different hues can be observed in the first display region 10A. Therefore, the accuracy of discriminating between the front and rear can be enhanced. Furthermore, in rear-surface reflection observation and front-surface transmission observation as well, images having different hues can be observed in the first display region 10A. Therefore, the accuracy of discriminating between the front and rear can be enhanced.

(3) Since the structural period PT corresponds to a sub-wavelength period that is not more than the wavelength of the visible region, light in the visible region is prevented from forming primary diffracted light. Therefore, the images observed in rear-surface reflection observation and front- and rear-surface transmission observations are prevented from containing iridescent colors, allowing the images to have even more vivid hues.

(4) When the first dielectric portions 22, the first intermediate dielectric portions 32 and the second metal portions 42 each have a polygonal shape having at least one acute interior angle and are arranged at respective vertices of each array unit having a regular hexagonal shape, wavelength selectivity of an image can be enhanced in each observation.

(5) Since the sum of the thickness T2 of the first lattice layer 21 and the thickness T3 of the intermediate lattice layer 31 is suitable for applying an intaglio plate used such as for nanoimprinting, the first dielectric portions 22 and the first intermediate dielectric portion 32 can be integrally formed.

(6) Since the first dielectric portions 22 are integral with the respective first intermediate dielectric portions 32 and since the second intermediate dielectric layer 33 is integral with the second dielectric layer 43, the structure of the display can be simplified. Furthermore, if the second intermediate dielectric layer 33 and the second dielectric layer 43 are configured to form an integral air layer, the structure of the display can be simplified even more.

(7) Since the intermediate metal portions 32A have an anti-reflection function, the image observed in front-surface reflection observation is permitted to have a hue closer to black.

(8) In front- and rear-surface reflection observations and front- or rear-surface transmission observation, the first display region 10A is permitted to have a unique hue. Therefore, for the items to which the display is affixed, accuracy of verifying authenticity can be enhanced.

(9) In front- and rear-surface reflection observations and front- or rear-surface transmission observation, the first display region 10A is permitted to have a unique hue. Therefore, the mode of presenting an image by the display can be made even more complicated and the visual appearance presented by the display can be enhanced.

Modifications of Third Embodiment

The third embodiment may be modified and implemented as follows.

[Intermediate Lattice Layer 31]

The first intermediate dielectric portions 32 and the second intermediate dielectric layer 33 can be implemented with separate members. In this case, the second intermediate dielectric layer 33 is preferred to be a resin layer having a refractive index that is closer to that of an air layer than to that of the first intermediate dielectric portions 32.

The second intermediate dielectric layer 33 and the second dielectric layer 43 can be implemented with separate members. In this case, the second intermediate dielectric layer 33 is preferred to be a resin layer having a refractive index that is closer to that of an air layer than to that of the second dielectric layer 43.

[First Lattice Layer 21]

Figure 31:
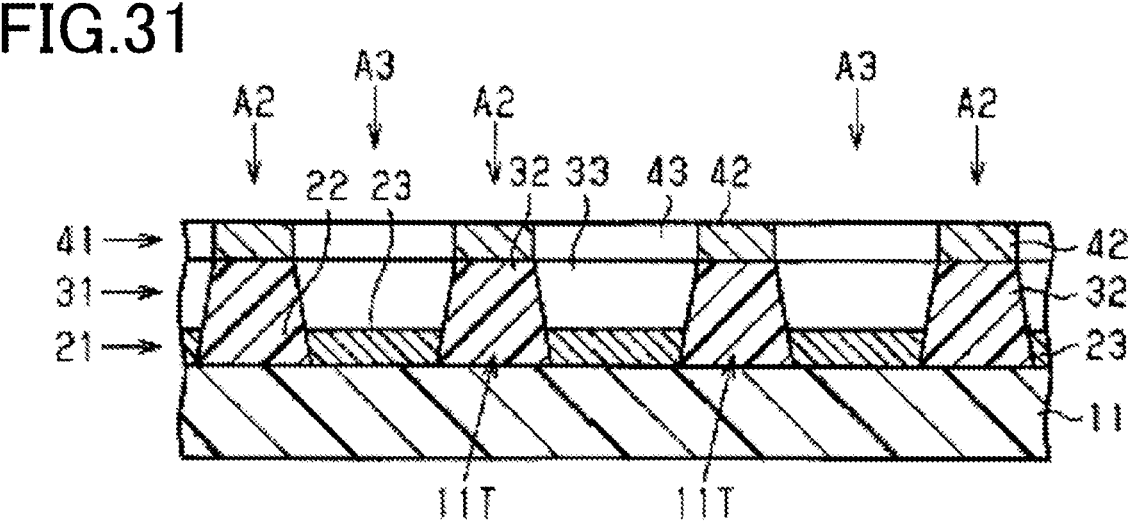
FIG. 31 is a partially enlarged cross-sectional view illustrating a structure of a first display region according to a modification of the third embodiment.

As shown in FIG. 31, the first dielectric portions 22 and the respective first intermediate dielectric portions 32 are configured as integral structures. The convexities 11T, each being an integral structure, may be specifically implemented with cones projected from the surface of the support 11. Such structures enable smooth release of an intaglio plate used when forming the first dielectric portions 22 and the first intermediate dielectric portions 32.

[Second Display Region 10B]

Figure 32:
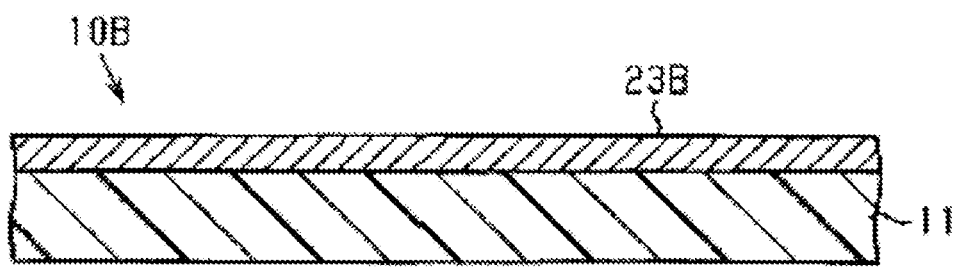
FIG. 32 is a partially enlarged cross-sectional view illustrating a structure of a second display region according to a modification of the third embodiment.

As shown in FIG. 32, the second display region 10B can be implemented as a configuration including only a metal layer 23B on the surface of the support 11. In this case, front-surface reflection observation presents an image having a black color or a hue close to black in the first display region 10A, and presents an image having a metallic gloss in the second display region 10B. Furthermore, rear-surface reflection observation presents a colored image in the first display region 10A, which is based on light due to Fresnel reflection at the interface between the first lattice layer 21 and the support 11, i.e., light affected by the wavelength region to be consumed by plasmon resonance in the first lattice layer 21, and presents an image in the second display region 10B, which has a metallic gloss affected by only light due to Fresnel reflection at the interface between the metal layer 23B and the support 11.

[Protective Layer]

The display further includes a protective layer on the second metal portions 42. In this case, the intensity of Fresnel reflection at the interface between the protective layer and the second metal portions 42, and the wavelength selectivity in the display depend on the refractive index of the protective layer. In this regard, the material for the protective layer may be appropriately selected based on the wavelength region to be selected by the display.

Figure 33:
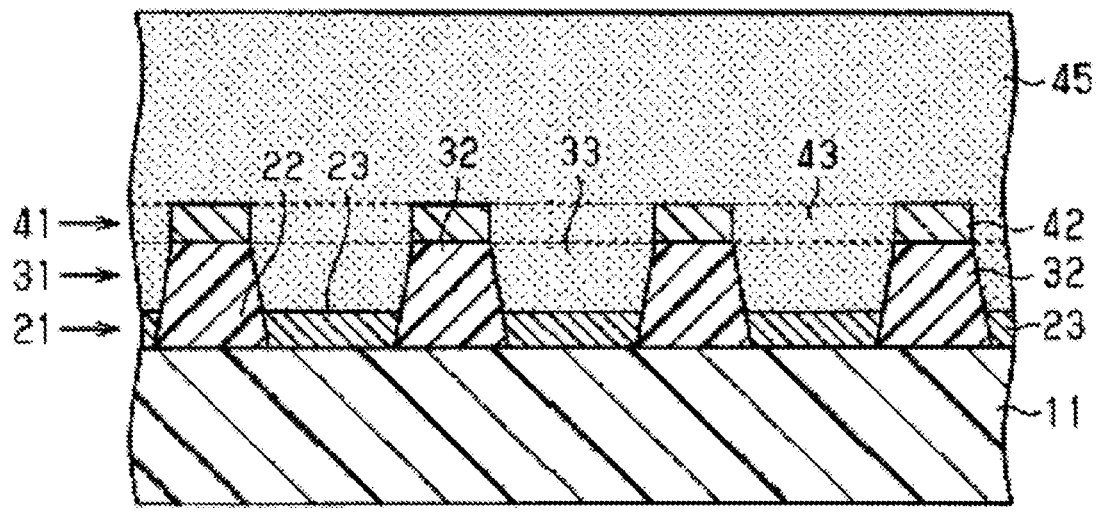
FIG. 33 is a partially enlarged cross-sectional view illustrating a structure of a first display region according to a modification of the third embodiment.

As shown in FIG. 33, a protective layer 45 can be integrally structured with the second dielectric layer 43 and the second intermediate dielectric layer 33. In this case, the protective layer 45 is preferred to be a resin layer with a low refractive index. The resin layer with a low refractive index has a refractive index closer to that of an air layer than to that of the first dielectric portions 22 or the first intermediate dielectric portions 32.

Other Embodiments

The arrangement of the isolated regions A2 as viewed in a direction perpendicular to the front surface 10S of the display is not limited to a hexagonal symmetric array, square array or hexagonal array, but may be a two-dimensional lattice array. Specifically, the first dielectric portions 22 may be arranged in a two-dimensional lattice form, the first intermediate dielectric portions 32 may be arranged in a two-dimensional lattice form, and the second metal portions 42 may be arranged in a two-dimensional lattice form. In other words, the periodic elements of the periodic structure may be arranged in a two-dimensional lattice form having a sub-wavelength period. The two-dimensional lattice array refers to an array in which elements are arranged in two directions intersecting with each other in a two-dimensional plane. In this case, the ratio of the width WT to the structural period PT refers to a ratio of the width WT to the structural period PT in one direction. If it is mentioned that this ratio is within a predetermined range, it means that the ratio of the width WT to the structural period PT is within a predetermined range in each of the two directions in which the periodic elements are arranged.

The shape of each isolated region A2 as viewed in a direction perpendicular to the front surface 10S of the display, i.e., the shape of each periodic element in plan view, is not limited to a triangle, but may be other polygons, such as square or rectangle, or may be a circle.

As long as the display has a structure of generating plasmon resonance in the first and second lattice layers 21 and 41, transmitted light passing through the display becomes light in a specific wavelength region according to the structural period PT. Even when Fresnel reflection occurs at the interface between the second lattice layer 41 and another layer and a colored image different from a black color is observed in the first display region 10A in front-surface reflection observation, the wavelength region to be consumed by the plasmon resonance is not included in reflected light. Therefore, the images observed in front-surface reflection observation and rear-surface transmission observation have hues different from each other. Similarly, the images observed in rear-surface reflection observation and front-surface transmission observation will have different hues. Thus, images with different hues can be observed in front- and rear-surface observations of the display, i.e., images with different appearances can be observed depending on the observation conditions. Therefore, in the items to which the display is affixed, difficulty of counterfeiting can be increased or the visual appearance can be enhanced.

For example, the ratio of the width WT of each first dielectric portion 22 to the structural period PT and the ratio of the width WT of each second metal portion 42 to the structural period PT may be different from the range of 0.25 or more and 0.75 or less. If each first dielectric portion 22 has a triangular shape in plan view, the structural period PT may be different from the range of 1 times or more and 5 times or less of the width WT of each first dielectric portion 22. Also, for example, the thickness relationship between the first, intermediate and second lattice layers 21, 31 and 41 may be different from the thickness relationship shown in the embodiment described above.

Fourth Embodiment

Referring to FIGS. 34 to 44, a fourth embodiment of the display will be described. It should be noted that the display may be used for the purpose of increasing difficulty of counterfeiting items or for the purpose of enhancing the visual appearance of items, or may be used for both purposes. For the purpose of increasing difficulty of counterfeiting items, the display may be affixed, for example, to verification documents such as passports or licenses, securities such as gift tickets or checks, cards such as credit cards or cash cards, paper currency, or other items. For the purpose of enhancing the visual appearance of items, the display may be affixed, for example, to wearable ornaments, items carried by users, stationary items such as furniture or electrical appliances, structures such as walls or doors, or the like.

Figure 34:
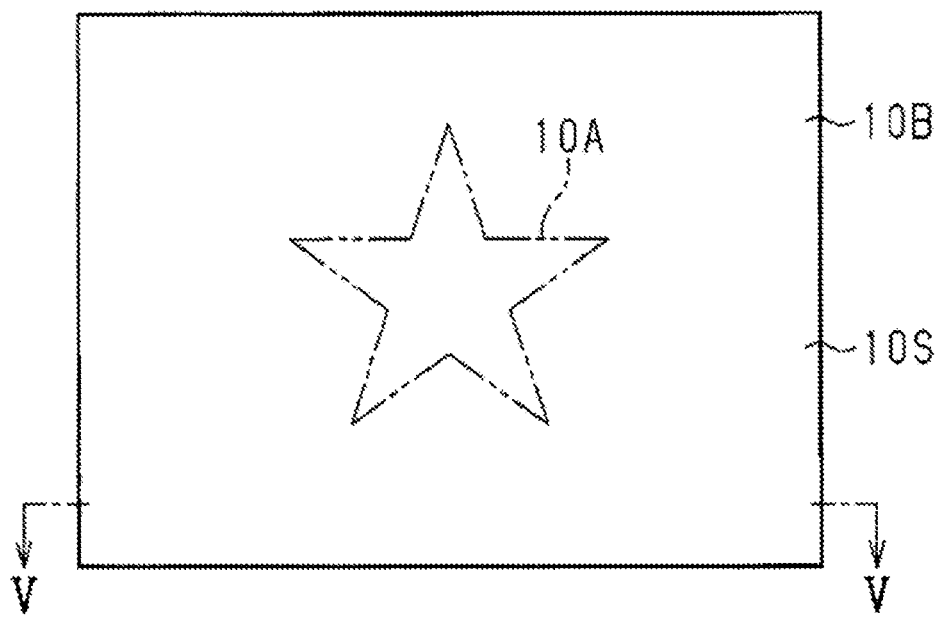
FIG. 34 is a plan view illustrating a structure of a display according to a fourth embodiment of the present invention.

As shown in FIG. 34, the display has a front surface 10S in which a first display region 10A and a second display region 10B are defined. The first display region 10A has a cross-sectional structure which is different from that of the second display region 10B. In the front surface 10S, the first display region 10A is used for drawing a character, a figure, a symbol, a pattern or a picture. For example, in FIG. 34, a star-shaped figure is provided in this region.

[Structure of Display]

First, the configuration of the first display region 10A will be described.

Figure 35:
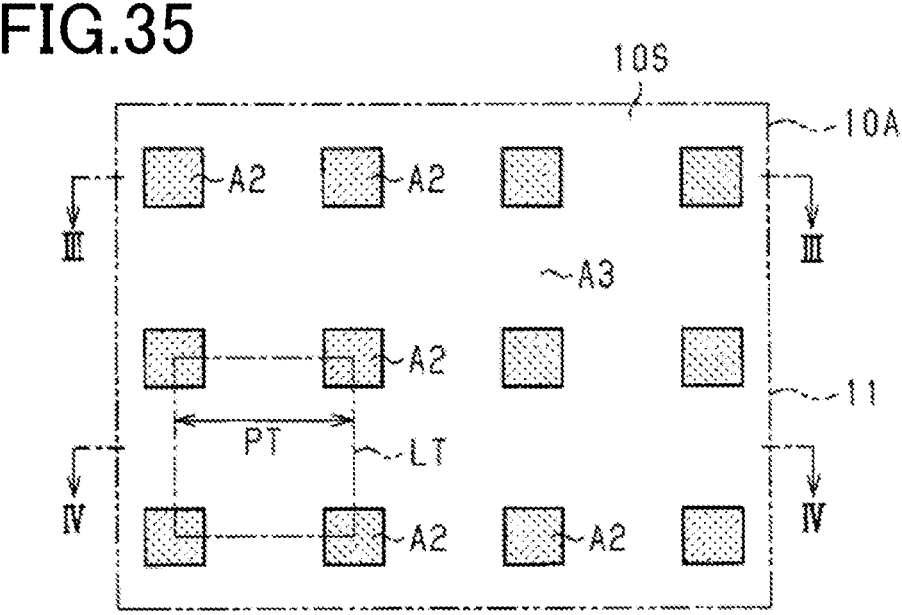
FIG. 35 is an enlarged plan view of a structure of a first display region in the display according to the fourth embodiment.

As shown in FIG. 35, the first display region 10A includes a plurality of isolated regions A2 and a single peripheral region A3 surrounding the individual isolated regions A2, as viewed in a direction perpendicular to the front surface 10S of the display. In FIG. 35, the isolated regions A2 are indicated by dots for the sake of convenience of explaining the isolated regions A2.

The respective isolated regions A2 are arranged in a square array over the front surface 10S. The square array includes squares LT having sides with a structural period PT and having vertices at which the isolated regions A2 are respectively arranged. It should be noted that the isolated regions A2 may be arranged in a hexagonal array. Specifically, the isolated regions A2 are arranged in an island array that is either one of a square array or a hexagonal array. It should also be noted that the hexagonal array includes equilateral triangles each having vertices at which the isolated regions A2 are respectively arranged.

Figure 36:
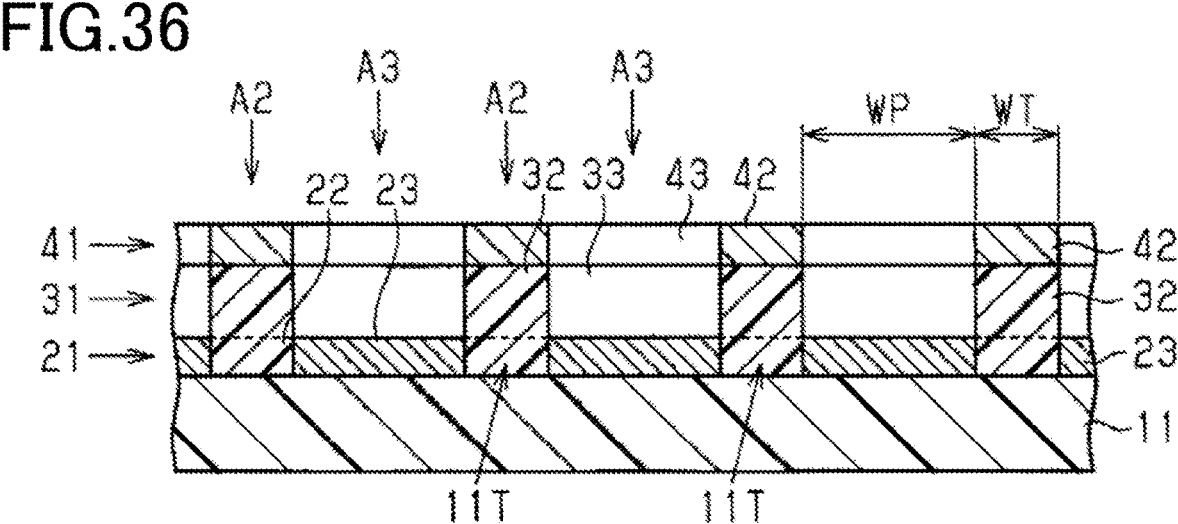
FIG. 36 is a cross-sectional view illustrating a structure of the first display region taken along the line of FIG. 35, according to the fourth embodiment.

As shown in FIG. 36, the display includes a transparent support 11 that transmits light in the visible region. Light in the visible region has a wavelength in the range of 400 nm or more and 800 nm or less. The support 11 is common to the first and second display regions 10A and 10B. The support 11 may have a single-layer cross-sectional structure or may have a multilayer cross-sectional structure.

The support 11 is made of a material that is a dielectric material, including, for example, a resin such as a photo-curable resin, or an inorganic material such as quartz. The material for the support 11 is preferred to be a resin, from the perspectives such as of ease of obtaining flexibility required for affixing the display to an item, and having high degree of freedom in optical characteristics to be added to the support. The support 11 has a refractive index, e.g., in the range of 1.2 or more and 1.7 or less, which is higher than that of an air layer.

The first display region 10A includes a first lattice layer 21, an intermediate lattice layer 31 and a second lattice layer 41 arranged in this order on the support 11. The intermediate lattice layer 31 is sandwiched between the first lattice layer 21 and the second lattice layer 41. It should be noted that, in the support 11, the surface on which the first lattice layer 21 is disposed is the front surface of the support 11, and the first lattice layer 21—side of the support 11 is the front of the structure. The support 11—side of the first lattice layer 21 is the rear of the structure.

[First Lattice Layer 21]

The first lattice layer 21 is disposed on the front surface of the support 11. The first lattice layer 21 includes a plurality of first dielectric portions 22 and a single first metal layer 23. The first dielectric portions 22 are disposed in the respective isolated regions A2 as viewed in a direction perpendicular to the front surface 10S of the display. The single first metal layer 23 is disposed in the peripheral region A3 as viewed in a direction perpendicular to the front surface 10S. The plurality of first dielectric portions 22 are arranged in an island array, which is a square or hexagonal array, over the front surface 10S.

The first dielectric portions 22 are structures projected from the surface of the support 11. For example, the first dielectric portions 22 may be integral with the support 11. Alternatively, the first dielectric portions 22 may have boundaries with the front surface of the support 11 and thus may be formed separately from the support 11.

As viewed in a direction perpendicular to the front surface 10S, the first metal layer 23 has a mesh pattern surrounding the individual first dielectric portions 22. In the first lattice layer 21, the single first metal layer 23 corresponds to an optical sea component in which free electrons are spread, and the first dielectric portions 22 correspond to island components distributed in the sea component.

As viewed in a direction perpendicular to the front surface 10S, the first dielectric portions 22 have a positioning period corresponding to the sum of a minimum interval WP between adjacent first dielectric portions 22 and a width WT of each first dielectric portion 22, i.e., corresponding to the structural period PT. The structural period PT is a sub-wavelength period which is not more than the wavelength of the visible region.

The ratio of the width WT of each first dielectric portion 22 to the structural period PT is in the range of 0.25 or more and 0.75 or less. From the perspectives of obtaining processing accuracy for the first lattice layer 21 and ease of plasmon resonance to occur in the first lattice layer 21, the ratio of the width WT of each first dielectric portion 22 to the structural period PT is preferred to be in the range of 0.40 or more and 0.60 or less.

The first lattice layer 21 is preferred to have a thickness in the range of 10 nm or more and 200 nm or less. From the perspectives of obtaining processing accuracy for the first lattice layer 21, ease of plasmon resonance to occur in the first lattice layer 21, and obtaining a vivid color image in each observation, the thickness of the first lattice layer 21 is preferred to be in the range of 10 nm or more and 100 nm or less.

[Intermediate Lattice Layer 31]

The intermediate lattice layer 31 is disposed on the first lattice layer 21. The intermediate lattice layer 31 has a thickness that is larger than that of the first lattice layer 21. From the perspective of obtaining processing accuracy for the intermediate lattice layer 31, the thickness of the intermediate lattice layer 31 is preferred to be 150 nm or less.

The intermediate lattice layer 31 includes a plurality of first intermediate dielectric portions 32 and a single second intermediate dielectric layer 33. The first intermediate dielectric portions 32 are disposed in the respective isolated regions A2 as viewed in a direction perpendicular to the front surface 10S. The single second intermediate dielectric layer 33 is disposed in the peripheral region A3 as viewed in a direction perpendicular to the front surface 10S. The plurality of first intermediate dielectric portions 32 are arranged in an island array, which is a square or hexagonal array, over the front surface 10S.

The first intermediate dielectric portions 32 are structures projected from the respective first dielectric portions 22. For example, the first intermediate dielectric portions 32 may be integral with the respective first dielectric portions 22. Alternatively, for example, the first intermediate dielectric portions 32 may have boundaries with the respective first dielectric portions 22 and thus may be formed separately from the first dielectric portions 22. As viewed in a direction perpendicular to the front surface 10S, the first intermediate dielectric portions 32 have a positioning period corresponding to the sum of the minimum interval WP and the width WT like the first dielectric portions 22, i.e., corresponding to the structural period PT. The ratio of the width WT of each first intermediate dielectric portion 32 to the structural period PT is in the range of 0.25 or more and 0.75 or less. The ratio of the width WT of each first intermediate dielectric portion 32 to the structural period PT is preferred to be in the range of 0.40 or more and 0.60 or less.

As viewed in a direction perpendicular to the front surface 10S, the second intermediate dielectric layer 33 has a mesh pattern for surrounding the individual first intermediate dielectric portions 32. In the intermediate lattice layer 31, the single second intermediate dielectric layer 33 corresponds structurally and optically to a sea component, and the first intermediate dielectric portions 32 correspond structurally and optically to island components. The second intermediate dielectric layer 33 is an air layer or a resin layer and has a dielectric constant lower than that of the first intermediate dielectric portions 32.

[Second Lattice Layer 41]

The second lattice layer 41 is disposed on the intermediate lattice layer 31. The second lattice layer 41 is preferred to have a thickness in the range of 10 nm or more and 200 nm or less. The thickness of the second lattice layer 41 is smaller than that of the intermediate lattice layer 31. From the perspectives of obtaining processing accuracy for the second lattice layer 41, ease of plasmon resonance to occur in the second lattice layer 41, and obtaining an image with a vivid hue in each observation, the thickness of the second lattice layer 41 is preferred to be in the range of 10 nm or more and 100 nm or less.

The second lattice layer 41 includes a plurality of second metal portions 42 and a single second dielectric layer 43. As viewed in a direction perpendicular to the front surface 10S, the second metal portions 42 are disposed in the respective isolated regions A2. The single second dielectric layer 43 is disposed in the peripheral region A3 as viewed in a direction perpendicular to the front surface 10S. The plurality of second metal portions 42 are arranged in an island array, which is a square or hexagonal array, over the front surface 10S.

The second metal portions 42 each form a structure together with the corresponding one of the first intermediate dielectric portions 32, with the former being overlaid on top of the latter. The second metal portions 42 have boundaries with the respective first intermediate dielectric portions 32 and thus are formed separately from the first intermediate dielectric portions 32. As viewed in a direction perpendicular to the front surface 10S, the second metal portions 42 have a positioning period corresponding to the sum of the minimum interval WP and the width WT like the first dielectric portions 22, i.e., corresponding to the structural period PT. The ratio of the width of each second metal portion 42 to the structural period PT may be in the range of 0.25 or more and 0.75 or less. The ratio of the width of each second metal portion 42 to the structural period PT is preferred to be in the range of 0.40 or more and 0.60 or less.

As viewed in a direction perpendicular to the front surface 10S, the second dielectric layer 43 has a mesh pattern for surrounding the individual second metal portions 42. In the second lattice layer 41, the single second dielectric layer 43 corresponds to an optical sea component in which fewer free electrons than in the second metal portions 42 are present, and the second metal portions 42 correspond to island components distributed in the sea component. The second dielectric layer 43 is an air layer or a resin layer having a dielectric constant smaller than that of the first intermediate dielectric portions 32.

The volume ratio of the first metal layer 23 as a sea component in the first lattice layer 21 is larger than the volume ratio of the second metal portions 42 as island components in the second lattice layer 41. The volume ratio of the second metal portions 42 as island components in the second lattice layer 41 is larger than the volume ratio of metal materials in the intermediate lattice layer 31.

It should be noted that the structures each including a first dielectric portion 22 and the corresponding first intermediate dielectric portion 32 are an example of the periodic elements. These structures also correspond to convexities 11T projected from the surface of the support 11 as a reference plane. The structure including the support 11, the first dielectric portions 22 and the first intermediate dielectric portions 32 is an example of the periodic structure. The layers including the first metal layer 23 and the second metal portions 42 are regarded to be a metal layer having a profile the entirety of which conforms to the surface profile of the periodic structure. The surface of the periodic structure includes the region of the reference plane surrounding the individual periodic elements and the surfaces of the periodic elements.

Figure 37:
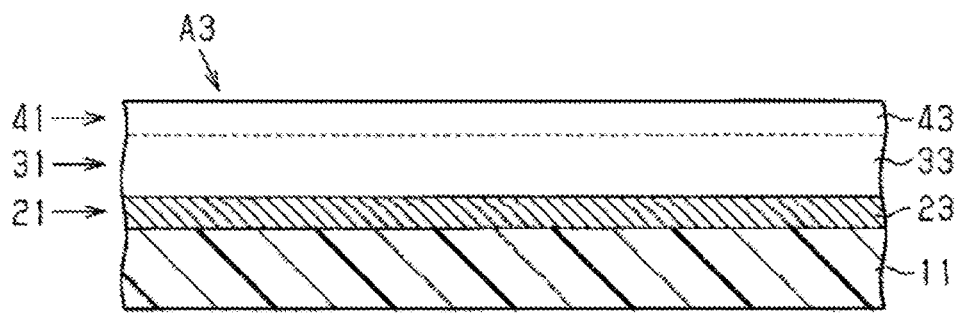
FIG. 37 is a cross-sectional view illustrating a structure of the first display region taken along the line IV-IV of FIG. 35, according to the fourth embodiment.

As shown in FIG. 37, in the peripheral region A3, the first metal layer 23 of the first lattice layer 21, the second intermediate dielectric layer 33 of the intermediate lattice layer 31 and the second dielectric layer 43 of the second lattice layer 41 are disposed in this order on the support 11. The second intermediate dielectric layer 33 is sandwiched between the first metal layer 23 and the second dielectric layer 43.

Figure 38:
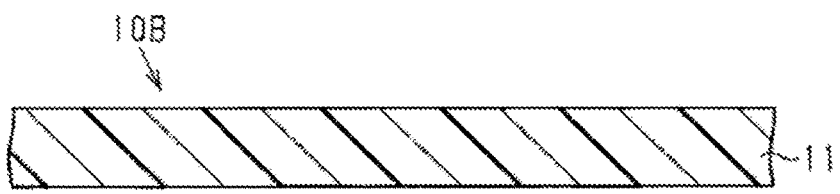
FIG. 38 is a cross-sectional view illustrating a structure of a second display region taken along the line V-V of FIG. 34 according to the fourth embodiment.

As shown in FIG. 38, the second display region 10B includes none of the first, intermediate and second lattice layers 21, 31 and 41 on the support 11. Specifically, the second display region 10B allows light in the visible region to pass therethrough according to the optical transparency of the support 11.

It should be noted that the second display region 10B may include a layer different from the first display region 10A on the support 11. The second display region 10B may include, for example, only the first dielectric portions 22. The second display region 10B may include, for example, only a single metal layer made of the same material as the material for the first metal layer 23. The layer configuration of the second display region 10B is appropriately selected according to the requirements for an image to be presented on the second display region 10B.

Figure 39:
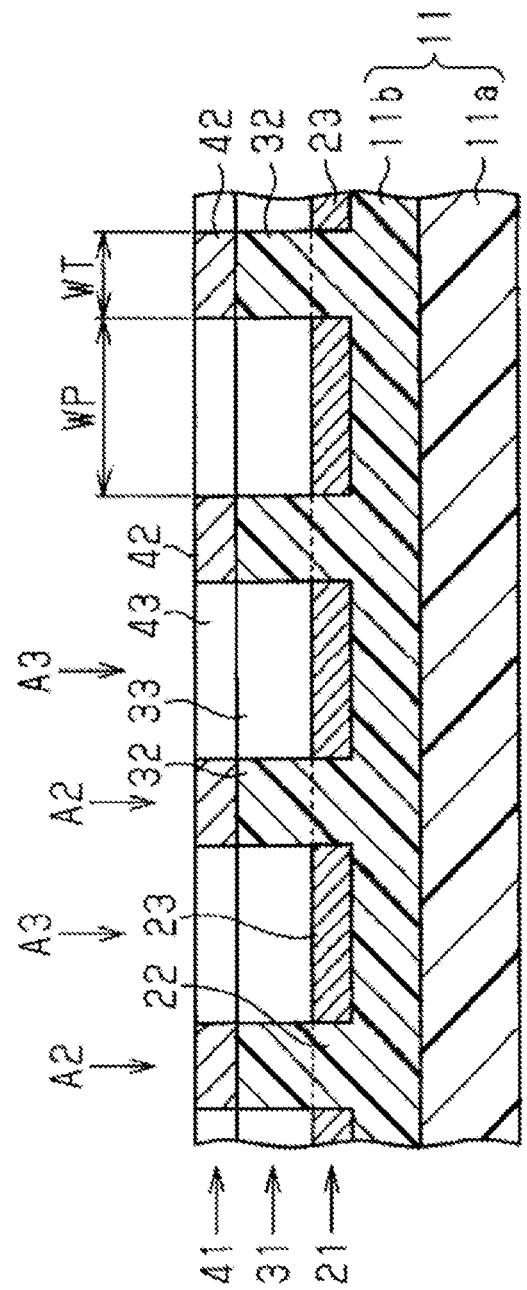
FIG. 39 is a cross-sectional view illustrating another example of a structure of the first display region according to the fourth embodiment.

As described above, the sectional structure of the support 11 may be a multilayer structure, and the first dielectric portions 22 do not necessarily have to have boundaries with the support 11. FIG. 39 shows a structure in which the support 11 includes two layers. Of the two layers, the layer on the front is integral with the first dielectric portions 22. Specifically, the support 11 includes a substrate 11a and an intermediate layer 11b. The intermediate layer 11b is disposed on the front side relative to the substrate 11a. The first dielectric portions 22 are projected from the intermediate layer 11b, and are integral with the intermediate layer 11b.

[Optical Configuration of Display]

Next, the optical configuration of the display will be described.

The configuration herein will be described taking an example in which the front surface 10S and the rear surface 10T of the display are in contact with respective air layers, and the second intermediate dielectric layer 33 and the second dielectric layer 43 are air layers or resin layers having a refractive index close to that of the air layers.

Figure 40:
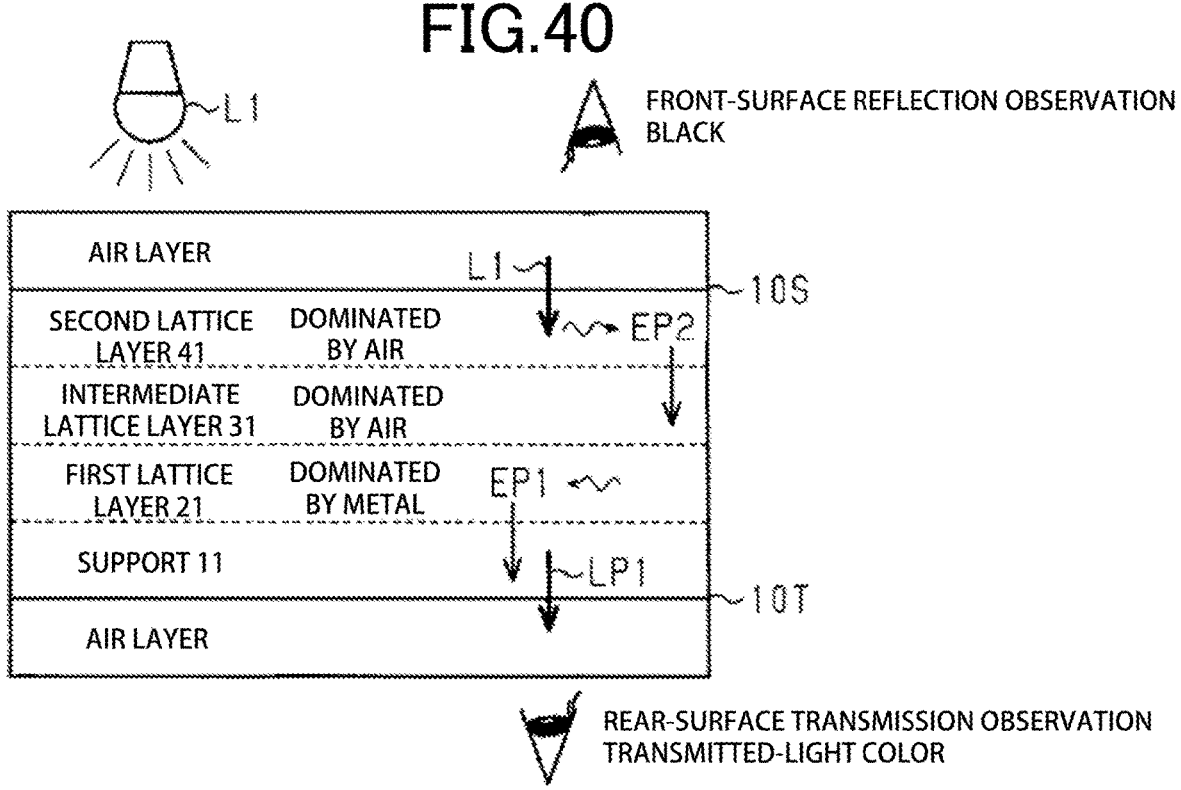
FIG. 40 is a diagram illustrating principles of operation of the display in reflection observation from the front and transmission observation from the rear, according to the fourth embodiment.

As shown in FIG. 40, the support 11 has a refractive index dominated by the dielectric material and larger than the refractive index of an air layer.

The first dielectric portions 22 have a refractive index higher than that of an air layer, and the first metal layer 23 has a refractive index lower than that of an air layer. The first lattice layer 21 has a refractive index that is approximately an average of the refractive indices of the first metal layer 23 and the first dielectric portions 22. Since the ratio of the width WT of each first dielectric portion 22 to the structural period PT is in the range of 0.25 or more and 0.75 or less, the refractive index of the first lattice layer 21 is resultantly dominated by the first metal layer 23 as a sea component and is much lower than the refractive index of an air layer.

The first intermediate dielectric portions 32 have a refractive index higher than that of an air layer, and the second intermediate dielectric layer 33 has a refractive index equal to or higher than that of an air layer. The intermediate lattice layer 31 has a refractive index that is approximately an average of the refractive indices of the second intermediate dielectric layer 33 and the first intermediate dielectric portions 32. Since the ratio of the width WT of each first intermediate dielectric portion 32 to the structural period PT is in the range of 0.25 or more and 0.75 or less, the refractive index of the intermediate lattice layer 31 is resultantly dominated by the second intermediate dielectric layer 33 as a sea component and is higher than and close to the refractive index of an air layer.

The second metal portions 42 have a refractive index lower than that of an air layer, and the second dielectric layer 43 has a refractive index equal to or higher than that of air layer. The second lattice layer 41 has a refractive index that is approximately an average of the refractive indices of the second dielectric layer 43 and the second metal portions 42. Since the ratio of the width WT of each second metal portion 42 to the structural period PT is in the range of 0.25 or more and 0.75 or less, the refractive index of the second lattice layer 41 is resultantly dominated by the second intermediate dielectric layer 43 as a sea component and is lower than and is close to the refractive index of an air layer.

[Front-Surface Reflection Observation and Rear-Surface Transmission Observation]

White light L1 enters the second lattice layer 41 via an air layer from outside the display, and then enters the intermediate lattice layer 31. Since light L1 enters the second lattice layer 41 via an air layer, and since the second lattice layer 41 has a refractive index close to that of the air layer, Fresnel reflection is less likely to occur at the interface between the air layer and the second lattice layer 41. Since light enters the intermediate lattice layer 31 via the second lattice layer 41, and since the second and intermediate lattice layers 41 and 31 both have a refractive index close to that of an air layer, Fresnel reflection is also less likely to occur at the interface between the second and intermediate lattice layers 41 and 31.

Since the structural period PT of the second metal portions 42 is a sub-wavelength period that is not more than the wavelength of the visible region, plasmon resonance occurs in the second lattice layer 41. Plasmon resonance is a phenomenon in which part of light incident on the second lattice layer 41 interacts with collective vibrations of electrons. Part of the light L1 incident on the second lattice layer 41 is converted to surface plasmons by the plasmon resonance in the second lattice layer 41, and the converted surface plasmons pass through the second lattice layer 41. The surface plasmons passing through the second lattice layer 41 emerge therefrom after being re-converted to light. Light EP2 emerging from the second lattice layer 41 due to plasmon resonance has a specific wavelength region that depends on the lattice structure including the structural period PT of the second metal portions 42 and depends on the materials of the lattice layer. Consequently, the second lattice layer 41 transmits part of the wavelength region of light incident thereon to the intermediate lattice layer 31.

Since the structural period PT of the first dielectric portions 22 is also a sub-wavelength period that is not more than the wavelength of the visible region, plasmon resonance also occurs in the first lattice layer 21. Specifically, part of light incident on the first lattice layer 21 is also converted to surface plasmons by the plasmon resonance in the first lattice layer 21, and the converted surface plasmons pass through the first lattice layer 21 and emerge therefrom after being re-converted to light. Light EP1 emerging from the first lattice layer 21 due to plasmon resonance is in a specific wavelength region that depends on the lattice structure including the structural period PT of the first dielectric portions 22 and depends on the materials of the lattice layer. Consequently, the first lattice layer 21 transmits part of the wavelength region of light incident thereon to the support 11.

Thus, in front-surface reflection observation in which light L1 is incident on the second lattice layer 41 from outside the display and the front surface 10S is observed from the front of the display, a black color or a hue close to a black color is observed in the first display region 10A due to Fresnel reflection being less likely to occur at the interfaces, coupled with plasmon resonance occurring in the lattice layers.

In rear-surface transmission observation in which light L1 is incident on the second lattice layer 41 from outside the display and the rear surface 10T is observed from the rear of the display, colored light LP1, i.e., light other than white and black light which has passed through the lattice layers while undergoing plasmon resonance therein, is observed in the first display region 10A. It should be noted that front-surface reflection observation and rear-surface transmission observation show a trend similar to the trend in the case where the intensity of external light toward the front surface 10S is higher than the intensity of external light toward the rear surface 10T.

[Rear-Surface Reflection Observation and Front-Surface Transmission Observation]

Figure 41:
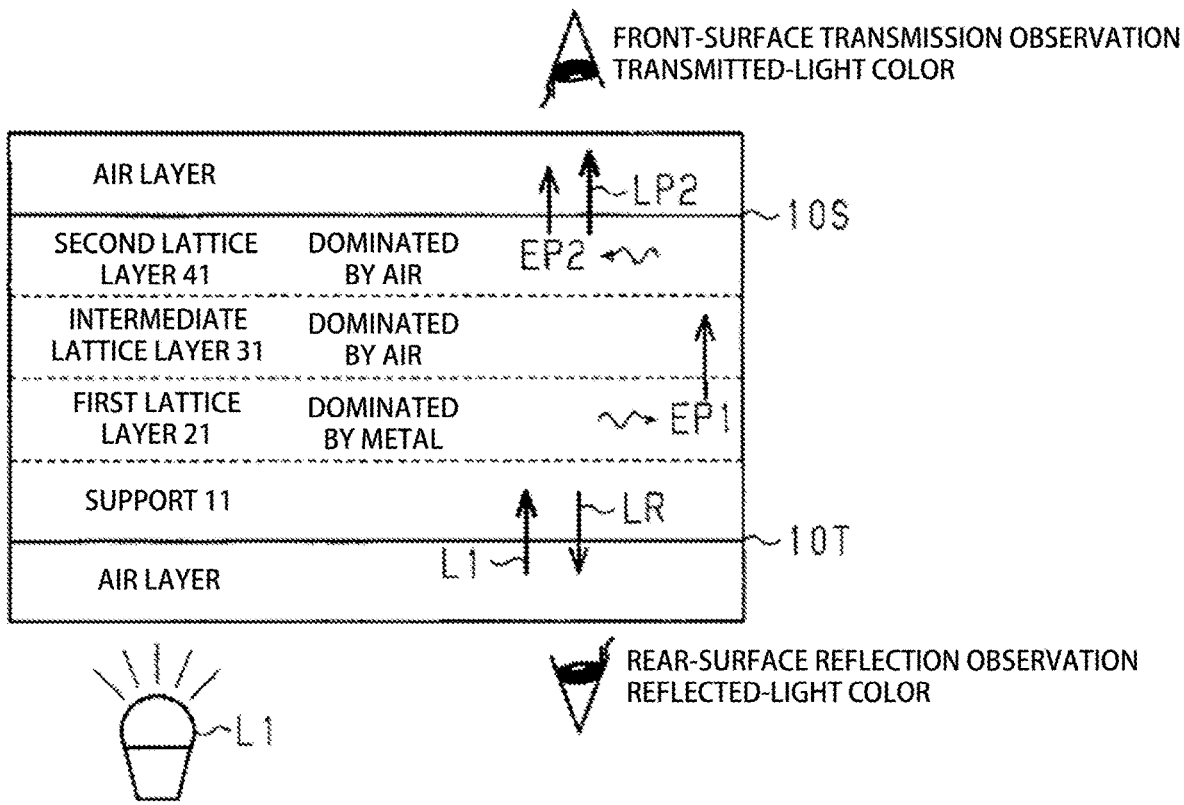
FIG. 41 is a diagram illustrating principles of operation of the display in reflection observation from the rear and transmission observation from the front, according to the fourth embodiment.

As shown in FIG. 41, white light L1 enters the support 11 from outside the display via an air layer and then enters the first lattice layer 21. Since light L1 enters the first lattice layer 21 via the support 11, and since the support 11 has a refractive index higher than that of an air layer and the first lattice layer 21 has a refractive index lower than that of an air layer, Fresnel reflection easily occurs at the interface between the support 11 and the first lattice layer 21. It should be noted that the difference in refractive index between the support 11 and the first lattice layer 21 is larger than the difference in refractive index between the first and intermediate lattice layers 21 and 31 and is also larger than the difference in refractive index between the intermediate and second lattice layers 31 and 41.

Part of the light passing through the interface between the support 11 and the first lattice layer 21 undergoes plasmon resonance in the first lattice layer 21. Light EP1 emerging from the first lattice layer 21 due to plasmon resonance is in a specific wavelength region that depends on the lattice structure including the structural period PT of the first metal layer 23 and depends on the materials of the lattice layer. Light in this wavelength region is consumed by plasmon resonance without being reflected at the interface between the support 11 and the first lattice layer 21. Consequently, part of the wavelength region of light incident on the support 11 is reflected at the interface between the support 11 and the first lattice layer 21, and thus the first lattice layer 21 transmits part of the wavelength region of light incident thereon to the intermediate lattice layer 31.

Part of light passing through the intermediate lattice layer 31 and incident on the second lattice layer 41 also undergoes plasmon resonance in the second lattice layer 41. Light EP2 emerging from the second lattice layer 41 due to plasmon resonance is in a specific wavelength region that depends on the lattice structure including the structural period PT of the second dielectric layer 43 and depends on the materials of the lattice layer. Consequently, the second lattice layer 41 transmits part of the wavelength region of light incident thereon to an air layer.

Thus, in rear-surface reflection observation in which light L1 is incident on the support 11 from outside the display and the rear surface 10T is observed from the rear of the display, colored light LR due to Fresnel reflection at the interfaces, i.e., light LR other than white and black light, can be observed in the first display region 10A. It should be noted that such Fresnel reflection occurring at the interface between the support 11 and the first lattice layer 21 enables observation of a hue closer to black in the first display region 10A in rear-surface reflection observation.

In front-surface transmission observation in which light L1 is incident on the support 11 from outside the display and the front surface 10S is observed from the front of the display, colored light LP2 that has undergone Fresnel reflection and plasmon resonance in the lattice layers can be observed in the first display region 10A. It should be noted that front-surface transmission observation and rear-surface reflection observation show a trend similar to the trend in the case where the intensity of external light toward the rear surface 10T is higher than the intensity of external light toward the front surface 10S.

[Antimicrobial Effects of Display]

The display exerts antimicrobial effects when the metal layer (the first metal layer 23 and the second metal portions 42, and intermediate metal portions 32A described later) contains antimicrobial metal microparticles. The antimicrobial effects of the display will be described.

As metal materials having antimicrobial effects, there are generally known gold, silver, copper, titanium, zinc, tungsten, gallium, strontium, zirconium, cobalt, cadmium, mercury, chromium and the like. From the perspectives such as of developing surface plasmon resonance and the display being touched by human hands, the metal material is preferred to be gold, silver or copper. In particular, silver, which is used as a main ingredient of inorganic antimicrobial agents, is more preferred when effectiveness and safety are concerned.

Silver has been known, from a long time ago, to have high antimicrobial properties and has been confirmed to develop strong bactericidal activity even in very small quantities. Although the antimicrobial mechanism is still unknown, silver ions have been known to strongly cross-link proteins, specifically, at a thiol group of an amino residue, such as a cysteine site, and to develop enzyme inhibition reaction to thereby kill bacteria. Silver ions have a bactericidal power which is larger than that of copper ions or chlorine by about 10 times, and it is considered that there should be no concern about adverse effects on the human body. When silver is in the form of nanoparticles, the surface area pronouncedly increases compared to a bulk form, and accordingly, silver ions can be easily eluted and antimicrobial effects are easily exerted with a much smaller quantity.

Antimicrobial metal microparticles that can be used for the metal layer may be microparticles of a substance of antimicrobial metal alone, antimicrobial metal microparticles carried by different metal that develops surface plasmon resonance, or a mixture of these microparticles. As long as antimicrobial properties are exerted, the content of the antimicrobial metal microparticles or the amount thereof to be carried is not particularly limited. In particular, when nanoparticles of silver are used, only trace amounts of silver may be used due to the strong antimicrobial activity thereof. For example, to enhance antimicrobial properties, the amount of silver is preferred to be 0.01 μg or more, and is more preferred to be 0.1 μg or more per 1 g of a metal layer.

The method of allowing a metal layer to contain antimicrobial metal microparticles is not particularly limited but a known method may be used. For example, the method may be a method in which an antimicrobial metal film is formed by vacuum deposition, sputtering or the like on a surface of a layer made of different metal, or a method in which antimicrobial metal is permitted to be carried by a film of different metal simultaneously with forming the film, or other methods. When simultaneously forming the film, the film-forming rate may be controlled to minimize the content of the antimicrobial metal microparticles or the amount thereof to be carried.

Figure 43:
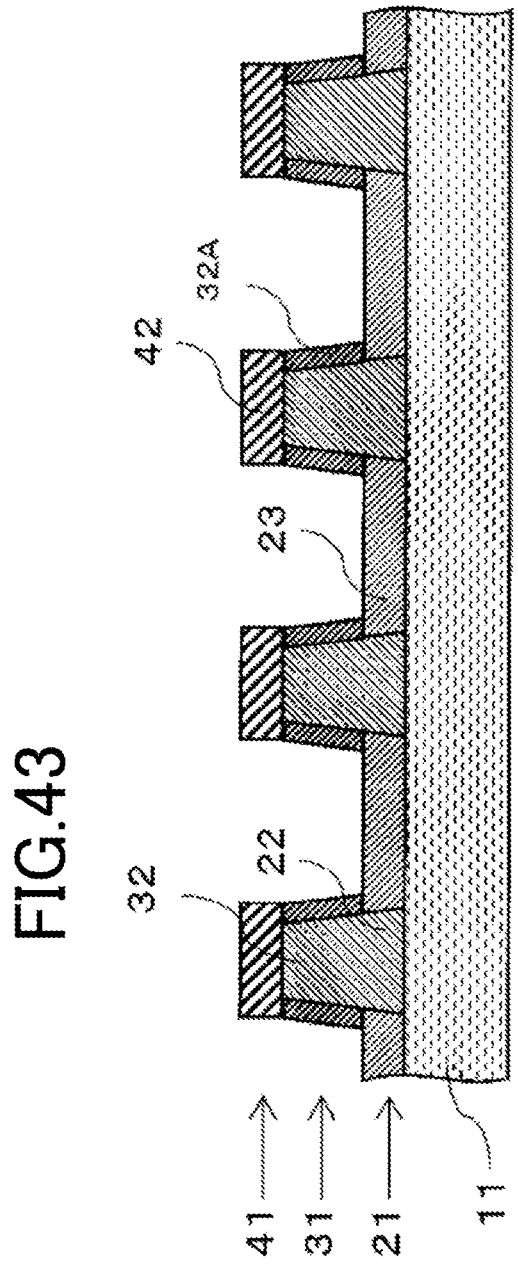
FIG. 43 is a partially enlarged cross-sectional view illustrating a configuration example of the structure of the first display region according to the fourth embodiment.

Although the details will be described later, as shown in FIG. 43, the metal layer is formed conforming to the surface profile of the convexities of the display. Therefore, the metal layer is necessarily touched by human hands when the display is touched by human hands, so that the antimicrobial activity can be effectively exhibited by the metal layer.

[Method of Producing Display]

Next, an example of a method of producing the display will be described.

First, first dielectric portions 22 and first intermediate dielectric portions 32 are formed on the surface of a support 11. The first dielectric portions 22 and the respective first intermediate dielectric portions 32 are integrally formed as convexities projected from the surface of the support 11. The method that can be used for forming the convexities may, for example, be photolithography using light or a charged particle beam, nanoimprinting, plasma etching, or other methods. Particularly, for example, as a method of forming convexities on the surface of a support 11 made of a resin, nanoimprinting may be used. When forming convexities by processing a substrate or the like made of a hard material, photolithography using light or a charged particle beam may be combined with plasma etching.

For example, as shown in FIG. 39, when producing a display which includes a support 11 formed of a substrate 11a and an intermediate layer 11b, a polyethylene terephthalate sheet is used first as the substrate 11a, and a UV curable resin is applied to the surface of the substrate 11a. Next, the surface of the coated film made of the UV curable resin is pressed against a surface of a synthetic quartz mold that is an intaglio plate, followed by applying UV light to the film and the mold. Subsequently, the UV-cured resin is released from the synthetic quartz mold. Thus, asperities of the intaglio plate are transferred to the resin on the surface of the substrate 11a, thereby forming convexities each including a first dielectric portion 22 and a first intermediate dielectric portion 32, and an intermediate layer 11b. It should be noted that the UV curable resin may be changed to a thermosetting resin, and the UV application may be changed to heating. Also, the UV curable resin may be changed to a thermoplastic resin, and the UV application may be changed to heating and cooling.

Next, a first metal layer 23 and second metal portions 42 are formed on the surface of the support 11 provided with the convexities. For example, the first metal layer 23 and the second metal portions 42 may be formed by vacuum deposition or sputtering. Thus, there are formed a first lattice layer 21 defined by the top face of the first metal layer 23, and a second lattice layer 41 defined by the top faces of the second metal portions 42. Also, there is formed an intermediate lattice layer 31 sandwiched between the first and second lattice layers 21 and 41.

Configuration Example of First Display Region

Figure 42:
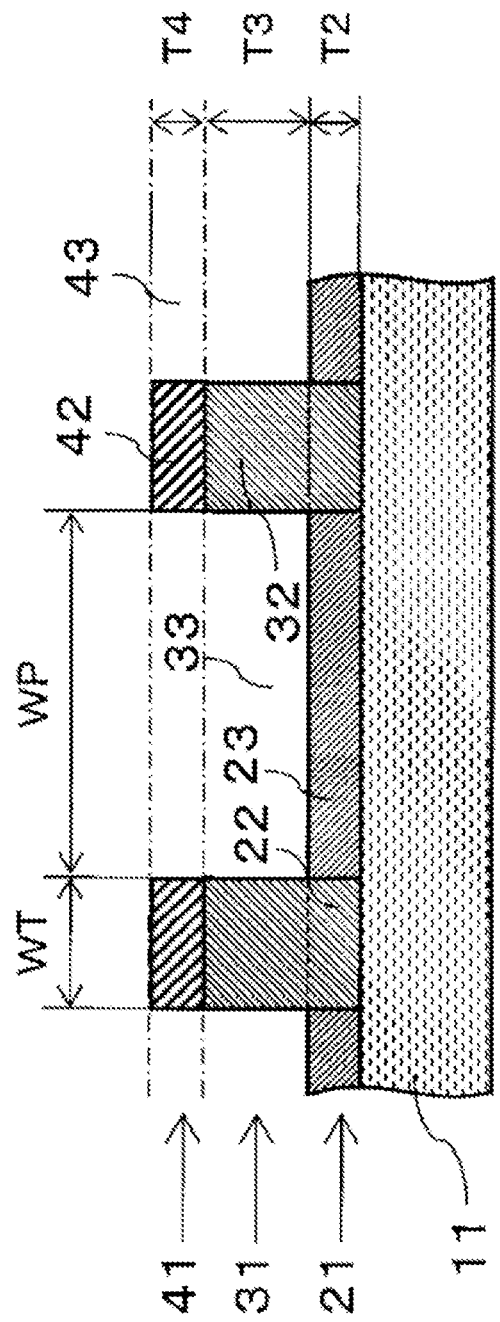
FIG. 42 is a partially enlarged cross-sectional view illustrating a configuration example of the structure of the first display region according to the fourth embodiment.

As shown in FIG. 42, the first metal layer 23 has a thickness T2. As the thickness T2 increases, the intensity of light generated by Fresnel reflection increases accordingly at the interface between the first lattice layer 21 and the support 11, and the image in rear-surface reflection observation increases brightness accordingly. As the ratio of the width WT of each first dielectric portion 22 to the structural period PT decreases, the image in rear-surface reflection observation also increases brightness accordingly.

As the thickness T2 of the first metal layer 23 increases, the intensity of light transmitted from the rear surface 10T to the front surface 10S decreases accordingly, and hue in front-surface reflection observation becomes closer to black. As the ratio of the width WT of each first dielectric portion 22 to the structural period PT decreases, hue in front-surface reflection observation also becomes closer to black.

When the thickness T2 of the first metal layer 23 is 10 nm or more and the ratio of the width WT of each first dielectric portion 22 to the structural period PT is 0.75 or less, satisfactory accuracy can be achieved in each observation mentioned above, for discriminating between the front and rear of the display.

As the thickness T2 of the first metal layer 23 decreases or as the second metal portions 42 each have a smaller thickness T4, the intensity of light passing through the layer and portions increases accordingly in front- or rear-surface transmission observation. As the ratio of the width WT of each first dielectric portion 22 to the structural period PT increases, the intensity of light passing through the display increases accordingly.

When the thickness T2 of the first metal layer 23 or the thickness T4 of each second metal portion 42 is 200 nm or less and the ratio of the width WT of each first dielectric portion 22 to the structural period PT is 0.25 or more, a clear image can be observed in front- or rear-surface transmission observation.

The sum of the thickness T2 of each first dielectric portion 22 and the thickness T3 of each first intermediate dielectric portion 32 is preferred to be smaller than the structural period PT that is the sum of the width WT of each first dielectric portion 22 and the minimum interval WP. The sum of the thickness T2 of each first dielectric portion 22 and the thickness T3 of each first intermediate dielectric portion 32 is even more preferred to be smaller than half the structural period PT.

The structure as described above can contribute to enhancing the configuration accuracy of the resin structure in which the first dielectric portions 22 are respectively integrated with the first intermediate dielectric portions 32. Moreover, the convexities 11T each formed of a first dielectric portion 22 and a first intermediate dielectric portion 32 are prevented from falling on the surface of the support 11.

When the first lattice layer 21 or the second lattice layer 41 is made of a metal material having a complex dielectric constant with a negative real part in the wavelength region of visible light, plasmon resonance easily occurs in these layers. In this regard, the material for the first metal layer 23 is preferred to be a material having a complex dielectric constant with a negative real part. The material for the second metal portions 42 is also preferred to be a material having a complex dielectric constant with a negative real part.

The material for the first metal layer 23 or the second metal portions 42 may, for example, be aluminum, silver, gold, copper, indium, tantalum, or the like.

As described in the above production method, the first metal layer 23 and the second metal portions 42 can be formed through a single process of forming a metal layer film on the support 11 on which the first dielectric portions 22 and the first intermediate dielectric portions 32 have been formed.

As shown in FIG. 43, the first dielectric portions 22 and the respective first intermediate dielectric portions 32 may be configured as integral structures. The profile of the integral structures may be implemented with conical convexities projected from the surface of a substrate 11. A first metal layer 23 and second metal portions 42, and intermediate metal portions 32A each covering the peripheral side surface of the corresponding one of the conical convexities can be formed conforming to the surface profile of the substrate 11 and the conical convexities (i.e., covering the surfaces of the support 11 and the conical convexities). The first metal layer 23, the second metal portions 42 and the intermediate metal portions 32A may be integrally formed together. With this configuration, for example, the metal layer is likely to be touched by human hands when touching the display and thus antimicrobial effects can be effectively exerted. Furthermore, when forming the first dielectric portions and the first intermediate dielectric portions, the intaglio plate for forming these portions can be smoothly released.

[Protective Layer]

Figure 44:
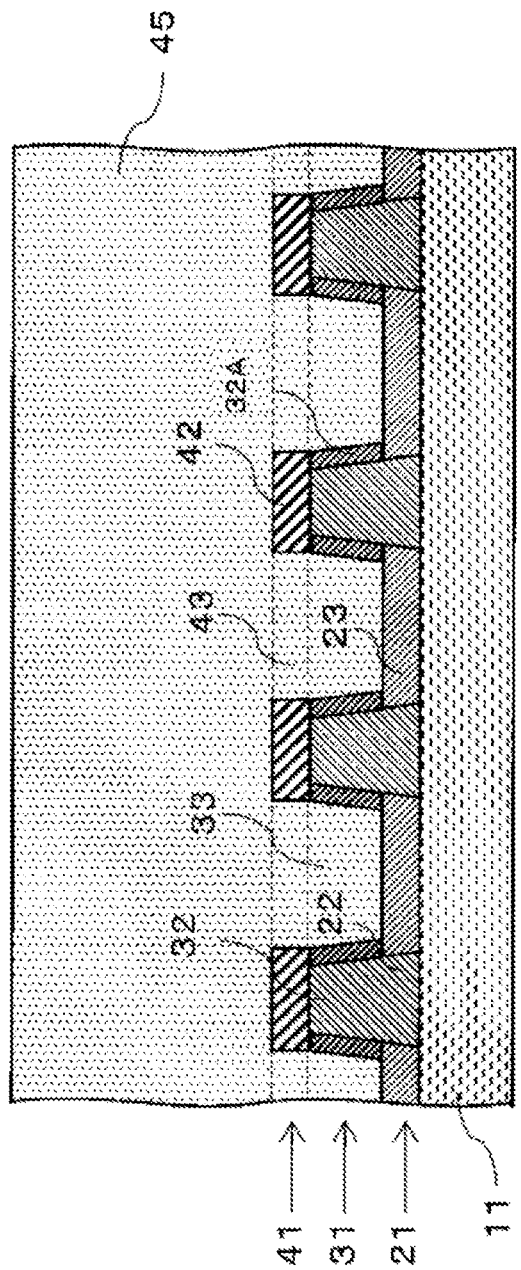
FIG. 44 is a partially enlarged cross-sectional view illustrating a configuration example of the structure of the first display region according to the fourth embodiment.

As shown in FIG. 44, the display further includes a protective layer covering a surface of the metal layer facing away from the surface contacting the periodic structure. In this case, the intensity of Fresnel reflection at the interface between the protective layer and the second metal portions 42, and the wavelength selectivity in the display depend on the refractive index of the protective layer. In this regard, the material for the protective layer may be appropriately selected based on the wavelength region to be selected by the display. It should be noted that the protective layer 45 can be implemented as a structure integral with the second dielectric layer 43 and the second intermediate dielectric layer 33. In this case, the protective layer 45 is preferred to be a resin layer having a low refractive index. The resin layer has a low refractive index closer to the refractive index of an air layer than to the refractive index of the first dielectric portions 22 or the first intermediate dielectric portions 32.

When the display is used by being touched with one's bare hands, the protective layer 45 forming the surface of the display is preferred to be made of a resin containing fluorine. With this configuration, smudges, such as of sebum, are prevented from adhering to the surface of the display. Furthermore, the protective layer 45 may contain metal microparticles having antimicrobial properties. With this configuration, bacteria that have adhered to the surface of the display can be killed or can be prevented from propagating.

According to the fourth embodiment, the advantageous effects enumerated below can be obtained.

(1) In front- and rear-surface reflection observations, images having different hues can be observed in the first display region 10A. Therefore, the front and rear surfaces of the display can be discriminated from each other. Furthermore, for the items to which the display is affixed, authenticity can be easily verified, or the visual appearance can be enhanced.

(2) In front-surface reflection observation and rear-surface transmission observation as well, images having different hues can be observed in the first display region 10A. Therefore, the accuracy of discriminating between the front and rear can be enhanced. Furthermore, in rear-surface reflection observation and front-surface transmission observation as well, images having different hues can be observed in the first display region 10A. Therefore, the accuracy of discriminating between the front and rear can be enhanced.

(3) Since the structural period PT corresponds to a sub-wavelength period that is not more than the wavelength of the visible region, light in the visible region is prevented from forming primary diffracted light. Therefore, the images observed in rear-surface reflection observation and front- and rear-surface transmission observations are prevented from containing iridescent colors, allowing the images to have even more vivid hues.

(4) Since the sum of the thickness T2 of the first lattice layer 21 and the thickness T3 of the intermediate lattice layer 31 is suitable for applying an intaglio plate used such as for nanoimprinting, the first dielectric portions 22 and the respective first intermediate dielectric portions 32 can be integrally formed.

(5) In front- and rear-surface reflection observations and front- or rear-surface transmission observation, the first display region 10A is permitted to have a unique hue. Therefore, for the items to which the display is affixed, accuracy of verifying authenticity can be enhanced.

(6) In front- and rear-surface reflection observations and front- or rear-surface transmission observation, the surfaces of the first display region 10A are permitted to have unique hues. Therefore, the mode of presenting an image by the display can be made even more complicated and the visual appearance presented by the display can be enhanced.

(7) Since the metal layer forming the surface of the display contains metal microparticles having antimicrobial properties, bacteria that have adhered to the display at the time, for example, of human hands touching the display, can be killed and the bacteria are prevented from propagating. For this reason, antimicrobial effects can be imparted to the items to which the display is affixed.

Examples

The display described according to the fourth embodiment and a method of producing the display will be described by way of a specific example.

First, a mold was prepared as an intaglio plate for use in photo-nanoimprinting. Specifically, a film of chromium (Cr) was formed by sputtering on a surface of a synthetic quartz substrate having a thickness of 10 nm, followed by forming an electron beam resist pattern on the Cr film by electron beam lithography. The resist used was of a positive type and had a thickness of 150 nm. In the pattern formed, squares each having sides of 160 nm were arranged in a hexagonal array in a square region having sides of 1 cm. In the hexagonal array, the structural period PT was 320 nm and the regions drawn with an electron beam were on the inside of the square region.

Next, the Cr film in the region exposed from the resist was etched by plasma generated by applying high frequency wave to a mixed gas of chlorine and oxygen. Subsequently, the synthetic quartz substrate in the region exposed from the resist and the Cr film was etched by plasma generated by applying high frequency to ethane hexafluoride gas. As a result of controlling the conditions of the plasma etching, the concavities of the quartz each had a conical shape. The etched synthetic quartz substrate had a depth of 100 nm. The residual resist and the Cr film were removed to obtain a mold with asperities formed thereon. A mold release agent, Optool HD-1100 (manufactured by Daikin Industries Ltd.), was applied onto the surface of the mold.

Next, a UV curable resin was applied onto the surface of the mold on which the pattern had been formed. Then, the surface of the mold was covered with a polyethylene terephthalate film having one surface subjected to adhesion enhancing treatment, so that the adhesion enhancement-treated surface faced the mold. Furthermore, the UV curable resin was spread by using a roller so that the UV curable resin was spread out over the entire region of the mold on which the pattern had been formed. Then, UV light was applied to the mold to cure the UV curable resin, followed by removing the polyethylene terephthalate film from the mold. In this way, a pattern of convexities arranged in a hexagonal array was formed on the surface of the UV curable resin, thereby obtaining a periodic structure that was a laminate of a layer made of the UV curable resin and a substrate formed of the polyethylene terephthalate film. The cured UV curable resin had a refractive index of 1.52.

Next, a silver (Ag) film with a thickness of 20 nm was formed on the surface of the periodic structure by vacuum deposition to form a metal layer. Thus, a display of the example was obtained. The metal layer-side of the substrate corresponds to the front of the display, and the substrate-side of the metal layer corresponds the rear of the display.

When the display of the example was observed by applying white light thereto, a blue color close to black was observed in front-surface reflection observation, a violet color was observed in rear-surface reflection observation, and an orange color was observed in front- and rear-surface transmission observations, in the region where the pattern of convexities was formed. In the region where the pattern of convexities was not formed, a color having metallic gloss was observed as light reflected from the metal layer made of silver.

Next, the display of the example was subjected to negative tests for bacteria and fungi according to the sterilization test method described in the Japanese Pharmacopeia. As a result, it was confirmed that there was no growth of bacteria. Thus, it was confirmed that the display was provided with sufficient antimicrobial effects.

INDUSTRIAL APPLICABILITY

The display of the present invention can be provided to items required to have difficulty of counterfeiting or items of daily use. Thus, difficulty of counterfeiting the items can be enhanced or the visual appearance of the daily use items can be enhanced.

REFERENCE SIGNS LIST

A2 . . . Isolated region; A3 . . . Peripheral region; L1, EP1, EP2, LR, LP1, LP2 . . . Light; LT . . . Square (array unit); XT . . . Length of sides of array unit; PT, PT1-PT4 . . . Structural period; T2, T3, T4, T5, T6, T7 . . . Thickness; W4, WT . . . Width; WP Minimum interval; 10A . . . First display region; 10B . . . Second display region; 10S . . . Front surface; 10T . . . Rear surface; 11 . . . Support; 11a . . . Substrate; 11b . . . Intermediate layer; 11T . . . Convexity; 11H . . . Concavity; 21 . . . First lattice layer; 22 . . . First dielectric portion; 23 . . . First metal layer; 31 . . . Intermediate lattice layer; 32 . . . First intermediate dielectric portion; 32A . . . Intermediate metal portion 33, 34 . . . Second intermediate dielectric layer; 41 . . . Second lattice layer; 42 . . . Second metal portion; 43, 44 . . . Second dielectric layer; 45 . . . Protective layer; 51 . . . Upper lattice layer; 52 . . . First upper dielectric portion; 53 . . . Second upper dielectric layer; 61 . . . Metal layer; 62 . . . Dielectric layer; 70 . . . Light emergence structure; 100 . . . Display; 110 . . . Device with display.

What is claimed is:

1. A display, comprising:
a periodic structure that is dielectric and includes a support and a plurality of periodic elements, the support having a reference plane on which the plurality of periodic elements are arranged in a two-dimensional lattice form having a sub-wavelength period, the plurality of periodic elements being either convexities projected from the reference plane or concavities recessed in the reference plane; and,
a metal layer disposed on a surface of the periodic structure, the surface corresponding to a plane including a region of the reference plane surrounding the individual periodic elements and surfaces of the periodic elements, the metal layer having a profile conforming to a surface profile of the periodic structure, wherein
each of the periodic elements is a polygon in plan view, wherein the metal layer comprises an effective antimicrobial amount of silver microparticles so that the display exerts an antimicrobial effect, wherein the polygon has at least one interior angle that is an acute angle and wherein at least part of pairs of adjacent periodic elements among the plurality of periodic elements is arranged such that vertices of acute angles in a pair of adjacent periodic elements point at each other.

2. The display of claim 1, wherein the pair of adjacent periodic elements having acute angles facing each other have centers, the centers having a distance therebetween which is a sub-wavelength.

3. The display of claim 1, wherein the plurality of periodic elements are arranged in any one of a hexagonal symmetric array, a hexagonal array and a square array in plan view.

4. The display of claim 1, wherein
the reference plane is provided thereon with:
a first lattice layer having a thickness in a range of 10 nm or more and 200 nm or less,
a second lattice layer having a thickness in a range of 10 nm or more and 200 nm or less, and
an intermediate lattice layer having a thickness greater than that of the first lattice layer and that of the second lattice layer and sandwiched between the first lattice layer and the second lattice layer in a thickness direction;
the first lattice layer includes a plurality of first dielectric portions and a first metal layer, the plurality of first dielectric portions being arranged in an island array, the first metal layer having a mesh pattern which surrounds the individual first dielectric portions;
the intermediate lattice layer includes a plurality of first intermediate dielectric portions and a second intermediate dielectric layer, the plurality of first intermediate dielectric portions being arranged in an island array, the second intermediate dielectric layer having a mesh pattern which surrounds the individual first intermediate dielectric portions and having a dielectric constant lower than that of the first intermediate dielectric portions;
the second lattice layer includes a plurality of second metal portions and a second dielectric layer, the plurality of second metal portions being arranged in an island array, the second dielectric layer having a mesh pattern which surrounds the individual second metal portions;
the periodic elements are the convexities, the first dielectric portions and the first intermediate dielectric portions configure the periodic elements, and the first metal layer and the second metal portions are included in the metal layer;
a volume ratio of the first metal layer in the first lattice layer is larger than a volume ratio of the second metal portions in the second lattice layer, and a volume ratio of the second metal portions in the second lattice layer is larger than a volume ratio of metal materials in the intermediate lattice layer; and
a ratio of a width of each of the first dielectric portions to a structural period of the first dielectric portions and a ratio of a width of each of the second metal portions to a structural period of the second metal portions are each in a range of 0.25 or more and 0.75 or less.

5. The display of claim 1, wherein each of the periodic elements is an equilateral triangle.

6. The display of claim 5, wherein the wherein the plurality of periodic elements are arranged in of a hexagonal symmetric array in plan view.

7. The display of claim 5, wherein at least part of pairs of adjacent periodic elements among the plurality of periodic elements is arranged in such a way so that in a pair of adjacent periodic elements, the periodic elements are mirror images of each other with respect to a line perpendicular to a line between the vertices of acute angles pointing at each other.

8. The display of claim 7, wherein the wherein the plurality of periodic elements are arranged in of a hexagonal symmetric array in plan view.

* * * * *